United States Patent
Schwarz et al.

(10) Patent No.: US 8,416,525 B2
(45) Date of Patent: *Apr. 9, 2013

(54) MAGNETIC MEDIA FORMATTED WITH AN INTERGRATED THIN FILM SUBGAP SUBPOLE STRUCTURE FOR ARBITRARY GAP PATTERN MAGNETIC RECORDING HEAD

(75) Inventors: Theodore A. Schwarz, Woodbury, MN (US); Matthew P. Dugas, St. Paul, MN (US)

(73) Assignee: Advanced Research Corporation, White Bear Lake, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/032,754

(22) Filed: Feb. 23, 2011

(65) Prior Publication Data

US 2011/0141604 A1    Jun. 16, 2011

Related U.S. Application Data

(63) Continuation of application No. 12/268,076, filed on Nov. 10, 2008, now abandoned, which is a continuation of application No. 11/120,640, filed on May 3, 2005, now Pat. No. 7,450,341.

(60) Provisional application No. 60/568,139, filed on May 4, 2004.

(51) Int. Cl.
*G11B 5/584* (2006.01)
*G11B 21/02* (2006.01)

(52) U.S. Cl. .................................. 360/121; 360/77.12

(58) Field of Classification Search .............. 360/77.12, 360/121, 122, 125.33
See application file for complete search history.

(56) References Cited

U.S. PATENT DOCUMENTS 2,938,962 A   5/1960 Konins et al.
3,192,608 A   7/1965 Rinia et al.
(Continued)

FOREIGN PATENT DOCUMENTS

DE   2912309   10/1979
EP   0 407 244   1/1991
(Continued)

OTHER PUBLICATIONS

Hisatoshi, Hata, Patent Abstracts of Japan (Publication No. 06333210), Feb. 12, 1994.
(Continued)

*Primary Examiner* — Jefferson Evans
(74) *Attorney, Agent, or Firm* — Winthrop & Weinstine, P.A.

(57) ABSTRACT

A method of formatting magnetic media includes providing an integrated thin film magnetic recording head having a recording element. The recording element includes first and second magnetically permeable thin film subpole members separated by a substantially low permeability subgap member. An integrated electrically conductive coil structure is embedded in part within the subgap member and in part in-between the first and second subpole members. The recording element also includes a magnetically permeable thin film layer spanning from at least the first subpole member to the second subpole member and including one or more arbitrary recording gap patterns. The direction of film growth of the magnetically permeable thin film layer is substantially orthogonal to the direction of thin film growth of the first and second magnetically permeable thin film subpole members. The method includes passing magnetic media over the magnetic recording head to format the magnetic media.

16 Claims, 39 Drawing Sheets

U.S. PATENT DOCUMENTS

| | | | |
|---|---|---|---|
| 3,417,386 A | 12/1968 | Schneider | |
| 3,699,334 A | 10/1972 | Cohen et al. | |
| 3,750,828 A | 8/1973 | Constable | |
| 3,853,715 A | 12/1974 | Romankiw | |
| 4,007,493 A | 2/1977 | Behr et al. | |
| 4,088,490 A | 5/1978 | Duke et al. | |
| 4,268,881 A | 5/1981 | Saito | |
| 4,298,899 A | 11/1981 | Argumedo et al. | |
| 4,314,290 A | 2/1982 | Ragle | |
| 4,318,146 A | 3/1982 | Ike et al. | |
| 4,408,240 A | 10/1983 | Pastore | |
| 4,457,803 A | 7/1984 | Takigawa | |
| 4,488,188 A | 12/1984 | Hansen et al. | |
| 4,490,756 A | 12/1984 | Dost et al. | |
| 4,535,376 A | 8/1985 | Nomura et al. | |
| 4,539,615 A | 9/1985 | Arai et al. | |
| 4,586,094 A | 4/1986 | Chambors et al. | |
| 4,598,327 A | 7/1986 | Jen et al. | |
| 4,609,959 A | 9/1986 | Rudi | |
| 4,642,709 A | 2/1987 | Vinal | |
| 4,673,999 A | 6/1987 | Suyama et al. | |
| 4,685,012 A | 8/1987 | DeWit et al. | |
| 4,752,850 A | 6/1988 | Yamada et al. | |
| 4,758,304 A | 7/1988 | McNeil et al. | |
| 4,758,907 A | 7/1988 | Okamoto et al. | |
| 4,837,924 A | 6/1989 | Lazzari | |
| 4,897,748 A | 1/1990 | Takahashi et al. | |
| 4,901,178 A | 2/1990 | Kobayashi et al. | |
| 4,906,552 A | 3/1990 | Ngo et al. | |
| 4,914,805 A | 4/1990 | Kawase | |
| 4,927,804 A | 5/1990 | Zieren et al. | |
| 4,945,438 A | 7/1990 | Matsumoto et al. | |
| 4,971,947 A | 11/1990 | Barnes et al. | |
| 4,992,897 A | 2/1991 | Deroux-Dauphin | |
| 5,016,342 A | 5/1991 | Pisharody et al. | |
| 5,017,326 A | 5/1991 | Wash et al. | |
| 5,027,244 A | 6/1991 | Hayakawa | |
| 5,035,787 A | 7/1991 | Parker et al. | |
| 5,055,951 A | 10/1991 | Behr | |
| 5,067,230 A | 11/1991 | Meunier et al. | |
| 5,079,663 A | 1/1992 | Ju et al. | |
| 5,086,015 A | 2/1992 | Itoh et al. | |
| 5,090,111 A | 2/1992 | Lazzari | |
| 5,093,980 A | 3/1992 | Maurice et al. | |
| 5,124,869 A | 6/1992 | Lehureau | |
| 5,126,231 A | 6/1992 | Levy | |
| 5,132,861 A | 7/1992 | Behr et al. | |
| 5,160,078 A | 11/1992 | Spicer | |
| 5,189,580 A | 2/1993 | Pisharody et al. | |
| 5,195,006 A | 3/1993 | Morikawa | |
| 5,196,969 A | 3/1993 | Iwamatsu et al. | |
| 5,211,734 A | 5/1993 | Yagami et al. | |
| 5,224,260 A | 7/1993 | Fedeli et al. | |
| 5,241,442 A | 8/1993 | Akashi | |
| 5,262,908 A | 11/1993 | Iwamatsu et al. | |
| 5,280,402 A | 1/1994 | Anderson et al. | |
| 5,293,281 A | 3/1994 | Behr et al. | |
| 5,301,418 A | 4/1994 | Dirne et al. | |
| 5,307,217 A | 4/1994 | Saliba | |
| 5,309,299 A | 5/1994 | Crossland et al. | |
| 5,319,502 A | 6/1994 | Feig | |
| 5,321,570 A | 6/1994 | Behr et al. | |
| 5,371,638 A | 12/1994 | Saliba | |
| 5,379,170 A | 1/1995 | Schwarz | |
| 5,394,285 A | 2/1995 | Dee et al. | |
| 5,398,145 A | 3/1995 | Jeffers et al. | |
| 5,402,295 A | 3/1995 | Suzuki et al. | |
| 5,405,734 A | 4/1995 | Aita | |
| 5,423,116 A | 6/1995 | Sundaram | |
| 5,432,652 A | 7/1995 | Comeaux et al. | |
| 5,434,732 A | 7/1995 | Schwarz et al. | |
| 5,447,598 A | 9/1995 | Mihara et al. | |
| 5,450,257 A | 9/1995 | Tran et al. | |
| 5,452,152 A | 9/1995 | Rudi | |
| 5,452,165 A | 9/1995 | Chen et al. | |
| 5,452,166 A | 9/1995 | Aylwin et al. | |
| 5,488,525 A | 1/1996 | Adams et al. | |
| 5,504,339 A | 4/1996 | Masuda | |
| 5,506,737 A | 4/1996 | Lin et al. | |
| 5,523,185 A | 6/1996 | Goto | |
| 5,523,904 A | 6/1996 | Saliba | |
| 5,552,944 A | 9/1996 | Clemow | |
| 5,567,333 A | 10/1996 | Hira et al. | |
| 5,572,392 A * | 11/1996 | Aboaf et al. | 360/125.35 |
| 5,587,307 A | 12/1996 | Alborn, Jr. et al. | |
| 5,593,065 A | 1/1997 | Harrold | |
| 5,602,703 A | 2/1997 | Moore et al. | |
| 5,606,478 A | 2/1997 | Chen et al. | |
| 5,616,921 A | 4/1997 | Talbot et al. | |
| 5,621,188 A | 4/1997 | Lee et al. | |
| 5,629,813 A | 5/1997 | Baca et al. | |
| 5,639,509 A | 6/1997 | Schemmel | |
| 5,652,015 A | 7/1997 | Aboaf et al. | |
| 5,655,286 A * | 8/1997 | Jones, Jr. | 29/603.13 |
| 5,665,251 A | 9/1997 | Robertson et al. | |
| 5,666,249 A | 9/1997 | Ohmori et al. | |
| 5,675,461 A | 10/1997 | Aylwin et al. | |
| 5,677,011 A | 10/1997 | Hatakeyama et al. | |
| 5,680,278 A | 10/1997 | Sawtelle, Jr. | |
| 5,689,384 A * | 11/1997 | Albrecht et al. | 360/77.12 |
| 5,710,673 A | 1/1998 | Varian | |
| 5,715,597 A | 2/1998 | Aylwin et al. | |
| 5,719,730 A | 2/1998 | Chang et al. | |
| 5,723,234 A | 3/1998 | Yokoyama et al. | |
| 5,726,841 A | 3/1998 | Tong et al. | |
| 5,737,826 A | 4/1998 | Slade et al. | |
| 5,742,452 A | 4/1998 | Simmons et al. | |
| 5,751,526 A | 5/1998 | Schemmel | |
| 5,752,309 A | 5/1998 | Partee et al. | |
| 5,757,575 A | 5/1998 | Hallamasek et al. | |
| 5,768,070 A | 6/1998 | Krounbi et al. | |
| 5,771,142 A | 6/1998 | Maurice et al. | |
| 5,793,577 A | 8/1998 | Katz et al. | |
| 5,822,159 A | 10/1998 | Fukuyama et al. | |
| 5,831,792 A | 11/1998 | Ananth | |
| 5,863,450 A | 1/1999 | Dutertre et al. | |
| 5,867,339 A | 2/1999 | Panish et al. | |
| 5,890,278 A | 4/1999 | Van Kesteren | |
| 5,909,346 A | 6/1999 | Malhotra et al. | |
| 5,920,447 A | 7/1999 | Sakata et al. | |
| 5,923,272 A | 7/1999 | Albrecht et al. | |
| 5,930,065 A | 7/1999 | Albrecht et al. | |
| 5,940,238 A | 8/1999 | Nayak et al. | |
| 5,966,264 A | 10/1999 | Belser et al. | |
| 5,966,632 A | 10/1999 | Chen et al. | |
| 5,973,874 A | 10/1999 | Panish et al. | |
| 5,982,711 A | 11/1999 | Knowles et al. | |
| 5,995,315 A | 11/1999 | Fasen | |
| 6,005,737 A | 12/1999 | Connolly et al. | |
| 6,018,444 A * | 1/2000 | Beck et al. | 360/121 |
| 6,021,013 A | 2/2000 | Albrecht et al. | |
| 6,025,970 A | 2/2000 | Cheung | |
| 6,031,673 A | 2/2000 | Fasen et al. | |
| 6,034,835 A | 3/2000 | Serrano | |
| 6,075,678 A | 6/2000 | Saliba | |
| 6,081,401 A | 6/2000 | Varian | |
| 6,088,184 A | 7/2000 | Hu | |
| 6,090,507 A | 7/2000 | Grenon et al. | |
| 6,111,719 A | 8/2000 | Fasen | |
| 6,118,630 A | 9/2000 | Argumedo | |
| 6,130,804 A | 10/2000 | Panish et al. | |
| 6,141,174 A | 10/2000 | Judge et al. | |
| 6,156,487 A | 12/2000 | Jennison et al. | |
| 6,163,421 A | 12/2000 | Sasaki et al. | |
| 6,163,436 A | 12/2000 | Grenon et al. | |
| 6,165,649 A | 12/2000 | Grenon et al. | |
| 6,169,640 B1 | 1/2001 | Fasen | |
| 6,190,836 B1 | 2/2001 | Grenon et al. | |
| 6,222,698 B1 | 4/2001 | Barndt et al. | |
| 6,229,669 B1 | 5/2001 | Beck et al. | |
| 6,236,525 B1 | 5/2001 | Cates et al. | |
| 6,236,538 B1 | 5/2001 | Yamada et al. | |
| 6,269,533 B2 * | 8/2001 | Dugas | 29/603.13 |
| 6,275,350 B1 | 8/2001 | Barndt | |
| 6,282,051 B1 | 8/2001 | Albrecht et al. | |
| 6,307,718 B1 | 10/2001 | Kasetty | |
| 6,320,719 B1 | 11/2001 | Albrecht et al. | |

| | | |
|---|---|---|
| 6,433,949 B1 | 8/2002 | Murphy et al. |
| 6,445,550 B1 | 9/2002 | Ishi |
| 6,462,904 B1 | 10/2002 | Albrecht et al. |
| 6,469,867 B2 | 10/2002 | Saliba |
| 6,496,328 B1 | 12/2002 | Dugas |
| 6,522,490 B1 * | 2/2003 | Cates et al. .................. 360/48 |
| 6,542,325 B1 | 4/2003 | Molstad et al. |
| 6,545,837 B1 | 4/2003 | Tran |
| 6,574,066 B1 | 6/2003 | Stubbs et al. |
| 6,590,729 B1 | 7/2003 | Akagi et al. |
| 6,622,490 B2 | 9/2003 | Ingistov |
| 6,635,404 B1 | 10/2003 | Choi et al. |
| 6,650,496 B2 | 11/2003 | Nozieres et al. |
| 6,700,729 B1 | 3/2004 | Beck et al. |
| 6,721,126 B1 | 4/2004 | Bui et al. |
| 6,744,594 B2 | 6/2004 | Denison et al. |
| 6,754,026 B1 | 6/2004 | Koski |
| 6,778,359 B1 | 8/2004 | Iwama |
| 6,781,778 B1 | 8/2004 | Molstad et al. |
| 6,795,246 B2 | 9/2004 | Yano et al. |
| 6,798,608 B2 | 9/2004 | Chliwnyj et al. |
| 6,801,383 B2 | 10/2004 | Zweighaft et al. |
| 6,801,391 B2 | 10/2004 | Sugawara et al. |
| 6,831,805 B2 | 12/2004 | Chliwnyj et al. |
| 6,842,305 B2 | 1/2005 | Molstad et al. |
| 6,865,050 B2 | 3/2005 | Nakao et al. |
| 6,873,487 B2 | 3/2005 | Molstad |
| 6,879,457 B2 | 4/2005 | Eaton et al. |
| 6,894,869 B2 | 5/2005 | Dugas |
| 6,943,987 B1 * | 9/2005 | Raymond et al. ............. 360/121 |
| 6,947,247 B2 | 9/2005 | Schwarz et al. |
| 6,947,256 B2 * | 9/2005 | Biskeborn et al. ....... 360/125.34 |
| 6,950,277 B1 | 9/2005 | Nguy et al. |
| 6,963,467 B2 | 11/2005 | Bui et al. |
| 6,970,312 B2 | 11/2005 | Yip et al. |
| 6,987,648 B2 * | 1/2006 | Dugas .......................... 360/131 |
| 6,989,950 B2 | 1/2006 | Ohtsu |
| 6,989,960 B2 | 1/2006 | Dugas |
| 7,009,810 B2 | 3/2006 | Dugas |
| 7,072,133 B1 * | 7/2006 | Yip et al. ...................... 360/53 |
| 7,106,544 B2 * | 9/2006 | Dugas et al. .................. 360/75 |
| 7,119,976 B2 * | 10/2006 | Biskeborn et al. ............. 360/53 |
| 7,130,140 B1 | 10/2006 | Boyer |
| 7,130,152 B1 | 10/2006 | Raymond et al. |
| 7,142,388 B2 | 11/2006 | Tateishi et al. |
| 7,190,551 B2 * | 3/2007 | Suda ............................ 360/121 |
| 7,196,870 B2 | 3/2007 | Dugas |
| 7,206,170 B2 * | 4/2007 | Yip ............................ 360/241.1 |
| 7,218,476 B2 | 5/2007 | Dugas |
| 7,224,544 B2 | 5/2007 | Takano et al. |
| 7,283,317 B2 | 10/2007 | Dugas et al. |
| 7,301,716 B2 | 11/2007 | Dugas et al. |
| 7,355,805 B2 | 4/2008 | Nakao et al. |
| 7,426,093 B2 | 9/2008 | Dugas |
| 7,450,341 B2 | 11/2008 | Dugas et al. |
| 7,511,908 B2 | 3/2009 | Winarski |
| 7,515,374 B2 | 4/2009 | Nakao |
| 7,525,761 B2 | 4/2009 | Dugas |
| 7,639,448 B2 | 12/2009 | Haustein |
| 7,710,675 B2 | 5/2010 | Dugas et al. |
| 7,773,340 B2 | 8/2010 | Dugas |
| 2001/0003862 A1 | 6/2001 | Dugas |
| 2001/0045005 A1 | 11/2001 | Dugas |
| 2002/0034042 A1 | 3/2002 | Hungerford et al. |
| 2002/0058204 A1 | 5/2002 | Khojasteh et al. |
| 2002/0061465 A1 | 5/2002 | Hasegawa et al. |
| 2002/0125289 A1 | 9/2002 | Huetter |
| 2002/0171974 A1 | 11/2002 | Dugas |
| 2002/0177066 A1 | 11/2002 | Song et al. |
| 2003/0016446 A1 | 1/2003 | Yano |
| 2003/0039063 A1 | 2/2003 | Dugas |
| 2003/0048563 A1 | 3/2003 | Magnusson |
| 2003/0093894 A1 | 5/2003 | Dugas |
| 2003/0099057 A1 | 5/2003 | Molstad |
| 2003/0099059 A1 | 5/2003 | Nakao |
| 2003/0137768 A1 | 7/2003 | Chliwnyj et al. |
| 2003/0151844 A1 | 8/2003 | Eaton et al. |
| 2004/0001275 A1 | 1/2004 | Chliwnyj et al. |
| 2004/0109261 A1 | 6/2004 | Dugas |
| 2004/0145827 A1 | 7/2004 | Biskeborn et al. |
| 2004/0174628 A1 | 9/2004 | Schwarz et al. |
| 2005/0007323 A1 | 1/2005 | Appelbaum et al. |
| 2005/0052779 A1 | 3/2005 | Nakao et al. |
| 2005/0052783 A1 * | 3/2005 | Suda ........................... 360/121 |
| 2005/0099713 A1 | 5/2005 | Molstad et al. |
| 2005/0099715 A1 | 5/2005 | Yip et al. |
| 2005/0152066 A1 | 7/2005 | Yip |
| 2005/0168869 A1 | 8/2005 | Dugas et al. |
| 2005/0180040 A1 | 8/2005 | Dugas et al. |
| 2005/0219734 A1 | 10/2005 | Rothermel et al. |
| 2005/0254170 A1 | 11/2005 | Dugas et al. |
| 2005/0259364 A1 * | 11/2005 | Yip ............................ 360/241.1 |
| 2005/0275968 A1 | 12/2005 | Dugas |
| 2006/0061906 A1 | 3/2006 | Dugas |
| 2006/0126207 A1 | 6/2006 | Johnson et al. |
| 2009/0097155 A1 | 4/2009 | Dugas |
| 2009/0262452 A1 | 10/2009 | Dugas |
| 2010/0002335 A1 | 1/2010 | Dugas |

FOREIGN PATENT DOCUMENTS

| | | |
|---|---|---|
| EP | 0 690 442 | 1/1996 |
| EP | 0 328 104 | 8/1998 |
| EP | 0 913 813 A2 | 5/1999 |
| JP | 53-007219 | 1/1978 |
| JP | 58146011 | 8/1983 |
| JP | 59-008833 | 1/1984 |
| JP | 60-078347 | 4/1985 |
| JP | 61-151667 | 6/1986 |
| JP | 61-174630 | 8/1986 |
| JP | 61-291074 | 12/1986 |
| JP | 01-064104 | 3/1989 |
| JP | 02-094019 | 4/1990 |
| JP | 02-097659 | 4/1990 |
| JP | 02-288530 | 10/1990 |
| JP | 03-078104 | 4/1991 |
| JP | 03-198210 | 8/1991 |
| JP | 03-269804 | 12/1991 |
| JP | 03-324223 | 12/1991 |
| JP | H04-090110 | 3/1992 |
| JP | 04-091317 | 4/1992 |
| JP | 4103009 | 4/1992 |
| JP | 06-035569 | 3/1994 |
| JP | 06-089412 | 3/1994 |
| JP | 07-187016 | 7/1994 |
| JP | 06-243429 | 9/1994 |
| JP | 06-242827 | 10/1994 |
| JP | 06-301926 | 10/1994 |
| JP | 06-333210 | 12/1994 |
| JP | 09-138912 | 5/1997 |
| JP | 09-219006 | 8/1997 |
| JP | 09-219010 | 8/1997 |
| JP | 10-011714 | 1/1998 |
| JP | 10-198918 | 7/1998 |
| JP | H10-269526 | 10/1998 |
| JP | 11-039623 | 2/1999 |
| JP | 11-045402 | 2/1999 |
| JP | 11-242803 | 9/1999 |
| JP | 10-334435 | 12/1999 |
| JP | 11-353609 | 12/1999 |
| JP | 2002-308945 | 10/2002 |
| JP | A-2003-168203 | 6/2003 |
| JP | 2005-063623 | 3/2005 |
| WO | WO 97/05603 | 2/1997 |
| WO | WO 97/40493 | 10/1997 |
| WO | WO 99/50834 | 10/1999 |
| WO | WO 99/67777 | 12/1999 |
| WO | WO 00/51109 | 8/2000 |
| WO | WO 01/50463 | 7/2001 |

OTHER PUBLICATIONS

Yiqun, Li, et al. "Magnetic Properties and Crystal Structure of FeTaAlN Soft Magnetic Materials for MIG Head", (Abstract), 1996.

Albrecht, Thomas et al. "Time-Based, Track-Following Servos for Linear tape Drives", Data Storage, Oct. 1997.

Monigle, William C. "FIBs Probe and Fix Semiconductor Problems", Test & Measurement World, May 1988.

Fujiii, S. et al., "A Planarization technology using a bias-deposited dielectric film and an etch-backprocess", IEEE Transactions on, vol. 35, Issue 11, Nov. 1988, pp. 1829-1833.

McDermott, Michael, "Head Makers Discovery Focused Ion Beams", Data Storage, Mar. 1998.

R.C. Barrett, et al., "Timing based Track-Following Servo for Linear Tape Systems", IEEE Transactions on Magnetics, vol. 34, No. 4, Jul. 1998, pp. 1872-1877.

IBM TDB "Hybrid Thin R W Head with Bonding by Laser Beam", vol. 19, Issue No. 2, pp. 681-682 (Jul. 1976).

Dee et al., "Advanced Multi-Track Tape Head for High Performance Tape Recording Application", Mar. 1999, IEEE Transactions Magnetics, vol. 35, No. 2, pp. 712-717.

* cited by examiner

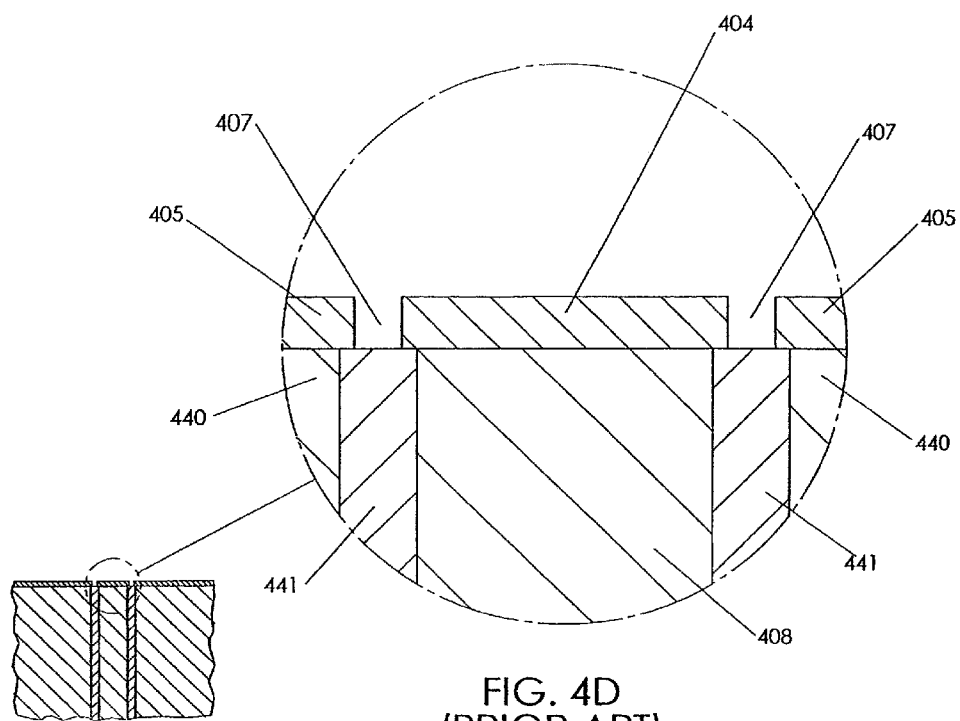
FIG. 4D
(PRIOR ART)
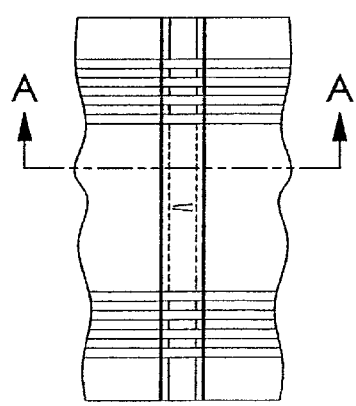

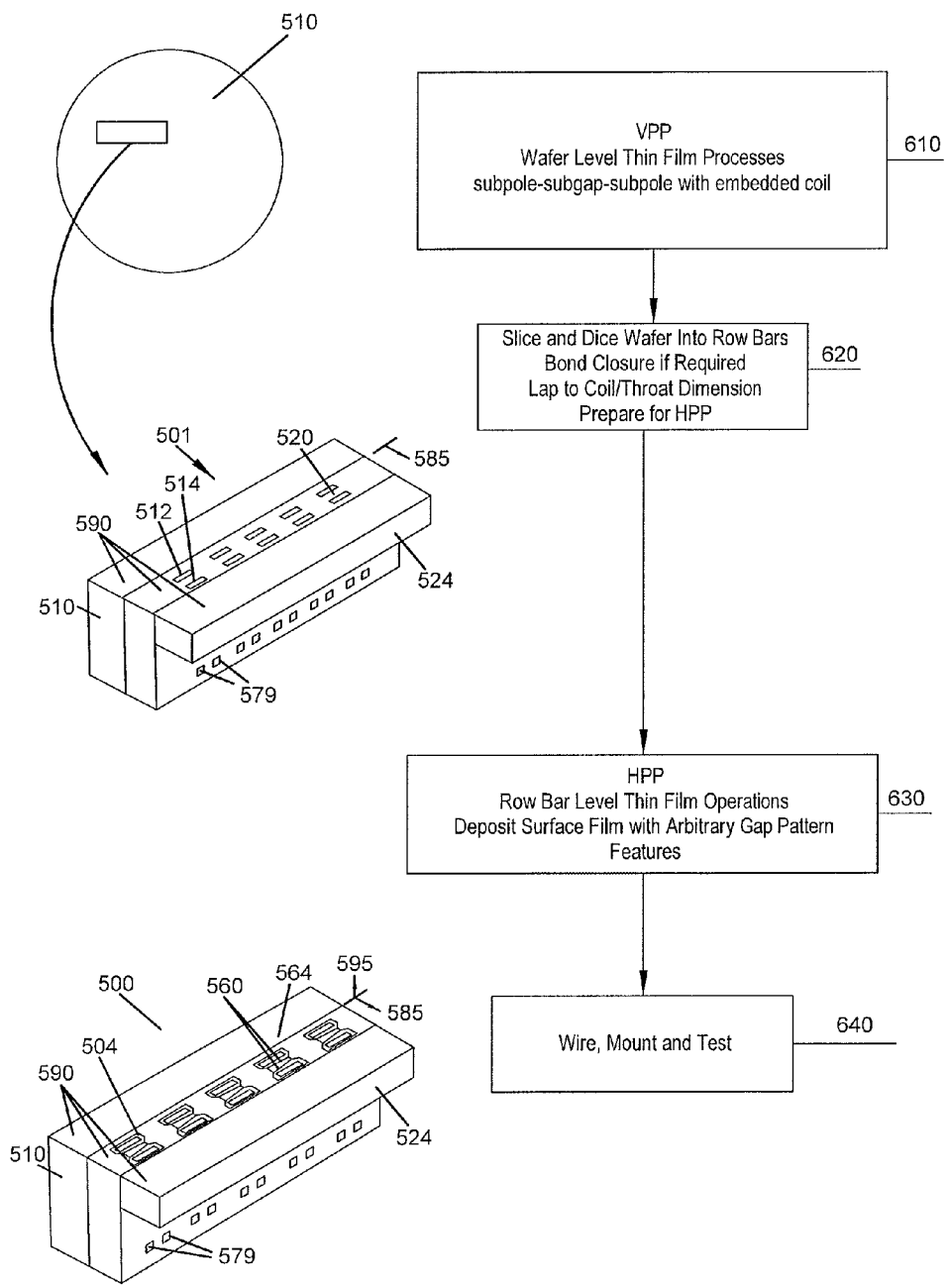

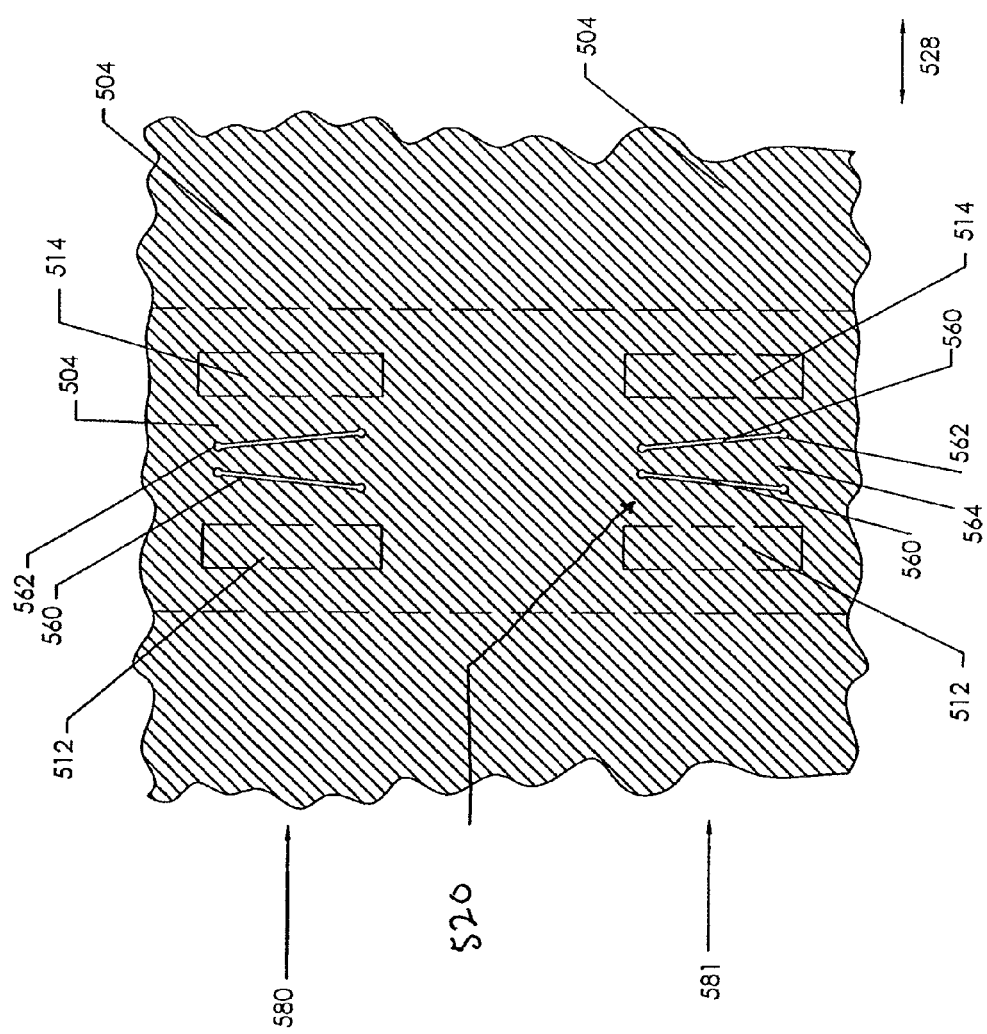

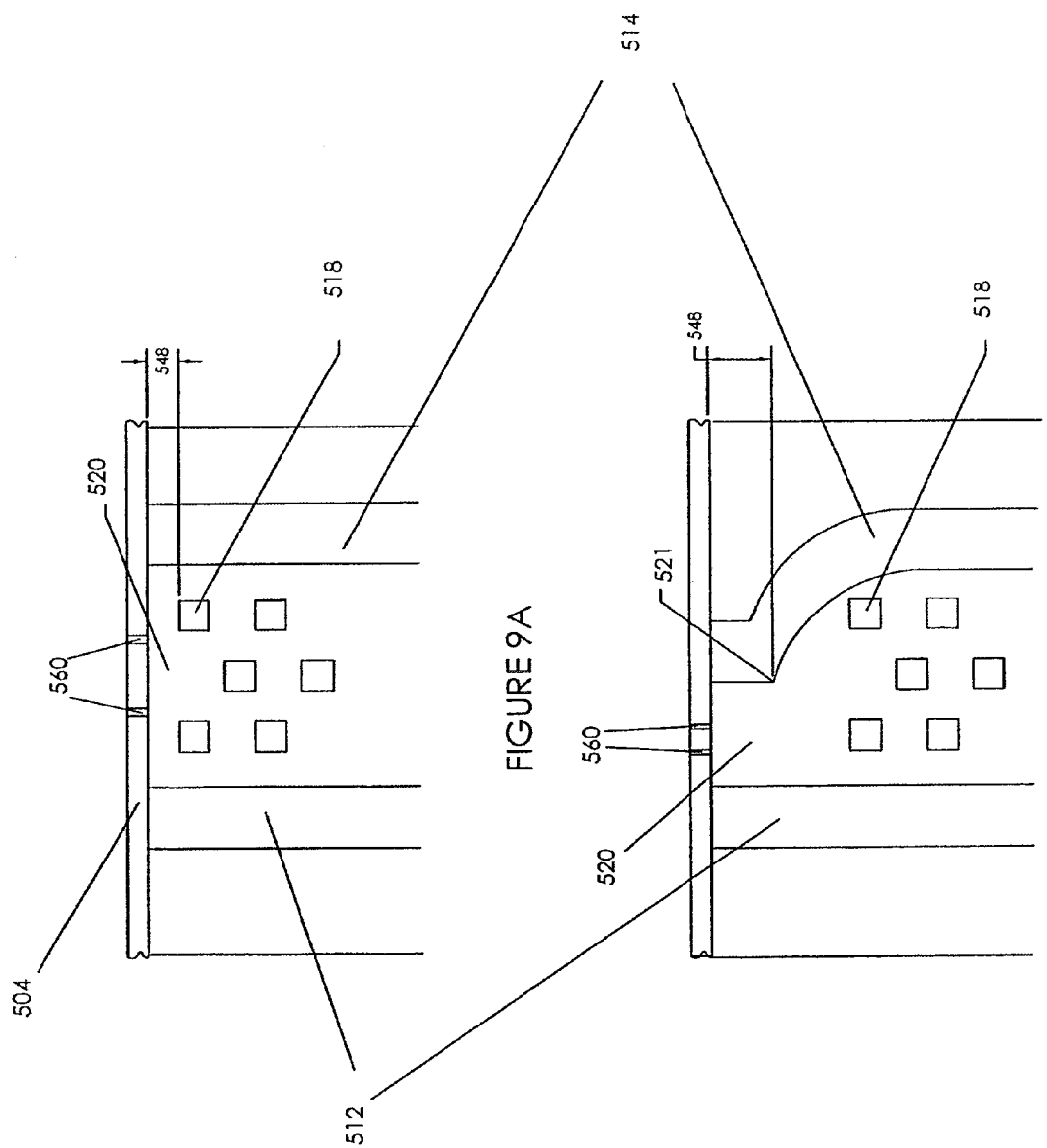

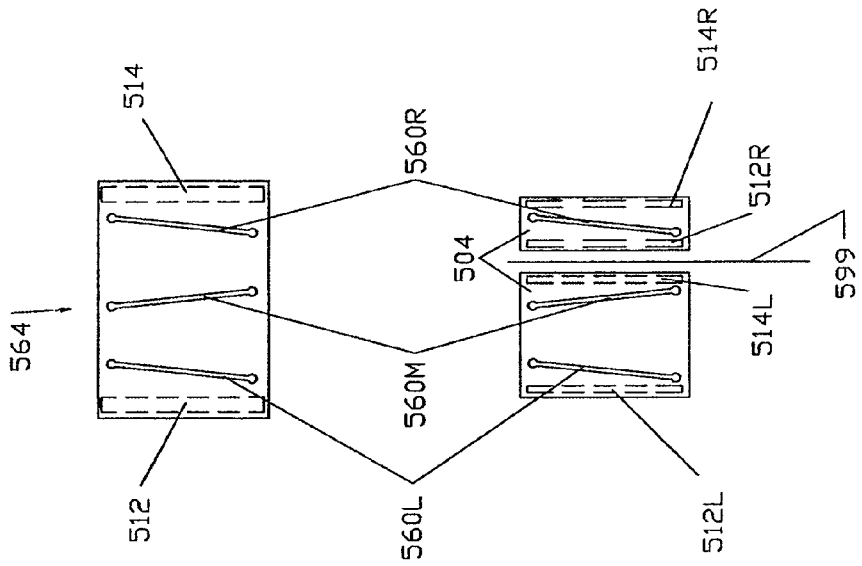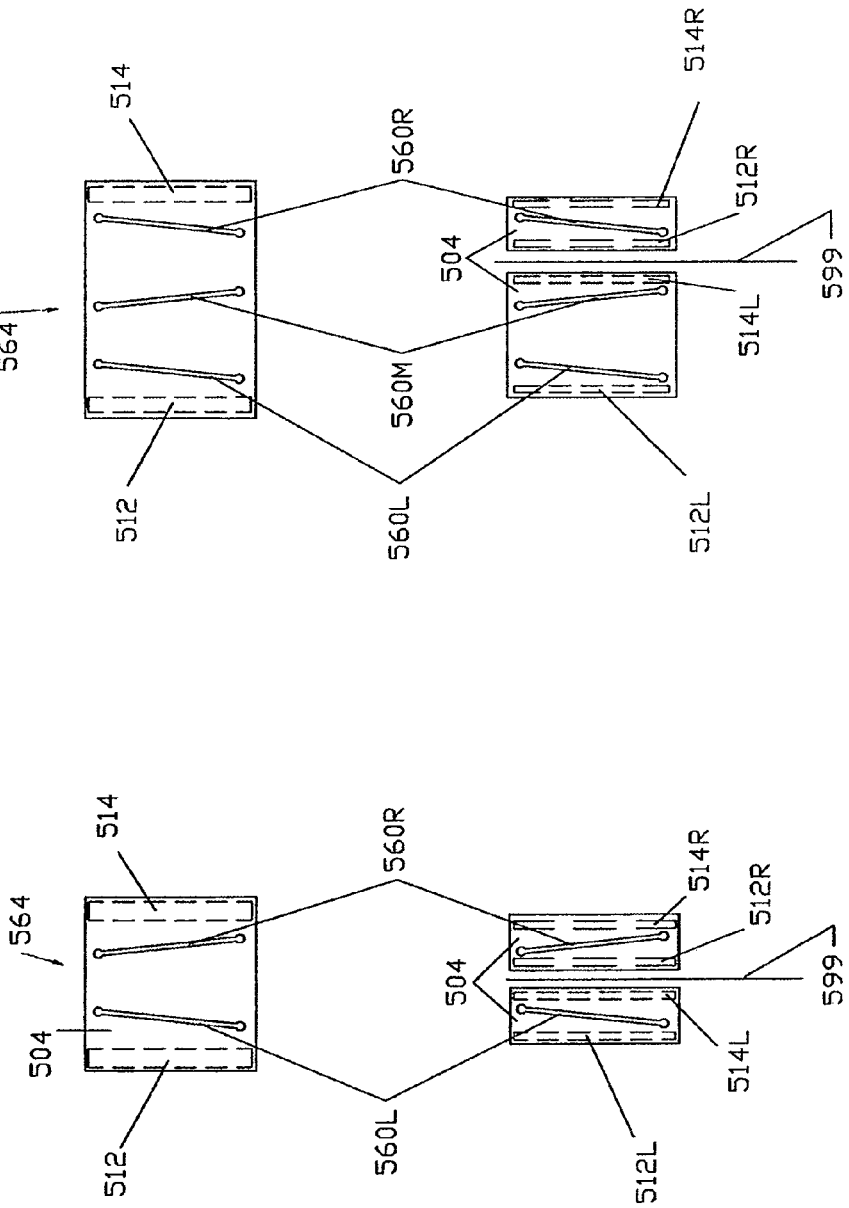

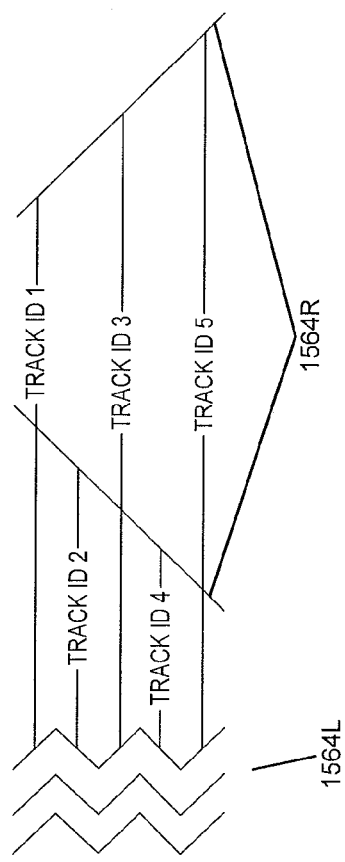
FIG. 13A
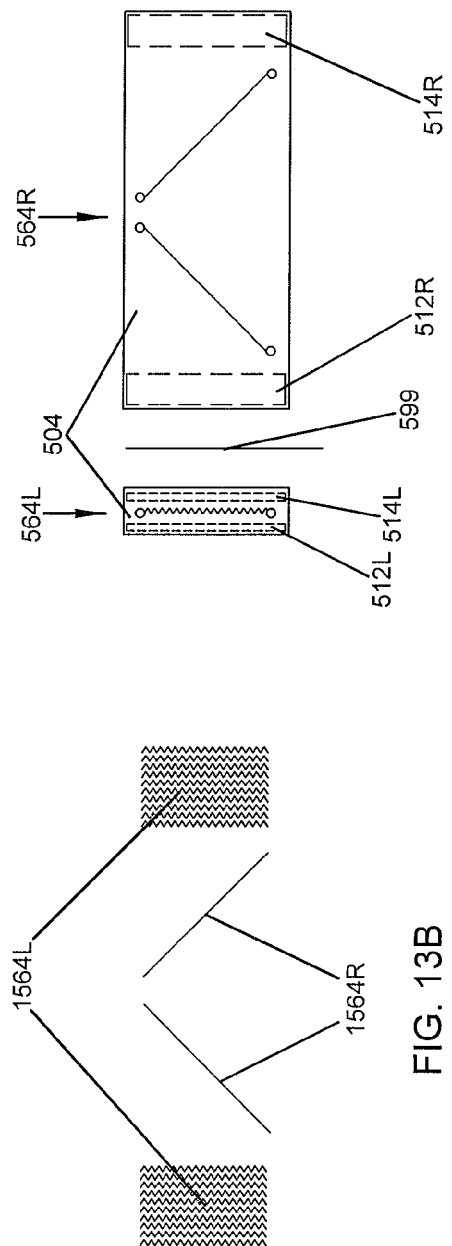
FIG. 13B
FIG. 13C

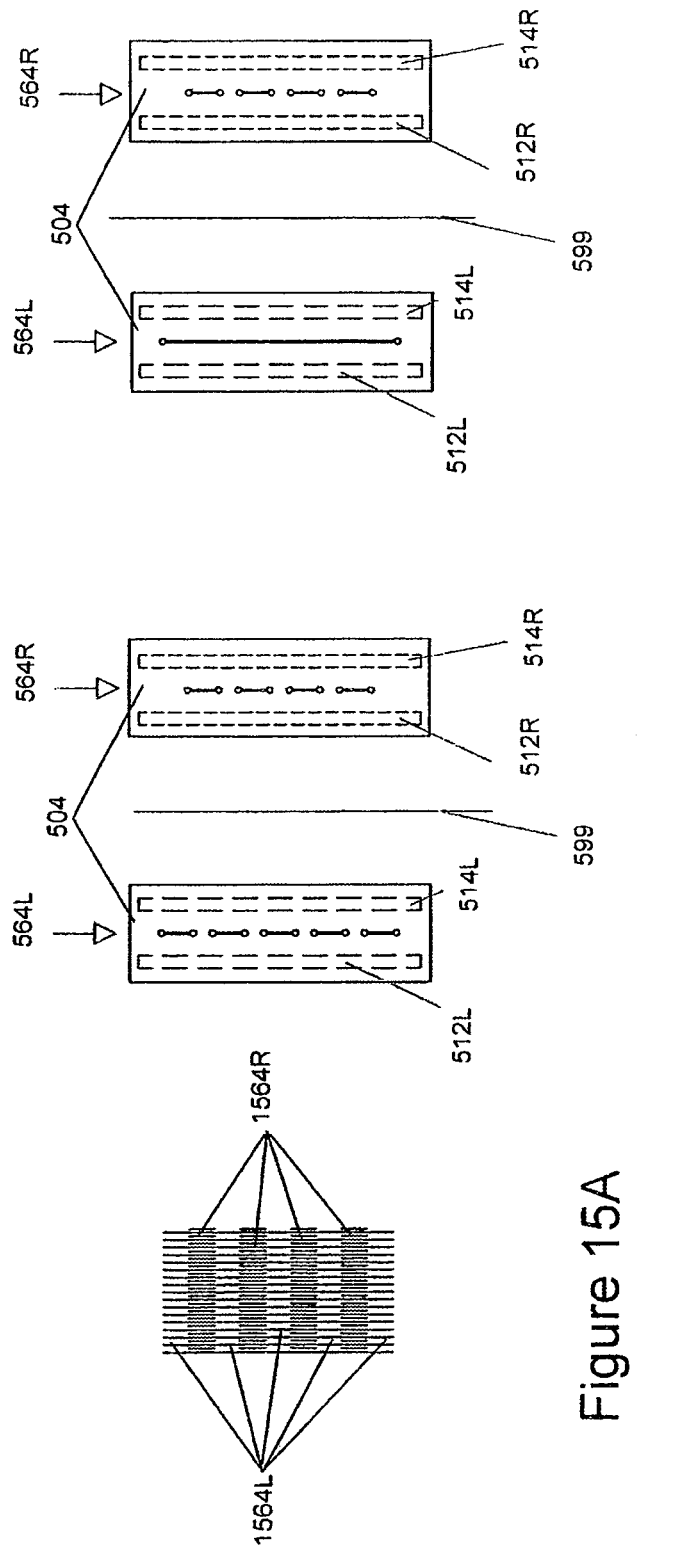

MAGNETIC MEDIA FORMATTED WITH AN INTERGRATED THIN FILM SUBGAP SUBPOLE STRUCTURE FOR ARBITRARY GAP PATTERN MAGNETIC RECORDING HEAD

CROSS-REFERENCE TO RELATED APPLICATION(S)

This application is a continuation of U.S. application Ser. No. 12/268,076, filed on Nov. 10, 2008, which is a continuation of U.S. application Ser. No. 11/120,640, filed on May 3, 2005, issued as U.S. Pat. No. 7,450,341 on Nov. 11, 2008, which claims benefit of priority to U.S. Application No. 60/568,139 filed May 4, 2004, each of which are incorporated in their entirety herein by reference.

FIELD OF THE INVENTION

This invention relates generally to magnetic recording heads and more particularly to head designs for the manufacture of heads with arbitrary shaped gaps used in high density tape data storage systems where such data storage systems may require complex arbitrary gap structures as in the case of servo format heads, advanced servo heads to enable patterns for the future or advanced angled gap write heads as in the case of azimuthal recording schemes.

BACKGROUND OF THE INVENTION

While a variety of data storage mediums are available, magnetic tape remains a preferred technology for economically storing large amounts of data. To facilitate the efficient use of this particular magnetic medium, magnetic tape is widely used in so-called multi-channel, linear tape format in which a plurality of servo and data tracks extend in the longitudinal direction of the tape. Magnetic track transitions embodying recorded data or servo information may be written into tracks with a variety of orientations.

After one or more write elements record data on the tape, one or more data heads containing one or more read elements will read the data from those tracks as the tape advances in the longitudinal or transducing direction in which the magnetic transitions move past the head to be read back. It is generally not feasible to provide a dedicated head or element for each data track, therefore, a multi-channel head(s) must move across the width of the tape, and each data channel head element accesses a large number of data tracks dedicated specifically to that head channel element. At each track the element must be accurately centered over the data track. In very high density cases this cannot be achieved by mechanical means alone, and a track following servo is employed where dedicated servo read elements read a band of prerecorded servo tracks which correspond to specific data tracks in each data band associated with a given data (read or write) element. The servo band is used in controlling the translational movement of the head(s). The servo band is used not only to position the head(s) on the correct track but also to keep it on the track once it has arrived at the track.

The servo track contains data, which when read by the servo read element, is indicative of the relative position of the servo read element with respect to the magnetic media in a translating direction. In one type of traditional amplitude based servo arrangement, the servo track is divided in half. Servo data is recorded in each half track, at different frequencies. The servo read element is approximately as wide as the width of a single half track. Therefore, the servo read element determines its relative position by moving in a translating direction across the two half tracks. The relative strength of a particular frequency of servo signal would indicate how much of the servo read element is located within that particular half track. The trend toward thinner and thinner magnetic tape layers causes amplitude modulation problems with this and other amplitude based heads. That is, as the thickness of the magnetic layer decreases, normal variations on the surface represent a much larger percentage variation in the magnetic layer, which may dramatically affect the output signal.

One type of servo control system was created which allows for a more reliable positional determination by reducing the amplitude based servo signal error traditionally generated by debris accumulation, media thickness non-uniformity and head wear. U.S. Pat. No. 5,689,384 (Albrecht, Barrett, and Eaton, IBM), incorporated herein by reference in its entirety, describes using a timing-based servo pattern on a magnetic recording head.

In a timing-based servo pattern, magnetic marks (transitions) are recorded in pairs within the servo track. Each mark of the pair is angularly offset from the other. For example, a diamond pattern has been suggested and employed with great success. The diamond extends across the servo track in the translating direction. As the tape advances, the servo read element detects a signal or pulse generated by the first edge of the first mark. Then, as the element passes over the second edge of the first mark, a signal of opposite polarity will be generated. Now, as the tape progresses, no signal is generated until the first edge of the second mark is reached.

Once again, as the element passes the second edge of the second mark, a pulse of opposite polarity is generated. This pattern is repeated indefinitely along the length of the servo track.

Therefore, after the element has passed the second edge of the second mark, it arrives at another pair of marks. The time it took to move from the first mark to the second mark is noted. Additionally, the time it takes to move from the first mark (of the first pair) to the first mark of the second pair is similarly noted.

The ratio of these two time components is indicative of the position of the read element within the servo track, in the translating direction. As the read head moves in the translating direction, this ratio varies continuously because of the angular offset of the marks. It should be noted that the servo read element is relatively small compared to the width of the servo track. Ideally, the servo element is smaller than one half the width of a written data track. Because position is determined by analyzing a ratio of two time/distance measurements, taken relatively close together, the system is able to provide accurate positional data, independent of the absolute speed of the media. In such systems, the variations in the speed need to be relatively well controlled.

Once the position of the servo read element is accurately determined, the position of the various data read elements can be controlled and adjusted with a similar degree of accuracy on the same substrate. Namely, the various read elements are fabricated on the same substrate with a known and, generally, the same spacing between them. Hence, knowing the location of the servo element allows for a determination of the location of all the data elements.

When producing magnetic tape, or any other magnetic media, the servo track is generally written by the manufacturer. This results in a more consistent and continuous servo track, over time. To write the timing-based servo track described above, a magnetic recording head bearing the particular angular pattern as its gap structure is utilized. To achieve maximum accuracy in the servo positioning signal, it is necessary to write a very accurate servo pattern. This means that a very precise servo recording element must be fabricated.

In the case of azimuthal recording schemes for linear multi-channel tape, as disclosed in the Large Angle Azimuthal Recording System ("LAAZR") patents applied for by Schwarz and Dugas, having Ser. No. 10/793,502, filed Mar. 4, 2004, which are incorporated in their entirety by reference, there exists a need for arbitrary shaped gaps for the servo writing elements, as well as the write and read elements, to have large angle gap features. This later can be addressed by making a large angle mechanical placement of non-angular thin film head row bars into a slider assembly. The proposed head of this invention may simplify the need for the large angle mechanical placement and result in a simpler slider assembly, in particular for the write head of such a system.

Two general types of recording heads, each having the capability of multiple arbitrary slanted gap features, such as those for timing-base servo patterns on tape media, are generally known. One type is a ferrite composite substrate assembly with a horizontal surface film process and the other type is that of a horizontally processed pure integrated thin film head.

The first type, perhaps the most simple, is a ferrite ceramic composite structure as disclosed in U.S. Pat. No. 5,689,384 (Albrecht, Barrett, and Eaton, IBM), in U.S. Pat. No. 6,269,533 (Dugas, ARC) and U.S. Pat. No. 6,496,328 (Dugas, ARC).

The second type, a pure horizontal planar process thin film head, is disclosed by Aboaf, Dennison, Friedman, Kahwaty, and Kluge in U.S. Pat. No. 5,572,392 and in U.S. Pat. No. 5,652,015. In these patents, the process is referred to as a single major plane process. That process is referred to herein as Horizontal Planar Process ("HPP") since the plane of processing in that head substrate lies parallel to the tape bearing surface. Indeed the first type, the Albrecht reference and the Dugas reference heads also use the HPP approach; however, those heads are not fully integrated and use a composite ferrite/ceramic substrate structure with a wound coil.

With a pure integrated thin film head, all of the components of the head are created from depositing and patterning different layers of materials, as thin films, generally on a substrate. For example, the magnetic core, the windings and any low permeability barrier materials are formed by producing thin films. In some designs which employ a magnetic substrate or wafer, such as Ni—Zn ferrite, this magnetic substrate may end up as a shield or a pole or as part of a magnetic yoke.

The integrated thin film head design and process of Aboaf is capable of multiple arbitrary slanted gaps as required of timing-base servo systems precisely because of the horizontal planar process used in that head construction. While this head solved the arbitrary gap limitation of the standard thin film head industry process, such a head is extremely difficult to manufacture and has not been produced commercially.

The typical integrated thin film tape or disk head process is herein referred to as a Vertical Planar Process ("VPP") since the plane of processing in that wafer is perpendicular or vertical to the tape bearing surface. This process is used almost exclusively in the thin film head industry. The VPP technique as used in data heads, as is easily understood from the referenced patents, cannot make slanted gaps or pairs of oppositely slanted gaps as required by timing-base servo heads and complex azimuthal recording schemes. Hence, to date, pure thin film heads such as those that are made from VPP techniques are not suitable for timing-based heads, and those made from a fully integrated HPP technology are not seen as practical to produce such a magnetic head, each for different reasons.

FIG. 1A is a side cross sectional view that shows a prior art conventional thin film VPP magnetic data head 100 for use in data recording on magnetic media such as disks or tape. This head consists of a generally non-magnetic substrate 110, a layer of polished alumina 111, a sputtered or plated first magnetic pole 112, an insulating gap layer 120 which is generally alumina, coils 118, an insulating layer 117 which encompasses coils 118, a second magnetic pole piece 114, a planarized overcoat layer 122, and typically in the case of tape heads, a nonmagnetic closure piece 124. A magnetic tape medium 126 moves in a direction as shown by arrow 128 operating in a motion transverse to the poles pieces 112 and 114 and over a bearing surface 129. The head is lapped to a gap depth 148 which is the distance from the tape bearing surface 129 to the apex point 121 of the second pole 114 usually involving the use of lapping guides, made during the wafer fabrication process. Direction arrow 185 shows the direction of film layer growth from the wafer substrate surface.

Typically, VPP heads cannot be manufactured with a set of angled gaps as required for timing-based servo heads. This is shown in FIG. 1B which is a top view of the prior art of FIG. 1A. The gap 120 of such a process is essentially planar or parallel to the wafer 110 surface. This makes it difficult, if not impossible, to make an angled gap, and the extension to multiple angled gaps in one head channel seems even more improbable.

An integrated horizontal magnetic head design solves this limitation of planar gaps. This head as shown in the cross section of FIG. 2A and the top view of FIG. 2B, takes advantage of processing in a different major plane from the head of FIG. 1. This head uses an HPP wafer construction to distinguish it from the VPP wafer construction of the thin film head of FIG. 1.

With such an HPP approach, the arbitrary gap structures required for timing-base servo systems can be realized. In addition to the previous cited Aboaf patents '392 and '015, other examples of this type of head include the head of U.S. Pat. No. 4,837,924, Jean-Pierre Lazzari, issued on Jun. 13, 1989, and titled "Process For The Production Of Planar Structure Thin Film Magnetic Recording Head," and the head of U.S. Pat. No. 5,768,070, by Krounbi and Re, issued on Jun. 16, 1998, and titled "Horizontal Thin Film Write, MR Read Head." These types of heads are sometimes referred to as "horizontal heads" in the industry.

Head 200 is illustrated in FIG. 2A, the magnetic back yoke 236 is either a ceramic magnetic substrate or a deposited magnetically permeable layer on a ceramic substrate. One write element 232 is shown in cross section. Coil 238 is shown in a 4 turn configuration. Horizontal top poles 242a and 242b conduct the flux from the back yoke 236 to the main recording gap 234 at the surface of the head. Feature 240 is a coil insulating layer. Typically a hard nitrided layer is used for the upper magnetic film 242b. Gap 234 can be defined on any arbitrary angle as shown in the top planar view of FIG. 2B. Direction arrow 285 shows the direction of film growth from the substrate surface in FIG. 2A and FIG. 2B. The recording medium is shown as 226 and moves in the direction as shown by the arrow 228 in both FIGS. 2A and 2B.

Regarding the top view of FIG. 2B, the arbitrary gaps as shown are angled 234b and straight 234a. Coil 238 is shown in a 4 turn configuration. Each of the write elements 232 are shown coupled to a common coil 238. The tape span 226 is shown to illustrate that head support structure and coil 238 extend outside the tape path and allows for the leads to be attached to bond pads 237.

The head just described in FIGS. 2A and 2B has the flexibility of arbitrary gap angles. However, it is not clear that the standard ion milling technique proposed to etch the gaps will result in good gap wall definition due to the well known aspect ratio considerations in such a milling technique. Moreover, from a consideration of the layout of the coil upon the surface plane as shown in FIG. 2B, it may be difficult to have each write element 232 independently addressable with a separate coil. Bringing coil terminations and leads out of the tape bearing plane of the head may pose a design issue for the head assembly.

The surface film heads used commercially today for servo tape formatting of arbitrary angles gaps are made of structures and techniques proposed by the heads shown in FIGS. 3 and 4, respectively. These heads are made with a horizontal planar or surface thin film process in combination with a ferrite/ceramic composite substrate. The substrate carries the subgap embedded within it. The heads, as taught in '384, and in '328, are practical heads used to make arbitrary slanted gaps. These types of heads are referred to herein as composite ferrite/ceramic surface film heads.

Head 300 is illustrated in the prior art FIG. 3A. The composite ferrite/ceramic surface film head 300 includes two ferrite blocks 308, 306 that are bonded to a ceramic member 311 that extends the entire width of the head 300. Surface 390 is contoured and polished in preparation for film deposition. A magnetically permeable thin film 304 is deposited over an upper surface 390 of the ferrite blocks 308, 306 and the exposed upper portion of the ceramic member 311. Air slots 312 serve to reduce air entrainment of the tape.

Servo writing gap patterns 314 are formed in the thin film 304, in a well defined arbitrary gap pattern. Winding 320 is wound around 306 and is electrically driven to produce magnetic flux around the ferrite core 306 and through the thin film 304. The flux leaks from the gaps 314 and writes media (not shown) passing over it.

The detail of the gap structure is shown in FIG. 3B. Gap pattern 314 is composed of angled gaps 330 and pattern termination feature 332.

This head has a rather large inductance and, therefore, relatively slow write current rise time. It is also a single drive element design that serves to drive two or more servo elements made into the magnetic film 304 spanning over the subgap formed by ceramic member 311. In this head flux can leak around the gap pattern as the flux is not well confined to the recording gaps 314 unless the head is driven to saturation with extremely high current levels.

The inductance related rise time issues, the lack of independently driven write elements, and the writing uniformity issues were addressed successfully by the prior art head design of patent '328. This head 400 is illustrated in FIG. 4A and in detail in FIGS. 4A-4D.

Head 400 of FIGS. 4A-4D is made of a complex ferrite ceramic composite structure as shown in FIG. 4A. As shown in the detail of single element 450 of FIG. 4B, ferrite core pieces 408 and 406 form the driving poles about a ceramic I-bar which serves as a non-magnetic subgap, 411. Air bleed slots 412 are shown. The subgap 411 in combination with the ferrite subpoles and ferrite back bar closure 430 form an efficient magnetic circuit, which when energized with an electrical current in coil 420; drives magnetic flux through the highly permeable surface thin film layer 404, which spans the subgap from one ferrite member to the other. The flux that is driven across this surface film intercepts the arbitrary shaped gaps 414 that have a stray field that impresses flux onto the recording medium. The detailed shape of the gaps 414, as seen in FIG. 4C, and the write current waveform determine the marks that are recorded onto the medium. As seen in FIG. 4A, ceramic members 440 serve as non-magnetic element spacers and in one embodiment can serve as a tape bearing surface. Glass bond area 441 of FIG. 4C and FIG. 4D, separates the active head element 450, of FIG. 4B and FIG. 4C, from the ceramic spacers 440 on either side as shown in FIG. 4C. The gap pattern 414 may be formed as part of the plating process of the surface film 404, or they may be formed in a subsequent photolithographic etch or other etch processes such as that taught in the '533 patent. The surface film may be etched or deposited into two non-interacting parts. Surface film 404 is magnetically active as it is part of the active head element 450. As shown in FIG. 4D, surface film 405, although of the same deposit as surface film 404, is inactive as it has been separated from 404 by slot 407. Slot 407 may be created by broad beam ion milling or by selective plating. Isolation element slot 407 is typically 30 to 70 microns in width and serves to completely decouple 405 from 404 and to render 405 inactive as a magnetic flux conduction element. However, film 405 does act as a tape bearing member. Such details may be seen in the cross-section of FIG. 4D. This is the subject of the Wear Pads patent application which is a continuation of '528.

Therefore, with full consideration of the background art described, it is desired to find a way to make an even more efficient multi-element servo head that will have even lower inductance and, hence, higher frequency capability and which will serve as a superior platform for the manufacture of complicated multi-gap structures envisioned in the future of magnetic servo tracks for high track density tape products.

SUMMARY OF THE INVENTION

The present invention relates to a low inductance, high efficiency surface-film, thin film magnetic recording head and a method of fabricating the same. This head is created by using a vertical planar process thin film head wafer technology in combination with a horizontal planar process surface film head processing at the row bar level.

An arbitrary gap pattern head assembly for the writing and verification of servo patterns on tape is provided which utilizes, in its manufacture, two major thin film process planes and comprises: (a) upon the first major process plane is made, a thin film subgap subpole substrate structure and from which obtains one or more bar structures, each one having one or more recording elements each element with two driving subpoles, one nonmagnetic subgap, a thin film coil or portion thereof and (b) upon the second major process plane, which is generally orthogonal to the first major process plane, is made a magnetically permeable thin film which spans at least from one subpole to the other subpole of each recording element and which contains an arbitrary gap structure suitable for writing or reading on high track density magnetic tape. A method of batch fabricating the same where such methods enable the fabrication of arbitrary slanted gap recording heads commonly practiced in the video recording art or complex servo pattern gap recording heads practiced in the high density tape data storage market.

Modified slanted gap structures of the timing based servo writer to improve efficiency and linearity of the servo signal are also described.

BRIEF DESCRIPTION OF THE DRAWINGS

FIG. 4D is a cross section of one element of the prior art head showing the flux carrying active film member as distinct from the tape bearing inactive film member by Dugas.

FIG. 6 is a block diagram describing the overall process for constructing a surface film subgap recording head, the initial wafer level VPP process and the subsequent HPP row bar level process.

FIG. 7C shows a top partial view showing two elements of the subgap subpole substrate and the region in-between the elements and with the surface thin film disposed thereon and with the gap features placed in the surface film.

FIG. 9A shows a cross section of a multi-layer coil structure with no apex feature.

FIG. 9B shows a cross section of a multi-layer coil structure with an apex and subgap depth feature.

FIG. 12A is a top plan view of a subgap subpole layout for a dual gap timing base head element.

FIG. 12B is a top plan view of a subgap subpole layout for a dual gap timing base head element where each gap is independently written using a unique element of compound head structure.

FIG. 12C is a top plan view of a subgap subpole layout for a three gap timing base head element.

FIG. 12D is a top plan view of a subgap subpole layout for a three gap timing base head element wherein the left hand and middle gaps are written by using one unique element of a compound head structure and the right hand gap is written by using another unique element of a compound head structure.

FIG. 13A is a top view of the track identification and format scheme based on the large angled azimuthal recording servo format.

FIG. 13B shows, in part, a top view of the transitions on tape of the large angled azimuthal recording servo format.

FIG. 13C shows, in part, a top view of the compound subgap subpole head that can be used to record the transitions on tape of the large angled azimuthal recording servo format.

FIG. 15A is a top view of the magnetic transitions of a combination two frequency amplitude servo format.

FIG. 15B shows, in part, a top view of a compound head system which can record the combination two frequency amplitude servo format.

FIG. 15C shows, in part, a top view of a another compound head system which can record the combination two frequency amplitude servo format.

DETAILED DESCRIPTION OF THE PREFERRED EMBODIMENT

Figure 1A:
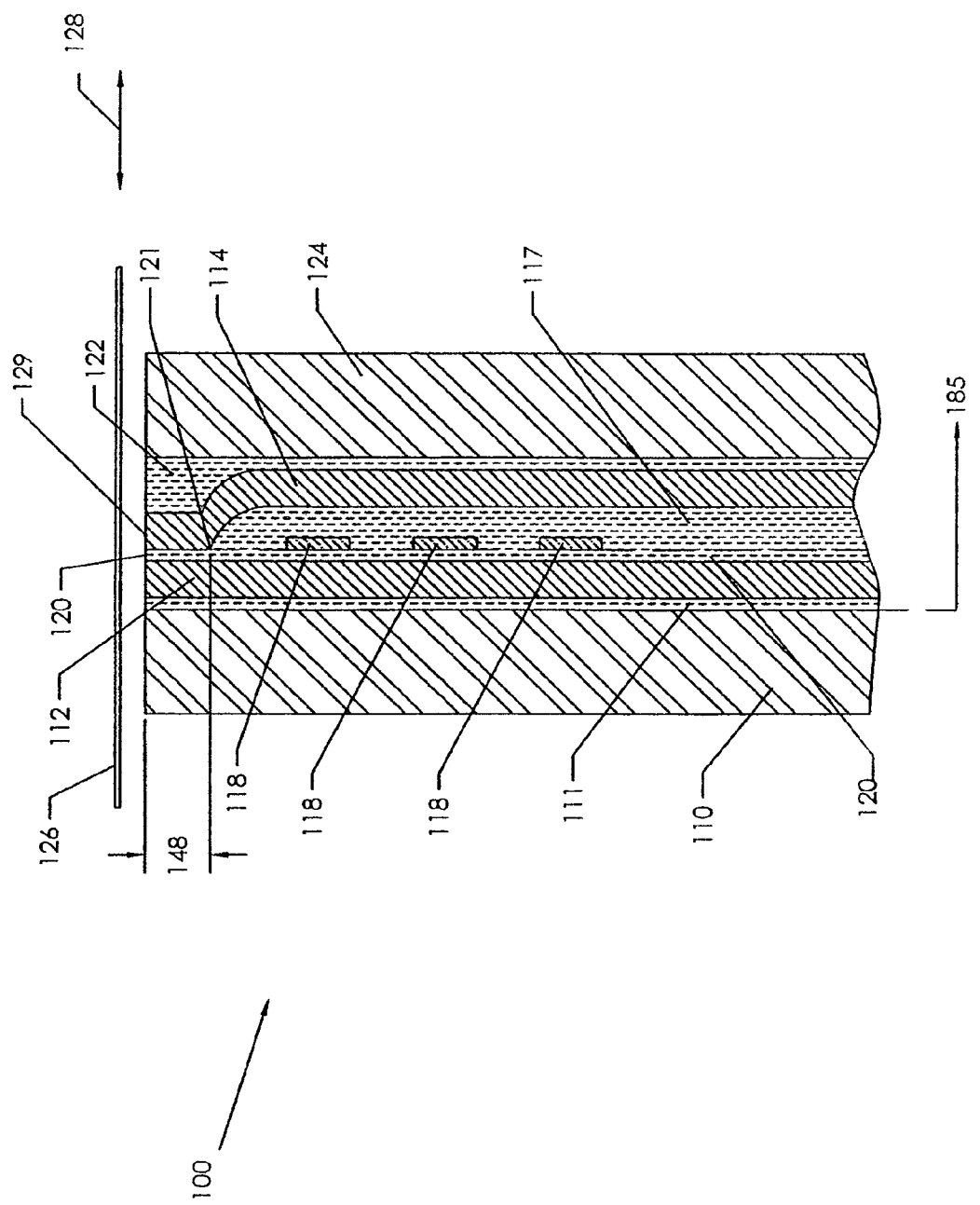
FIG. 1A is a side view cross-section of a prior art vertical planar process thin film head.

The present invention is a fully integrated arbitrary gap recording head which may contain single or multiple head elements and methods of making the same. The present invention enables the formation of a magnetic subgap and subpole row bar substrate from a wafer level process. This substrate is in turn used in a subsequent process in which an arbitrary gap pattern may be formed upon the subgap in-between the subpoles. The arbitrary gap pattern will be made in a magnetic thin film and will be driven by magnetic flux emulating from the subpoles. In various embodiments of the head of the present invention, the structure provides a head with operating efficiencies over prior-art heads and manufacturing efficiencies over prior art heads. For instance, a head of the present invention may provide a highly efficient multi-element recording head having a relatively high frequency response suitable for use as a servo write or a servo verify read head, and suitable for use as a data write head.

In one embodiment, the present invention relates to a low inductance, high efficiency surface-film, thin film magnetic recording head and a method of fabricating the same. This head is created from the utilization of traditional vertical planar processing ("VPP"), used to manufacture wafer which is then processed into row bars. The row bars are then processed to accept a ceramic closer piece. A ceramic closure piece is bonded, and this combination is further processed through grinding and lapping operations to specific dimension, surface finish and contour to form a basic head structure which is then prepared for horizontal planar processing ("HPP") of the surface spanning magnetic thin film. The HPP is used to prepare the basic head gap structures which form various embodiments of the integrated head of the present invention. The HPP process is essentially a surface film head process.

A result of this overall construction technology and head design is to form an integrated thin film multi-element subgap subpole magnetic head substrate upon which is made a surface film head with an arbitrary gap. Also, this process may provide a magnetic recording head having multiple elements wherein each element is separately and individually controllable and isolated from the next. Alternatively, the head may have a single driving channel with multiple arbitrary gap channels all driven by a common subgap subpole and coil system.

The head design of this invention using the VPP and HPP technologies in combination is now explained in detail.

With reference to FIGS. 5A through 5D, an embodiment of a method for making a head of the present invention is described. The flow chart of this process is schematically shown in FIG. 6.

As generally shown in the figures, the method to manufacture a head of the present invention includes combining a wafer level VPP process (block 610, FIG. 6) which results in a wafer that can be sub-divided into row bars (block 620, FIG. 6) which are in turn used in a row bar level HPP process (block 630, FIG. 6) to form the finished head structure (block 640, FIG. 6). In summary, both VPP and HPP thin film head techniques are combined to make a versatile arbitrary gap magnetic recording head.

Figure 1B:
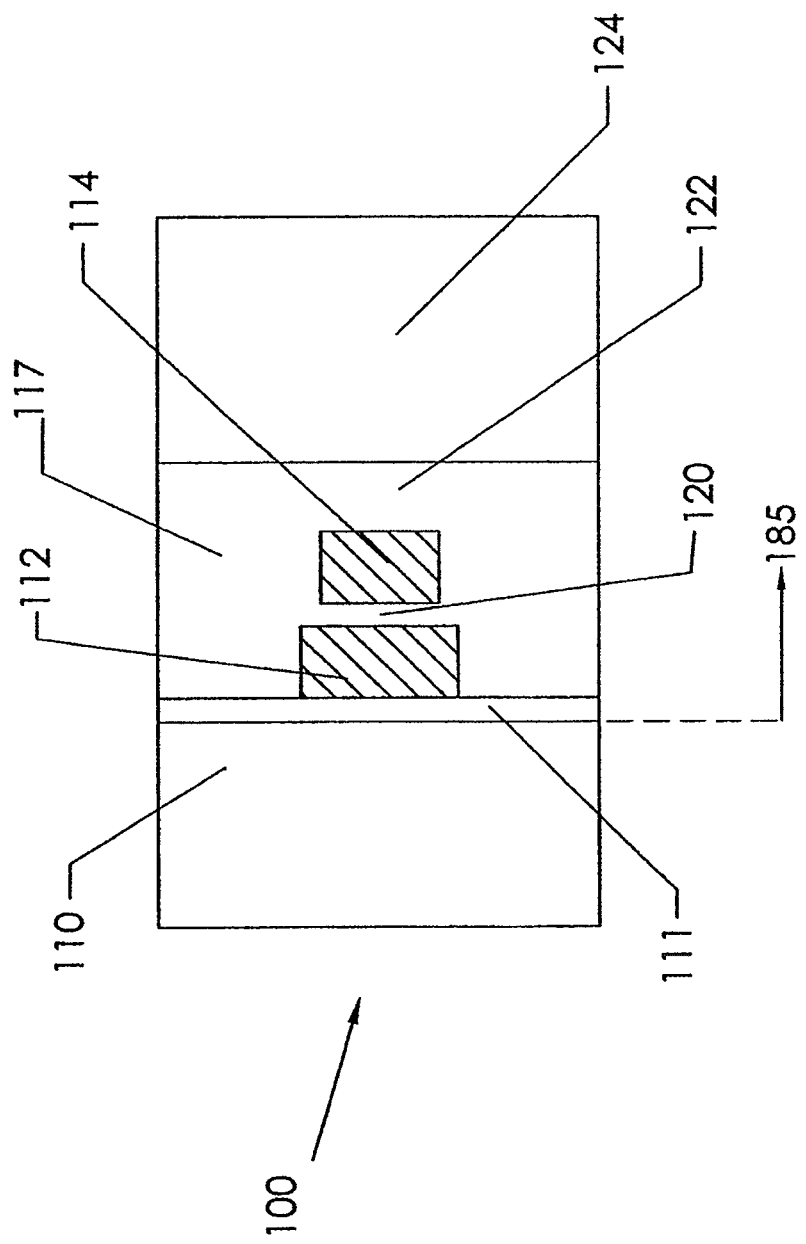
FIG. 1B is a top planar view of the prior art vertical planar process thin film head.
Figure 2A:
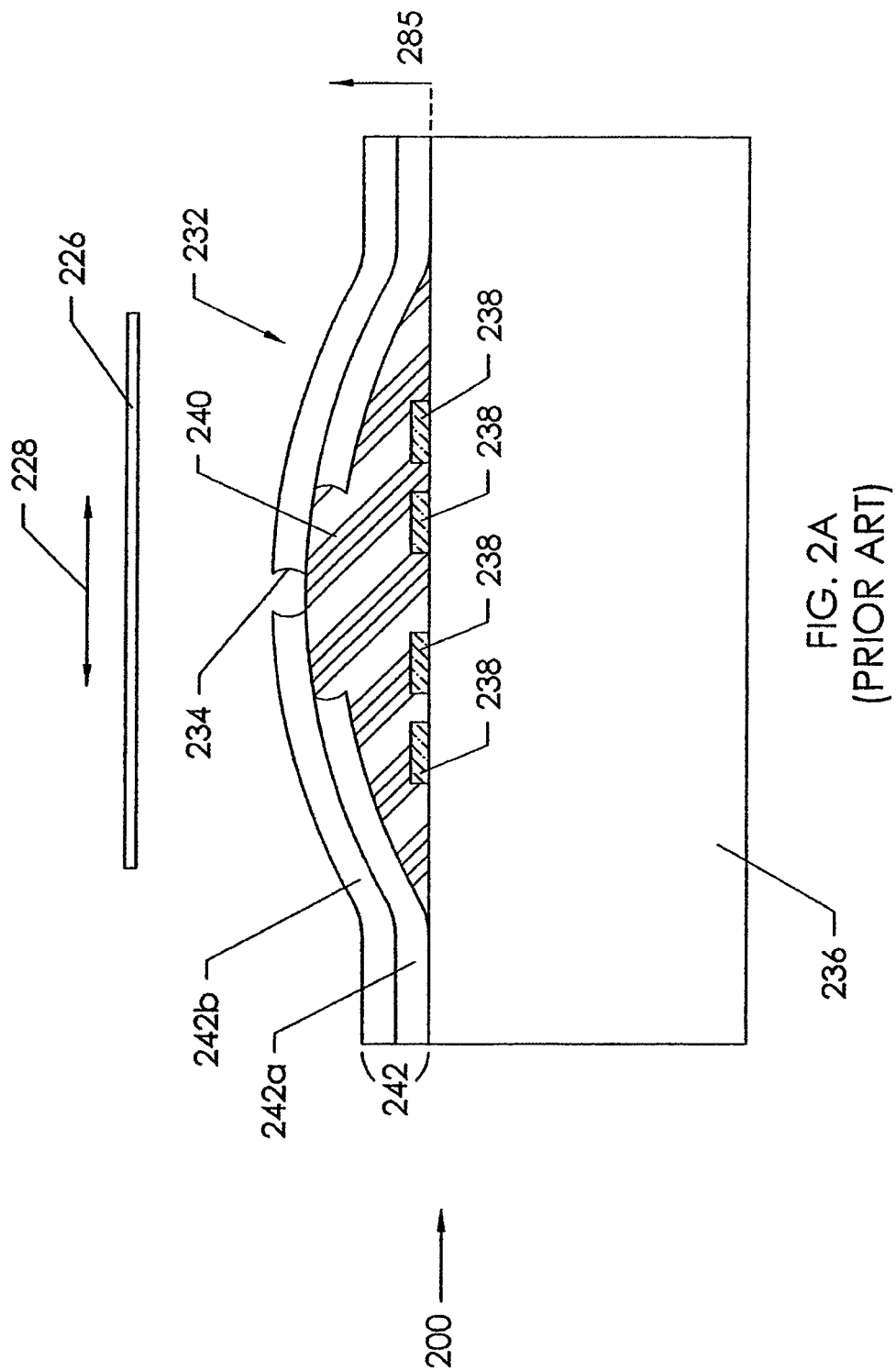
FIG. 2A is a side view cross-section of a prior art horizontal planar process thin film head by Aboaf, et. al.
Figure 2B:
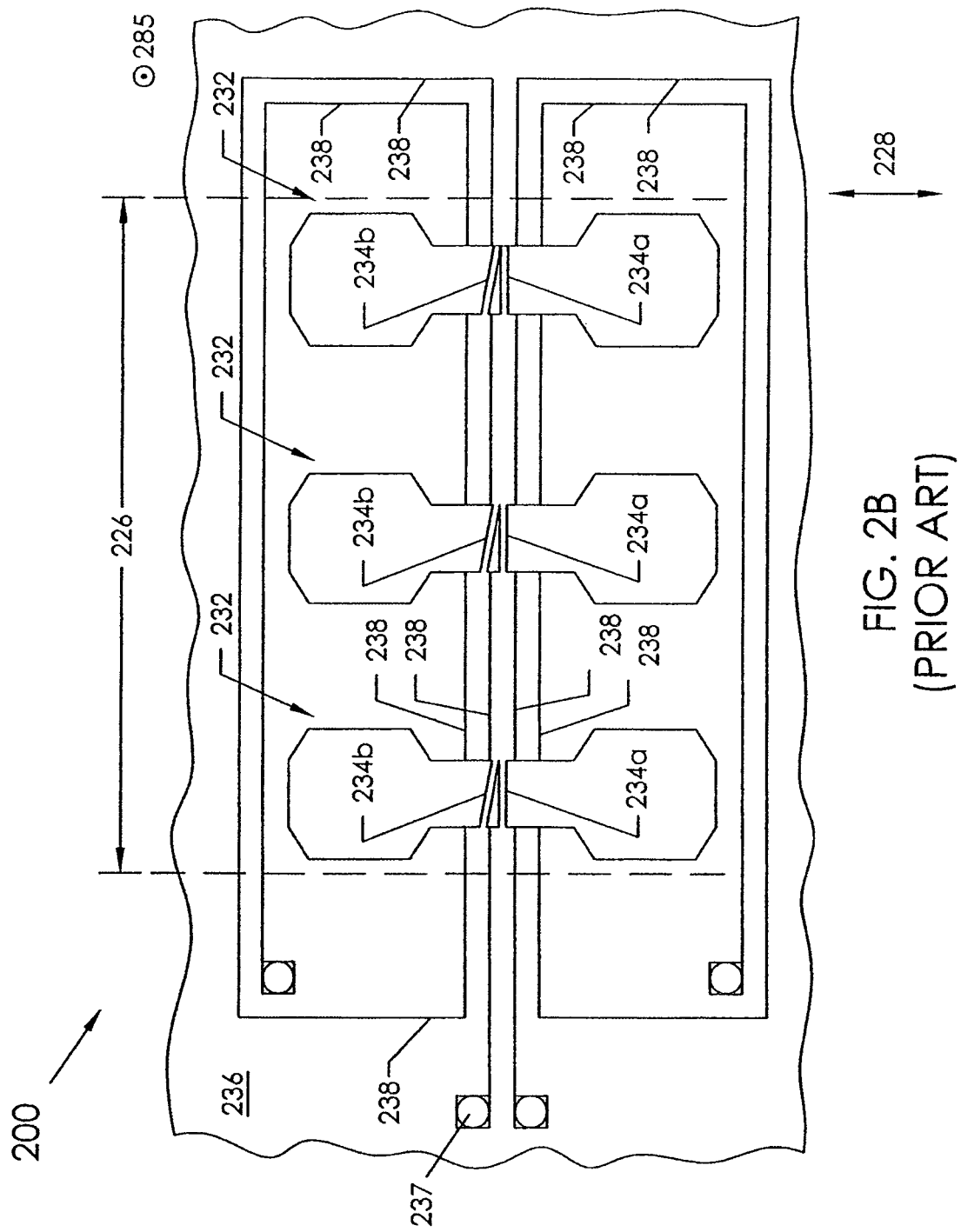
FIG. 2B is a top view of the prior art horizontal planar process thin film head by Aboaf, et. al.

The general VPP as described in FIGS. 1A and 1B of the prior art is modified to design and manufacture a thin film subgap and subpole substrate. The thin film subgap subpole VPP is similar to that as used in thin film write heads, but is specifically different in terms of achieving the design requirements of an arbitrary multiple gap pattern recording head. For example, there may be a requirement for new or more planarization steps since the subgap layer may be much thicker than a typical record gap. The large gap understructure, which is referred to as the subgap, to distinguish it from the recording gap, is required for subsequent surface film overlay of a multiple angled gap as used in timing based recording systems such as the Linear Tape Open (LTO) tape servo system. The subgap must be as large as the span of the arbitrary gap pattern. This invention anticipates and enables further developments in timing base recording formats as well combinations of timing and amplitude formats.

After the thin film subgap subpole substrate wafer is created, it is diced into row bars. In the simplest case there would be a one element subgap head substrate array per row bar. Typically, in tape heads, a closure piece is bonded to the row bar. This structure is then lapped to what is called gap depth in the case of traditional inductive thin film heads. However, for this invention, the parameter that is most useful will be the coil depth. The term coil depth refers to the distance from the lapped surface to the closest turn of the coil lying beneath the lapped surface.

The VPP fabrication operations are now described in detail.

Figure 5A:
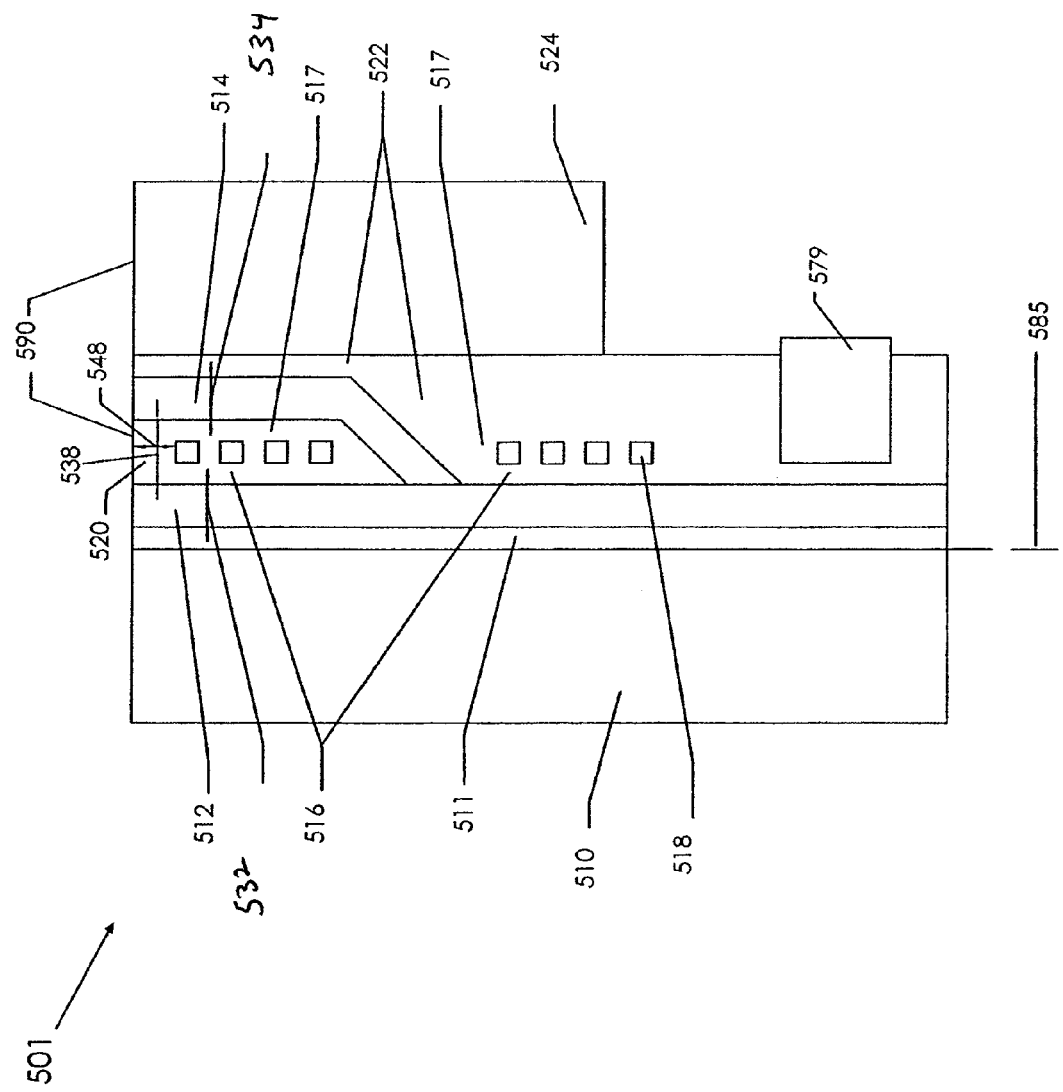
FIG. 5A is a partial cross section view of the integrated thin film subgap subpole substrate.
Figure 5B:
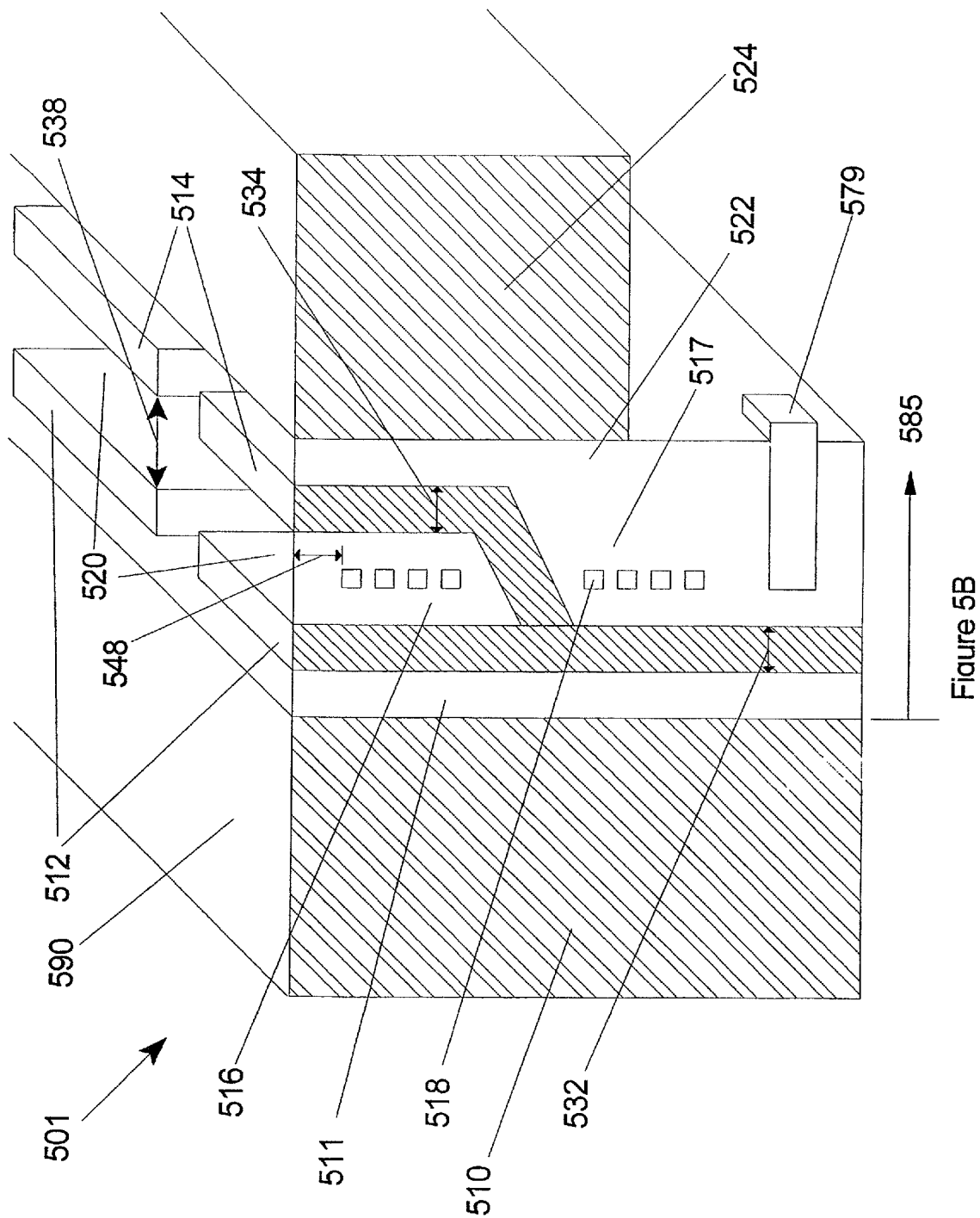
FIG. 5B is a partial perspective view of the integrated thin film subgap subpole substrate.

FIGS. 5A and 5B show one embodiment of a low inductance, high efficiency surface film magnetic recording head substrate of the present invention. The recording head row bar substrate 501 comprises a wafer substrate 510, a first subpole 512, a second subpole 514, a subgap 520 (formed between the two subpoles 512, 514), and a closure piece 524.

With reference to FIGS. 5A and 5B, the VPP process is described as follows: the nonmagnetic substrate 510 will typically be deposited with a basecoat 511 of alumina. This basecoat 511 may be polished after its deposition prior to the deposition of the first magnetic layer. Next, the first subpole 512 of a permeable magnetic thin film is deposited. This deposition may be by plating or by sputtering or by evaporation or any other suitable means. It may be plated into a well defined patterned pole piece. If sputtered or evaporated, it may be subsequently processed and etched to form a defined pole piece. These processes will typically use photolithography to define a first pole piece. Next a coil insulating layer 516 is deposited. Next the coil layer 518 is deposited, typically by plating, and defined upon layer 516. A coil insulating and encapsulating layer 517 which encompasses the coil layer 518 is next formed and may be planarized to form a specific subgap 520 with a specific subgap length dimension 538. Layers 516 and 517 combine to form the subgap 520 in the embodiment shown. A second thin film pole piece, 514, of a similar magnetically soft permeable material to the first pole material 512, is deposited onto the coil insulating and encapsulating layer 522. Generally, a deposition will connect the second pole 514 to the first pole material 512 in the back gap region of the head as shown. This connection is made though a window that is opened to expose the first pole 512. A thick back coil insulating and encapsulating layer 522, typically alumina, is deposited over the entire structure and lapped providing planarization. A window is etched in layer 517 and bonding pads 579 (only one of two is shown) are deposited through to the coil to provide electrical connection. This latter step is typically performed by plating.

Magnetic subgap 520 spans and defines the distance 538 from subpole 512 to subpole 514 and is made from a combination of coil insulating base layer 516 and coil insulating and encapsulation layer 517 and may include other dielectric layers as required to encapsulate the coil and planarize the intermediate structure. An overcoat or planarization layer 522 is applied over the second pole 514. This overcoat 522 is typically made of alumina. This overcoat layer 522 may be planarized by a polishing process which may also serve as a subsequent bonding plane for the ceramic closure piece 524.

It is important to note that other dielectric insulators other than alumina may be used as required as well as other layering and planarization techniques could be used. The thick subgaps and subpoles anticipated may have stress and processing issues that require the use of other dielectrics technologies such as a spin coated photoresist reflow layers or other thick film techniques, all of which are in the spirit of this invention.

With the VPP wafer level process now completed, the row bar is sliced out of the wafer substrate and typically a ceramic closure piece 524, normally of the same material as the wafer substrate 510, is bonded to the row bar. The row bar structure 501 is then lapped to a specified coil height 548 above the coils 518. Closure piece 524 will typically be attached before the horizontal processing operations or may not be required at all depending on head contour design.

The row bar assembly 501 which results from this process is shown in the perspective view of FIG. 5B. The row bar 501 is lapped and polished to the proper coil depth 548 or gap depth as appropriate. The new processing surface is defined to be that of the horizontal surface plane 590. This plane may be flat or have a curvature as part of contour design of the head.

Thus, a second major plane of processing, the HPP plane, has now been introduced. The new plane, the surface plane of the row bar, exposed surface 590, containing the subgap and subpole surfaces, is prepared as the second major plane of processing, the HPP plane, upon which will be processed the main magnetic surface film and its arbitrary gap features. With reference to FIGS. 5A, 5B, 5C and 5D, the HPP processing is performed on the resulting row bar substrate 501, and specifically upon plane 590, and the combined VPP and HPP dual plane process results in recording head 500.

The HPP fabrication operations are now described.

Figure 5C:
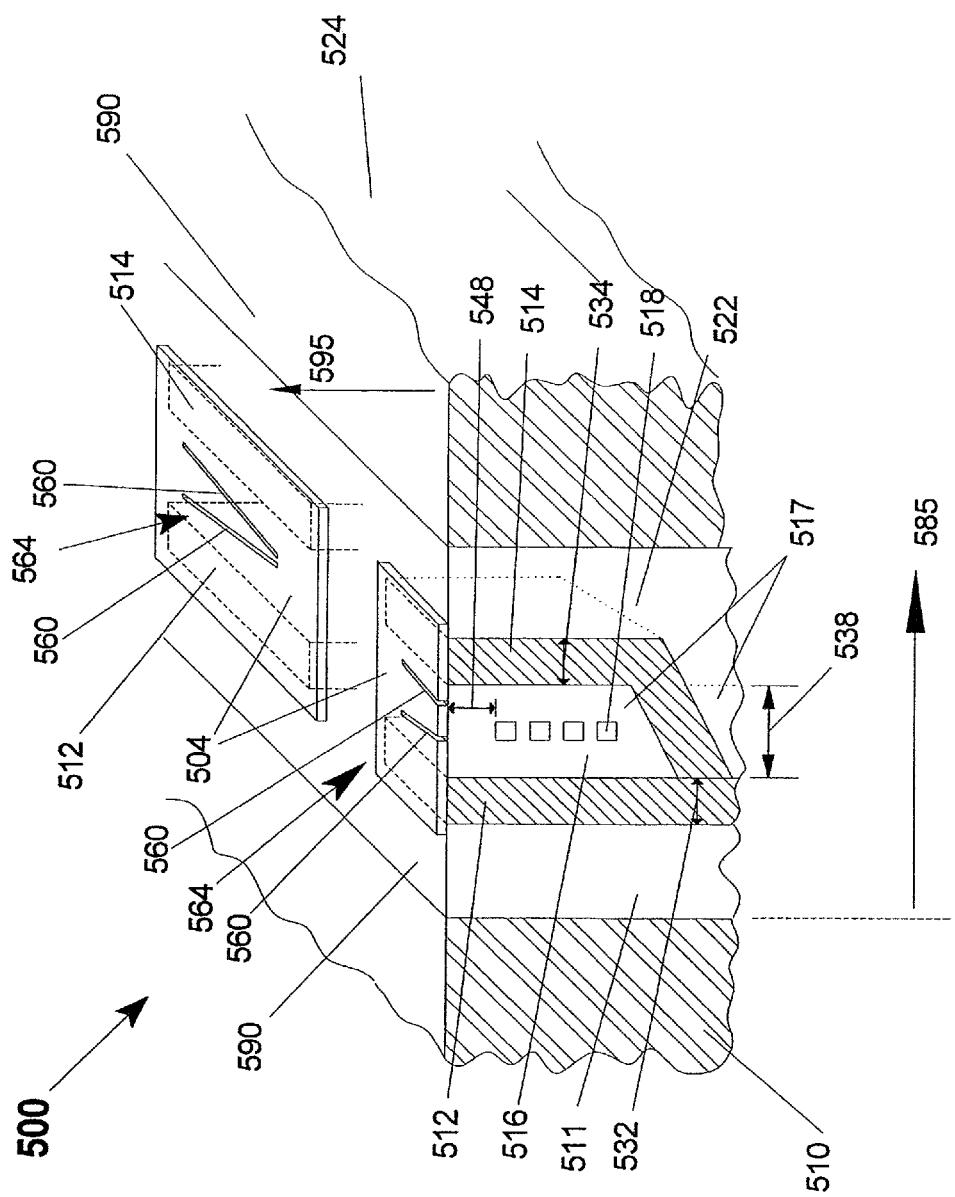
FIG. 5C is a partial perspective view of the integrated thin film servo format head.

With reference to FIG. 5C, the HPP will be described. This process turns row bar 501 into head 500. With the prepared subgap subpole substrate row bar, the HPP part of the thin film head is initiated by depositing a magnetically permeable thin film 504 on the surface 590 of the row bar structure 501 with a film growth in the direction of direction arrow 595, by various methods such as sputtering, evaporation or plating.

This HPP surface film 504 may be plated with gap features and flux directing features. In non-plated cases, special gap and flux directing features are created in a later step, usually with a photo and dry process etch step which may also be called a subtractive etch. Alternatively, in the cases of evaporation and sputtering, the gap can be defined in photoresist. A photoresist wall would represent the magnetic gap, for example. Hence, a positive gap or a wall is made. Subsequently, the magnetic film is deposited over the wall or over the positive gap material. Since the film is deposited around the gap as well as on top of the gap wall, the extraneous film may be removed with a lift-off process. In short, like plating, the gap feature is made, however, now it can be deposited over rather than plated up around the positive gap. In plating, the gap feature is plated around the gap defining photoresist, and the photoresist is subsequently removed. In short, any one of these and other methods may be used in the present invention to complete the horizontal planar process such that a magnetic surface film contains arbitrary recording gap features 560 that are well defined in the surface spanning magnetic thin film 504. As in the '533 patent and continuations thereof, a combination of photoresist and focused ion beam ("FIB") can yield good arbitrary shaped gaps in such surface films.

In one embodiment of the present invention, the magnetically permeable surface thin film layer is optimally configured to complete a magnetic circuit for each element over the subgap area and in-between each subpole of a particular element. Ideally, the elements are magnetically isolated from one another. As noted in other embodiments a single driving channel can suffice to drive an array of arbitrary gaps.

The resulting head 500 of FIG. 5C shows the coil depth 548 in combination with the pole lengths 532 and 534, and subgap length 538, determine, in part, the distribution of flux in the film 504 and across gaps 564 that form gap pattern 560 that are to be formed onto surface 590 as illustrated.

As discussed, gap pattern 560 and other surface film features as required may be made by either selective plating or subtractive etch post deposition technologies or by a lift-off technique.

Figure 5D:
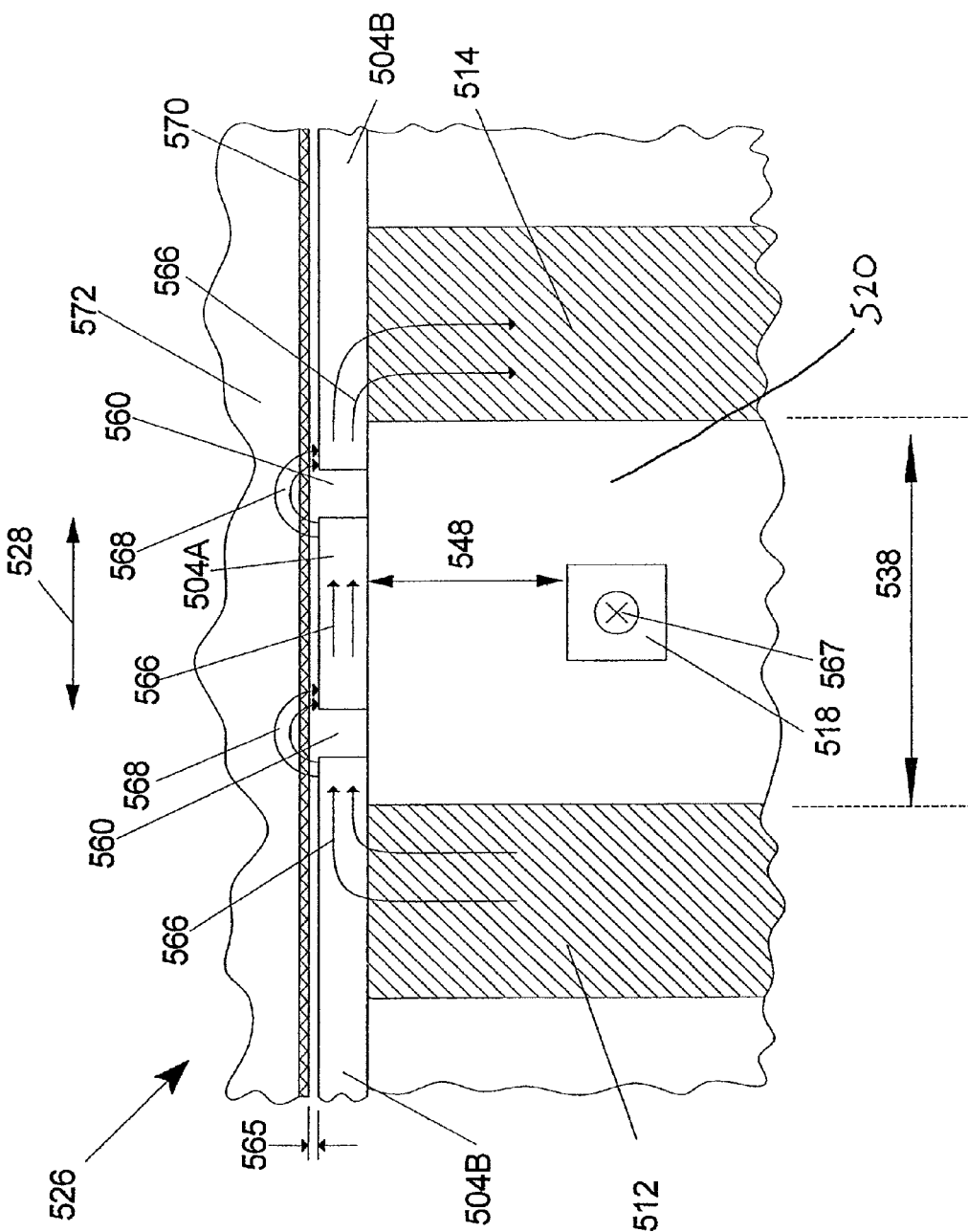
FIG. 5D is a partial cross section view of the integrated thin film servo head showing the magnetic flux path and the magnetic recording medium.

FIG. 5D is an expanded view of the gap region of FIG. 5C. The magnetic flux 568 and 566 is shown by the arrows in the permeable magnetic surface film 504A for a particular state of current 567 in the coil 518. By the nature of the relatively closed path magnetic circuit of this head, the magnetic flux is most active across the portion of the magnetically permeable magnetic surface film 504A that lies in-between the two subpoles 512, 514 and over the subgap 520. The recording field flux 568 is made up of the field lines that leak over the top of gaps 560 and intercept the magnetic tape medium 570, backed by tape substrate 572, which traverses in the direction shown by arrow 528. To be most effective, the distance 565 from the recording medium surface of the tape to the top surface of film 504A and 504B should be very small. Typically, distance 565 is on the order of a few nanometers.

Noteworthy in FIG. 5D is that the film 504 can extend past the subpoles. The film portion 504B extending past the subpoles 512, 514 will not be highly magnetized and contains no gap features or other features that would write marks onto the tape. It may serve to stabilize the tape as it transverses across the head. Such non-energized surface film areas can play the part of a stabilizing bearing if properly designed. Film portions 504A on top of and in-between the subpoles will carry most of the magnetic flux.

Figure 5E:
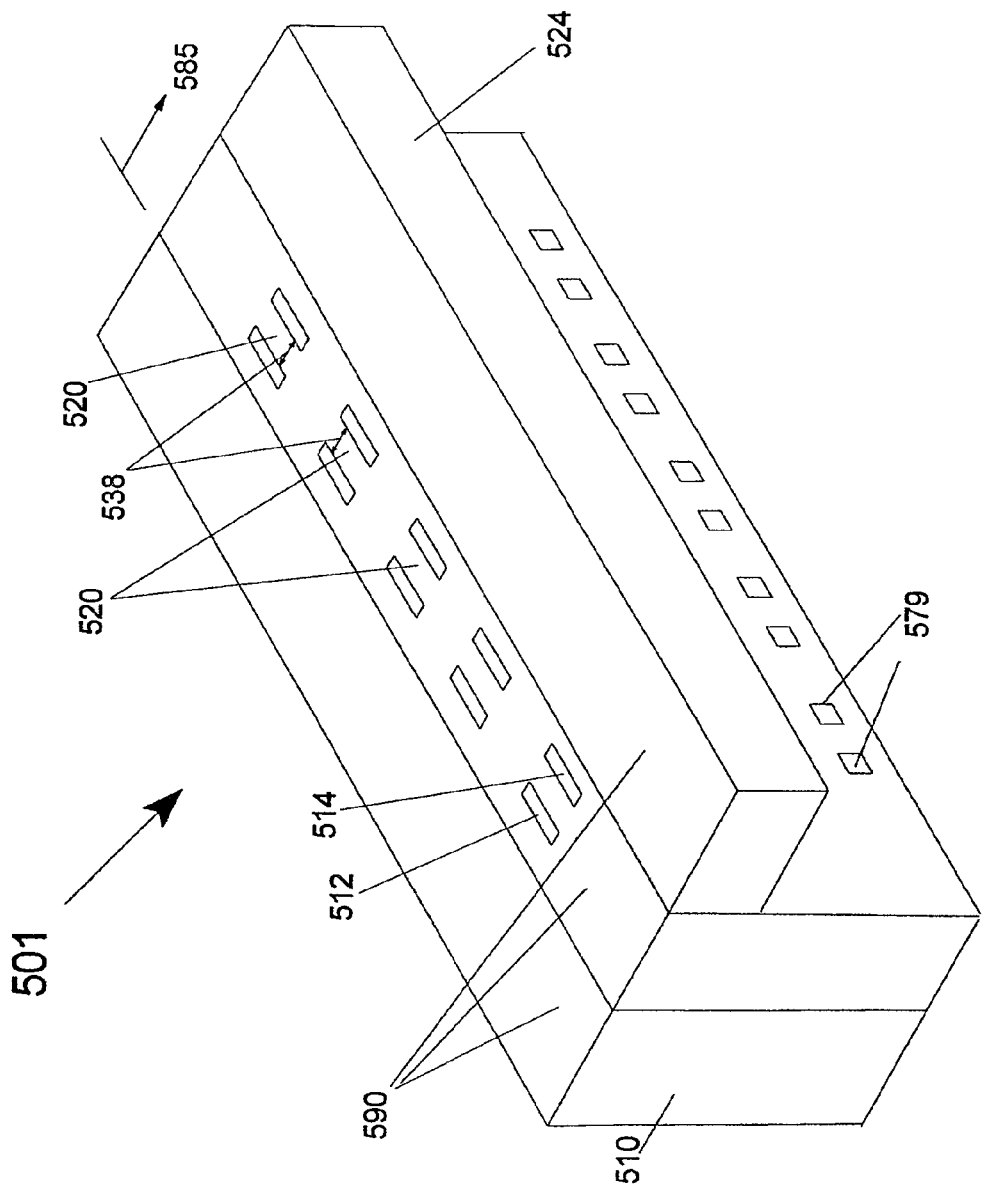
FIG. 5E is a perspective view of the integrated thin film subgap subpole substrate.
Figure 5F:
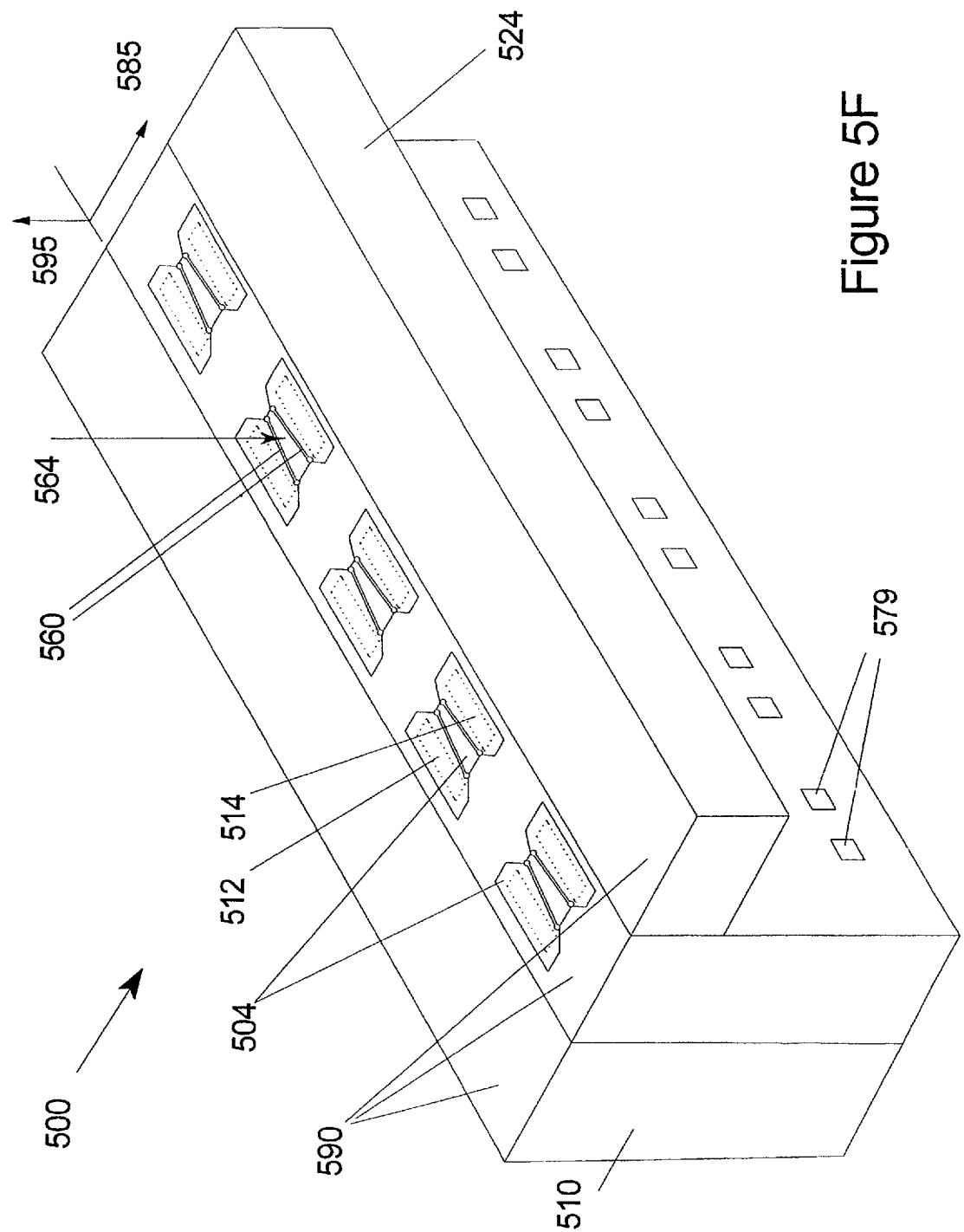
FIG. 5F is a perspective view of the integrated thin film servo head.

FIG. 5E shows a perspective view of the row bar assembly 501 after the VPP process is completed. FIG. 5F is the same as FIG. 5E but shows film 504 and gap pattern 560 resulting from the HPP process described above. Recording head 500 is the result of the combined VPP and HPP dual plane process.

In order to make the servo read signal more uniform from one track edge to the other, the servo write signal needs to be written uniformly from one track edge to the other. In one embodiment, the patterns may include termination boxes having circular or elliptical features of the type disclosed in PUB. APP. 20040109261, in order to more effectively contain sufficient magnetic flux in the write gaps.

Consideration must be given to the engagement of the media against a head having a non planar surface while minimizing the complexity of providing the air bleed slots if they are required. In addition, when working with components of this scale, consideration must be given to the techniques utilized to impart and define the thin film layer so that mechanical shear or peeling of the film is not induced by the tape's motion as the tape hits the edge of the film on the tape bearing surface of the head. Hence, in one embodiment, wear pads as disclosed in the Dugas patent application, PUB. APP. NO. 20030039063, WEAR PADS FOR TIMING-BASED SURFACE FILM SERVO HEADS, Published Feb. 27, 2003, which is hereby incorporated in full by reference, may be used for optimizing the head-to-tape media interface.

Figures 3A, 3B:
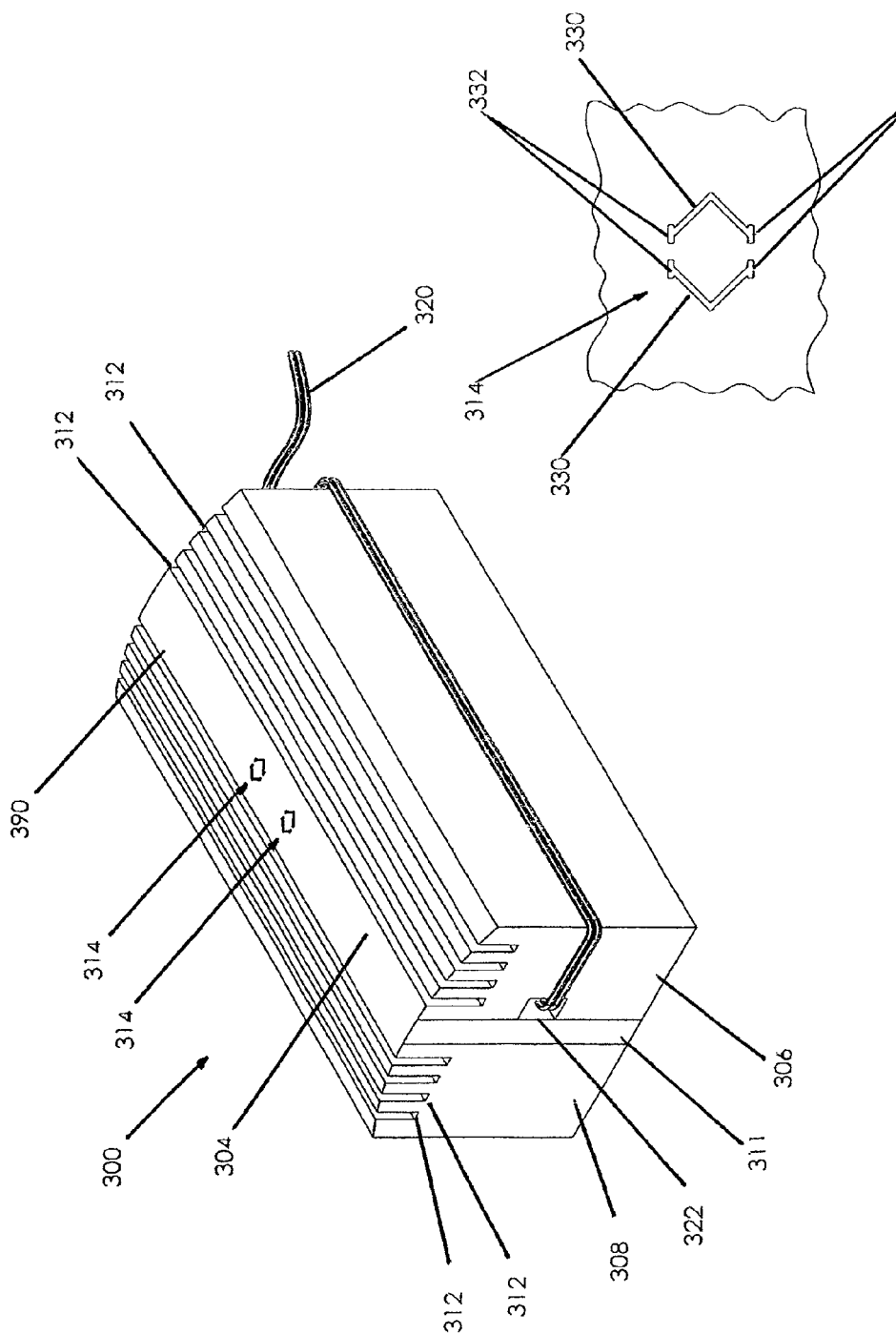
FIG. 3A is a perspective view of a prior art ferrite/composite surface thin film head by Albrecht et. al.
FIG. 3B is a top view of a prior art surface thin film gap pattern by Albrecht et. al.
Figure 4A:
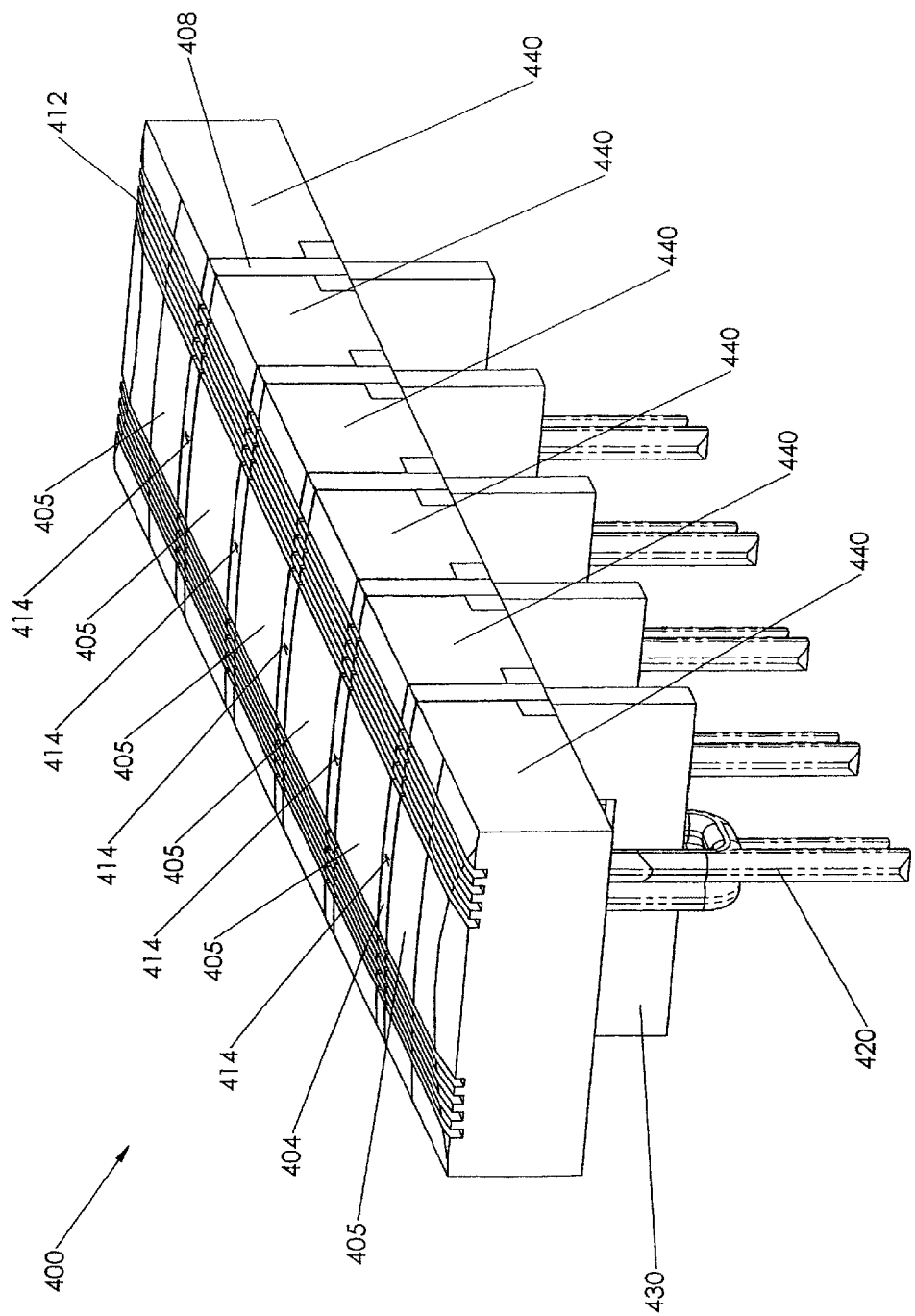
FIG. 4A is a perspective view of a prior art surface thin film head of Dugas.
Figure 4B:
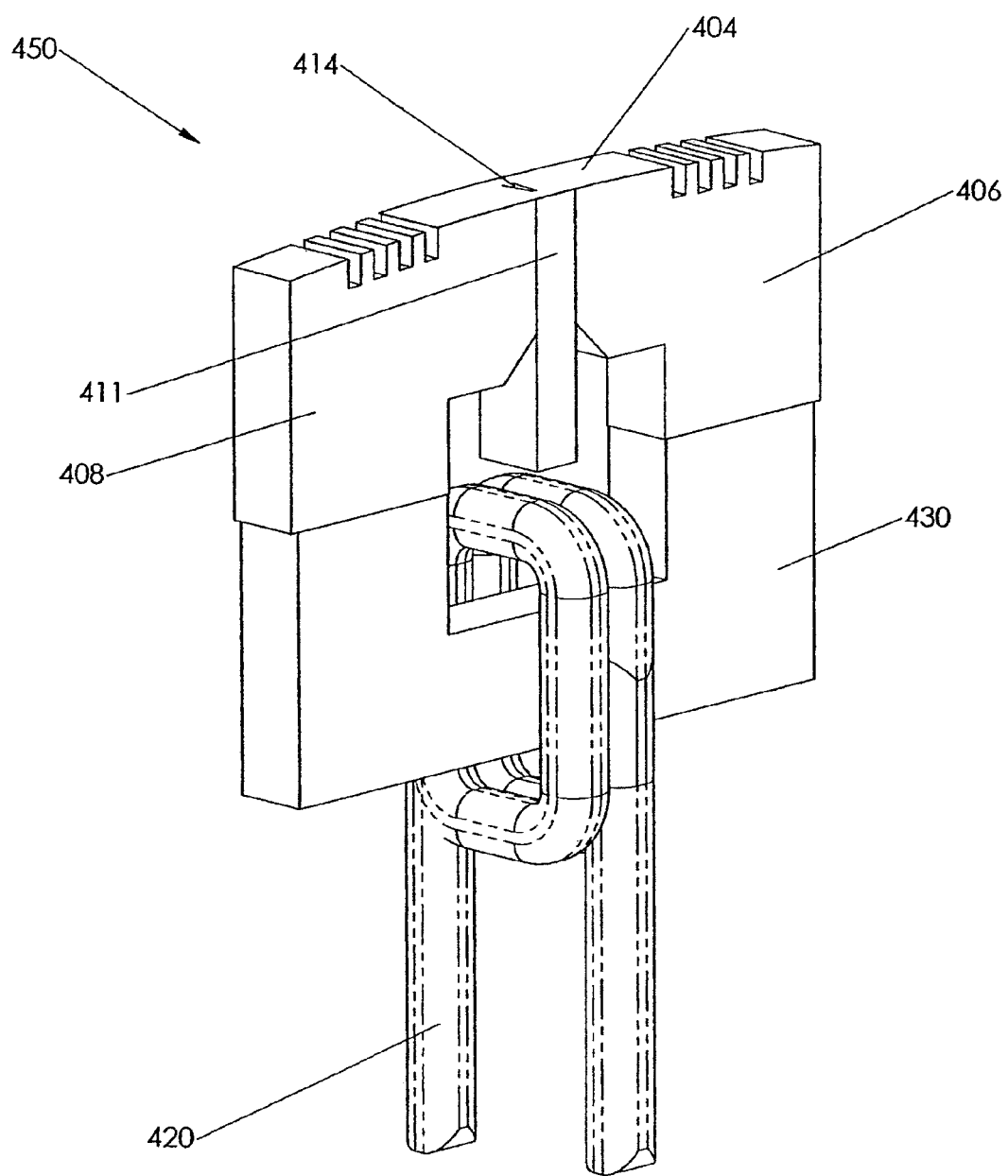
FIG. 4B is a perspective view of a prior art surface film head element of Dugas.
Figure 4C:
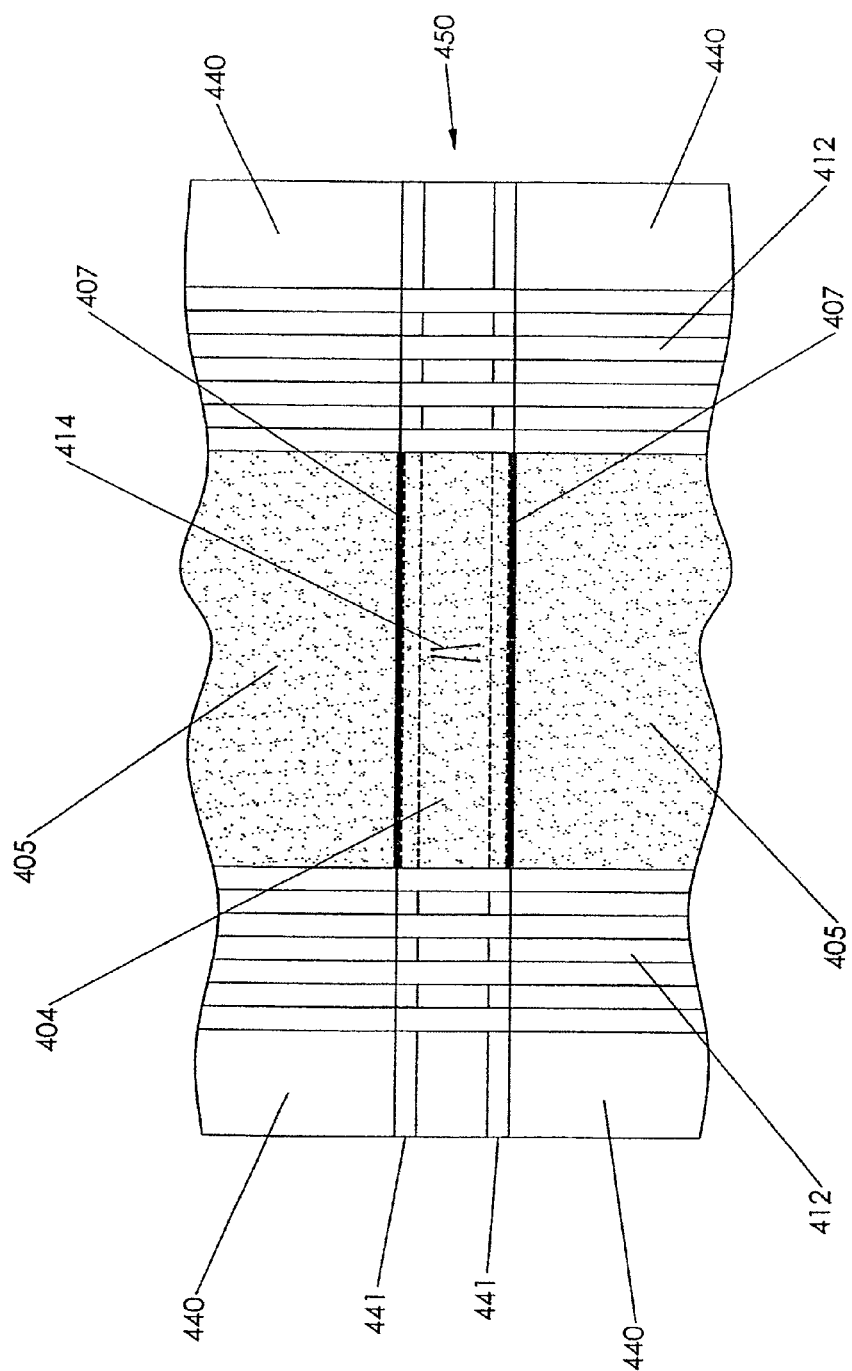
FIG. 4C is a top planar view of a prior art surface film head element of Dugas.

An arbitrary gap pattern 564 in FIG. 5C is formed in the subgap between the two subpoles and is defined by the exact geometry of the gaps 560. This is analogous to FIG. 3B and FIG. 4C. The recording head 500 may include one or more elements. That is, the recording head 500 may have multiple gap patterns, each pattern or pattern grouping forming a single servo band element.

These heads may be used to write information on or read information from a magnetic media such as tape. The read head application will be studied and is anticipated but is not emphasized herein. The write head application, optimization for an arbitrary format writer, will be emphasized.

While the description of the invention will be in terms of servo writing tape with arbitrary servo patterns and hence arbitrary gap features, this invention may be applied to other write head applications and read head applications as appropriate.

As will be recognized by those skilled in this art, these subpoles and the subgap may all be made thicker as compared to traditional data heads. The size of the subgap and subpoles are determined by the design and span of the arbitrary shaped gaps. For smaller gap layouts, the span of the subgap and subpoles will be correspondingly smaller than that for larger span gap layouts. Large span gap pattern layouts would include such gap patterns as the LTO timing-base gap pattern and the IBM 3592 timing-base gap pattern and the IBM 3570 timing-base gap pattern. For example, the LTO dual gap pattern is about 20 microns from one gap to the other at one end of the servo track and is about 70 microns at the other end of the servo track. The track is about 190 microns wide. Hence these gap patterns have a span on the surface of the head in the range of 70 to 200 microns over the subgap regions and hence require a subgap span of about the same area, i.e., 70 by 200 microns. New timing-base gap designs may decrease this span considerably and will allow for magnetically driven subgap thicknesses in the range of from 20 to 50 microns or less.

In certain applications of the head as shown, there is no apex point and there is no slope in the second pole 514 down to an apex point. A feature of this invention is the distance of the first coil 518 prior to horizontal surface film processing. This distance is called the coil depth 548. The coil depth 548, the pole lengths 532 and 534, in combination with the subgap length 538, serve as magnetic design parameters in terms of the performance of the head and the consistency of the performance from head to head performance.

In summary of the basic invention, the VPP operations have a film growth direction denoted by direction arrow 585 (FIGS. 5A and 5B) from the wafer surface whereas the HPP operations have a film growth in the direction denoted by direction arrow 595 (FIG. 5C) which shows the direction of film growth from the row bar surface 590. Direction arrows 585 and 595 are perpendicular to one another. Direction 585 shows the growth of the subpoles and subgaps, and direction arrow 595 shows the growth of the magnetic surface film in which are embedded the arbitrary gap features.

Hence, this invention uses two major process planes which are orthogonal to one another and which in combination form a head structure of a head manufacturing process to produce a recording head that may contain multiple arbitrary gaps and multiple arbitrary gap arrays. Such a head will be of very low inductance as compared to the prior art heads and, hence, will have a fast rise time and high frequency response.

A top view of the head and its surface features is now described.

Figure 7A:
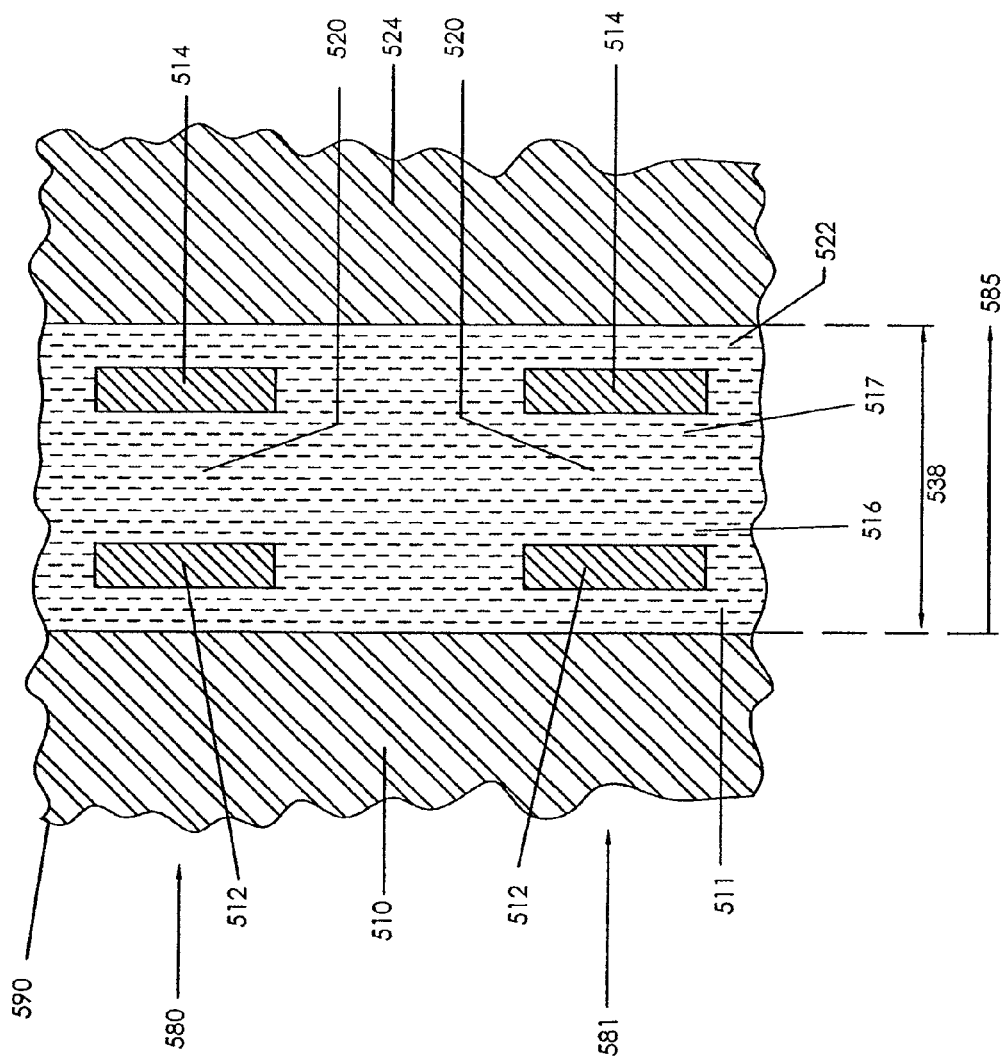
FIG. 7A shows a top partial-view showing two elements of the subgap subpole substrate and the region in-between the elements.

FIG. 7A shows a top view of two elements 580, 581 of the subgap substrate row bar of FIG. 5A with the subgap region 520 and the subpoles 512 and 514 shown for each element, respectively. Also shown for reference are basecoat 511, overcoat 524 and intermediate dielectrics which in combination make up subgap 520, as was previously shown. The entire surface 590 is the prepared second processing plane upon which HPP will be performed.

Figure 7B:
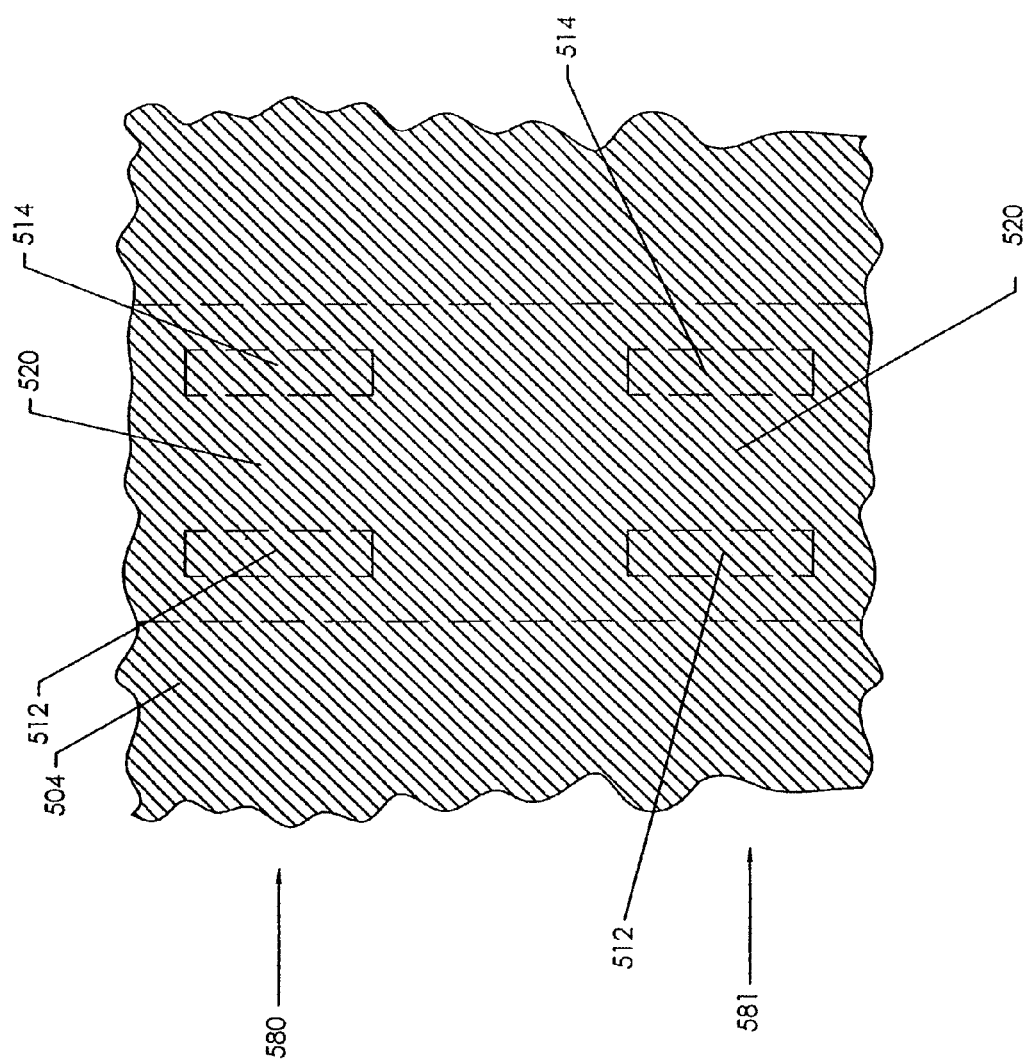
FIG. 7B shows a top partial view showing two elements of the subgap subpole substrate and the region in-between the elements and with the surface thin film disposed thereon.

FIG. 7B shows the same structure as FIG. 7A, but with film 504 deposited on the top of the surface 590. The subgap region 520 and the subpoles 512 and 514 are shown for reference.

FIG. 7C shows the same structure as FIG. 7B but with the timing-base gap patterns 564 shown in film 504. The gap patterns 564 include circular termination features 562, per the discussion of the prior art, PUB. APP. NO. 20040109261. The subgap region 520 and the subpoles 512 and 514 are shown for reference. If the film 504 spans from one element to the next, it would enhance stray flux, shunt flux around the gap features and cause channel to channel cross talk in some applications.

Figure 7D:
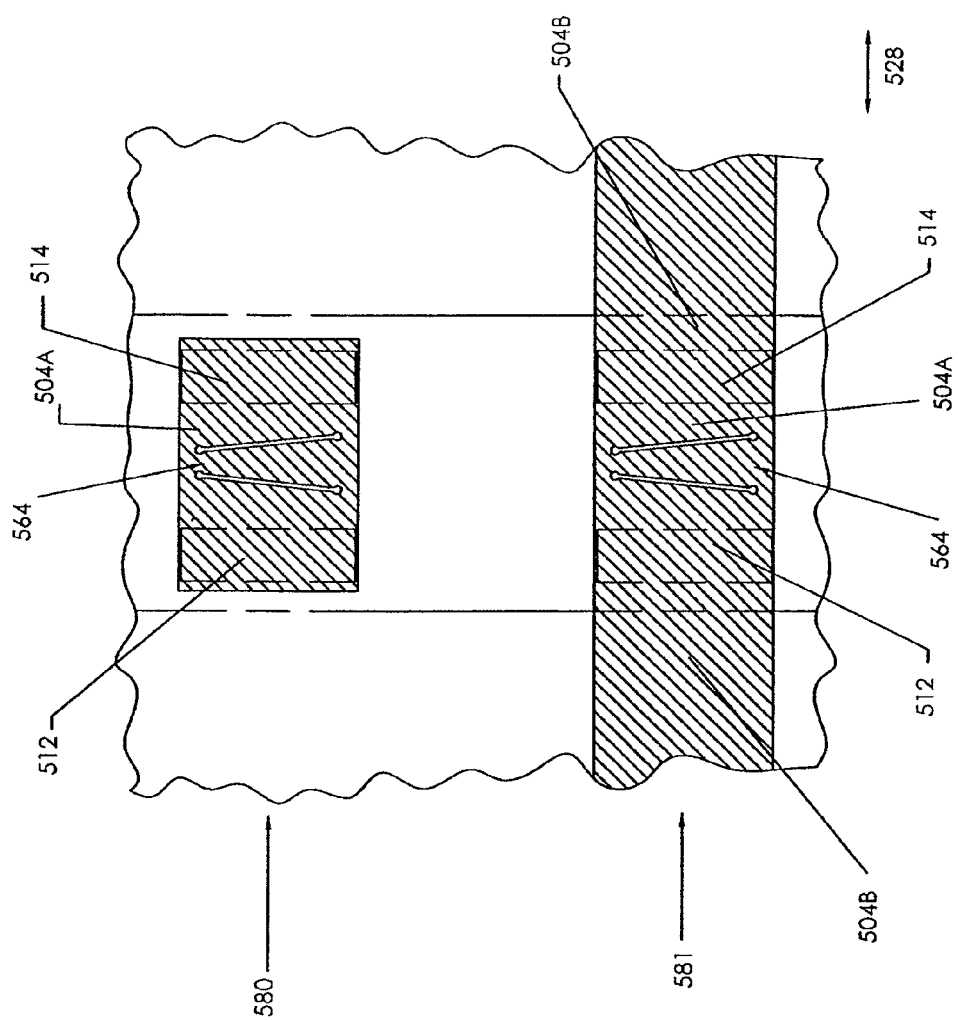
FIG. 7D shows a top partial view showing two elements of the subgap subpole substrate and the region in-between the elements and with the surface thin film disposed thereon and with the gap features placed in the surface film and the region in-between the elements devoid of surface film so as to magnetically and electrically isolate the two elements.

FIG. 7D shows the same structure as FIG. 7C with the surface film removed from the area in-between the elements. In this design, the elements 580 and 581 are isolated, and the film 504 is extended over the subpoles 512, 514 so that their edges of the subpoles are not in contact or in near contact with the tape medium. Edges in contact with the media could write stray marks on the recording medium. Direction arrow 528 shows the direction of tape motion in the up-track and down-track directions.

Figure 7E:
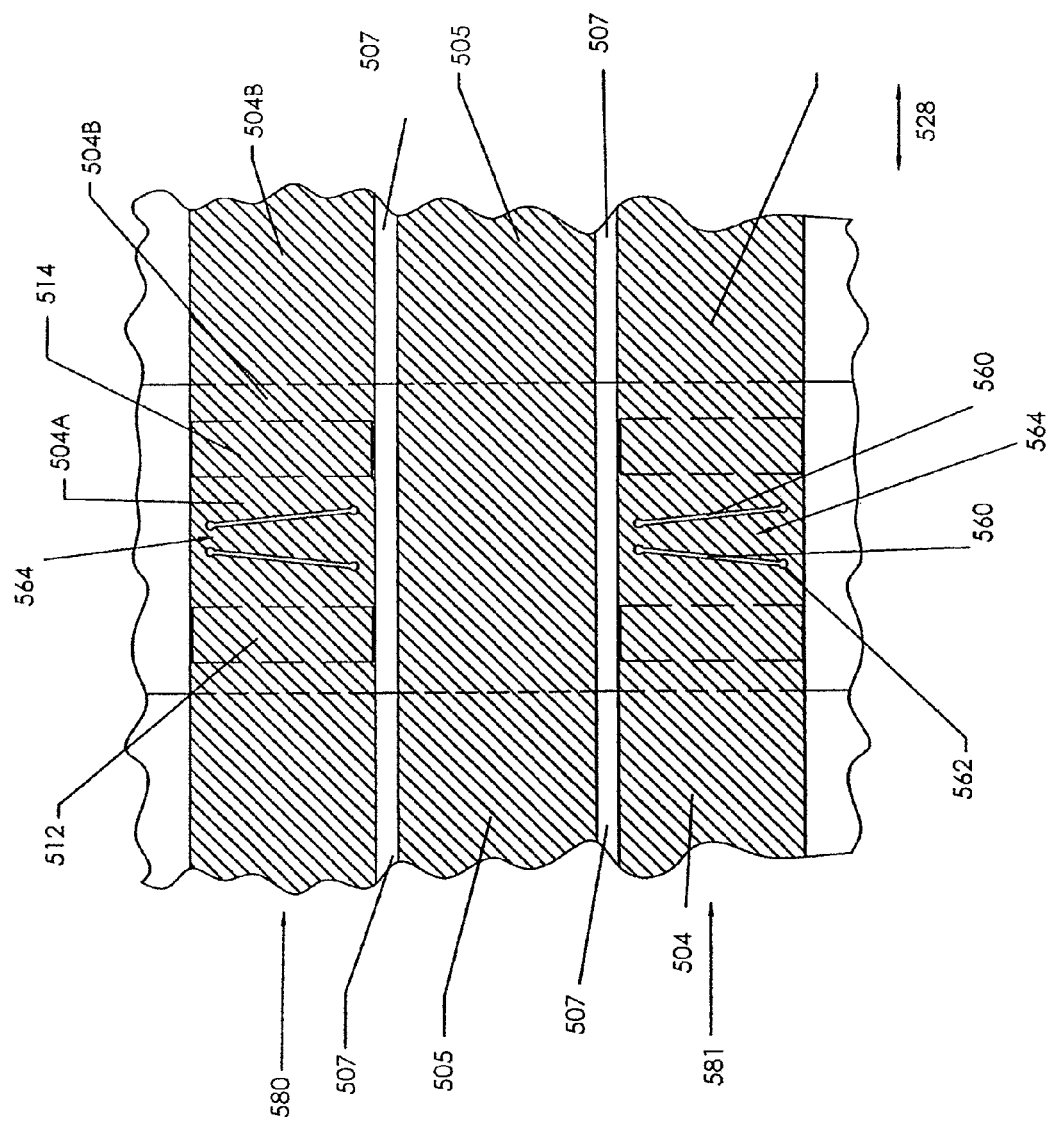
FIG. 7E shows two completed and magnetically isolated elements with a non-active portion of the surface film left in-between the elements to serve as a tape bearing member.

FIG. 7E is the same as FIG. 7D but shows a more contiguous surface film pattern that has been separated into active film component 504A and 504B and inactive film 505 which serves merely as tape bearing surface co-planar to the active film 504. The separation is caused by slot 507 that is typically tens of microns wide.

Figure 8A:
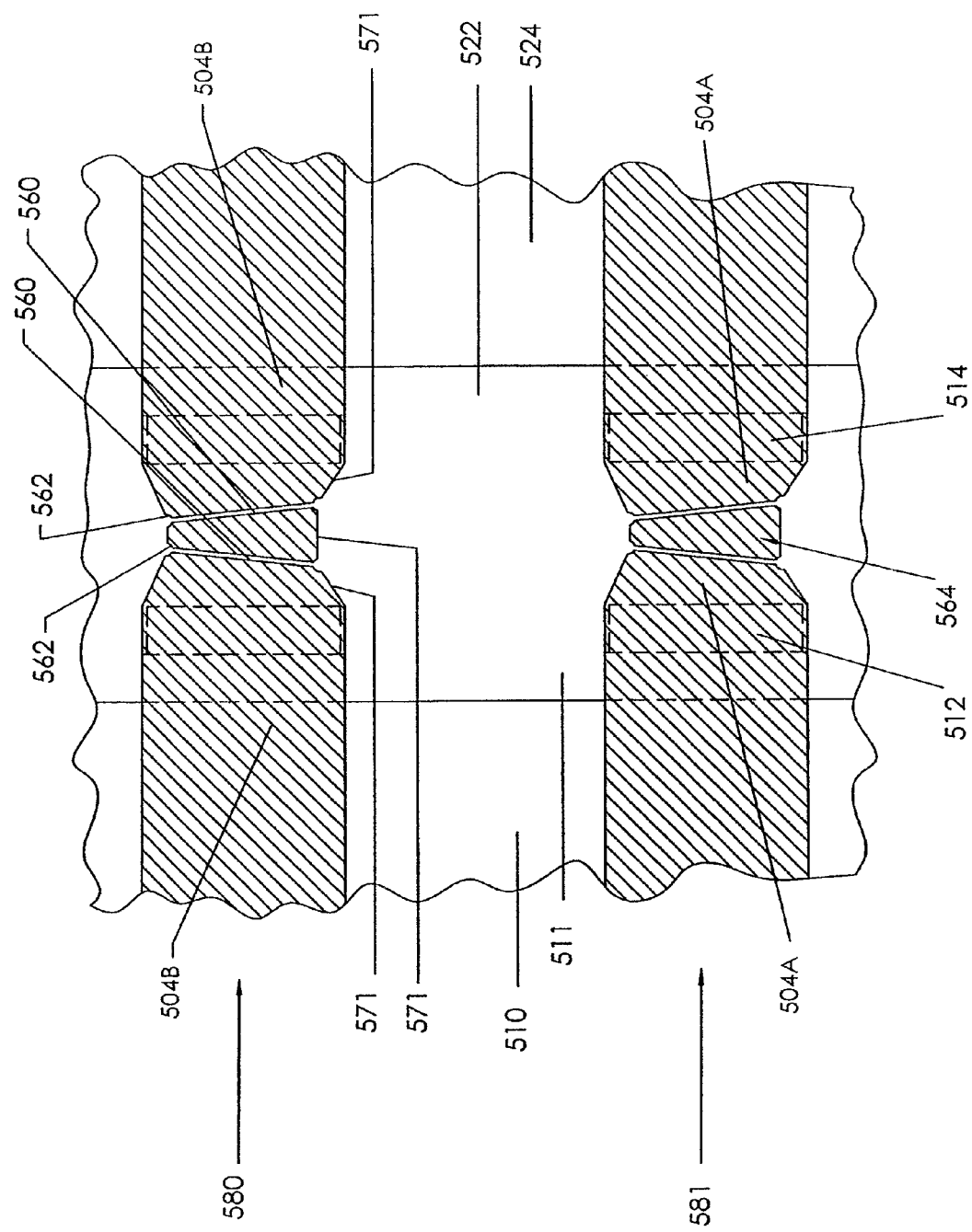
FIG. 8A shows two completed and magnetically isolated elements with a flux focusing aspect to the film with a tape bearing extension in the up-track and down-track regions and with curved gap termination features.

FIG. 8A shows a more aggressive flux guiding design. Elements 580 and 581 have flux guide feature 571 which makes a magnetic boundary that limits flux leakage around the gap features delivering the maximum amount of flux generated in the subpoles to the gap region. The flux guiding may reduce the required ampere-turns and may also serve to write uniformly across the track width of the gap feature. As per the discussion of FIG. 5D, the surface film 504B outside of the driving subpoles 512, 514 is not highly magnetically active and can serve as a tape bearing member. Curved termination features 562 are shown and provided for track edge support as well as non-writing magnetic terminations to the gap edge per the discussion of PUB. APP. NO. 20040109261.

Figure 8B:
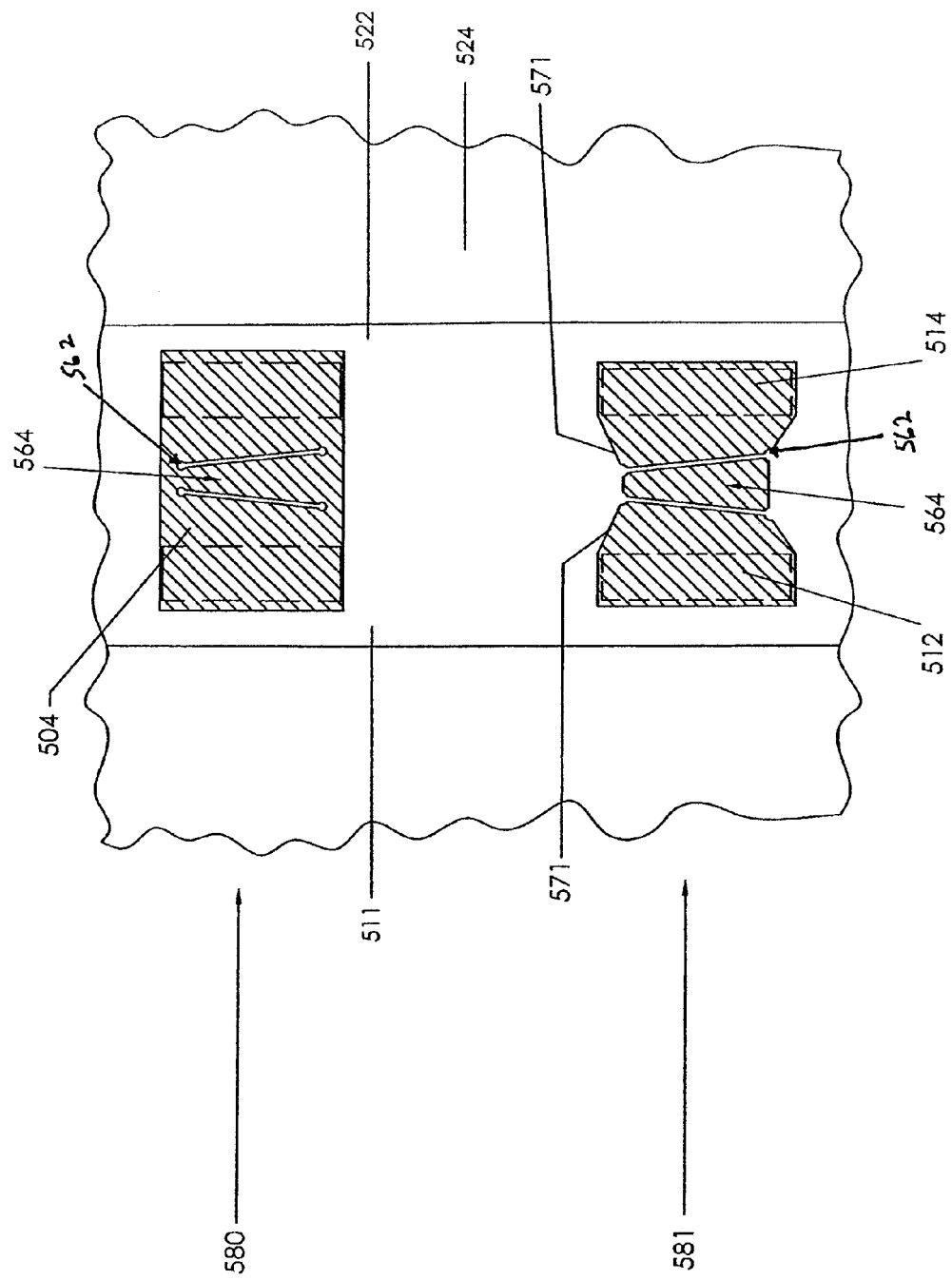
FIG. 8B shows the minimum amount of surface film required for two completed and magnetically isolated elements, one with a flux focusing aspect to the film and both with curved gap termination features.

FIG. 8B shows the minimum amount of surface film required to complete elements 580 and 581. Curved terminations 562 are used. For purposes of illustration, channel 580 is shown without focused flux guiding and channel 581 is shown with focused flux guiding.

Figure 8C:
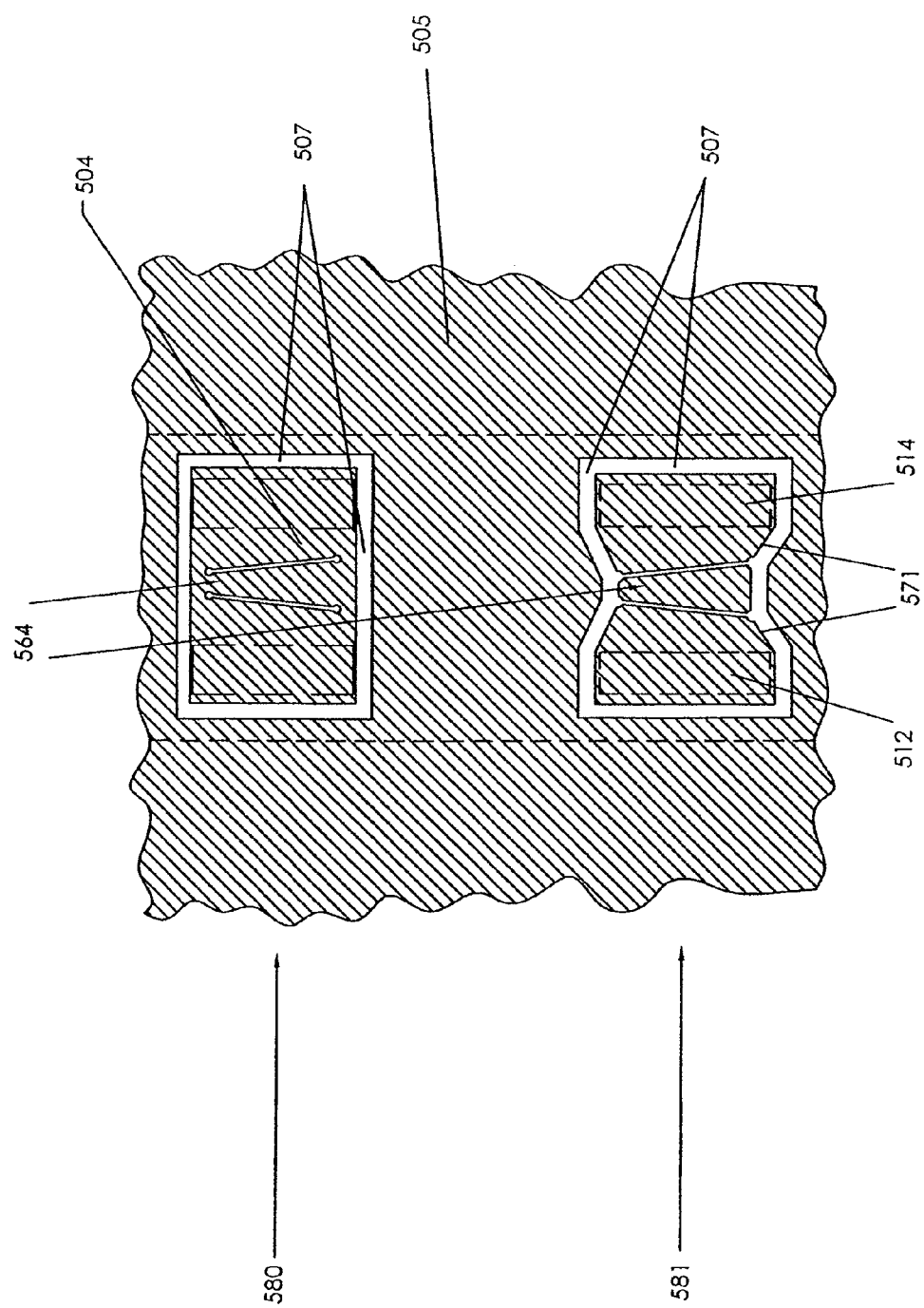
FIG. 8C is the same as FIG. 8B but with inactive surface film acting as a tape bearing member.

FIG. 8C is the same as FIG. 8B but has the isolated channels in a sea of inactive magnetic thin film 505. The inactive film 505 provides a more contiguous bearing surface for the tape medium.

Whether there is an apex or a true gap depth in the sense of a standard integrated thin film head is not a limiting feature of this head. If a second pole with well defined apex and gap depth is required for design or processing considerations, it would not be considered out of the scope of this invention.

A multi-layer coil 518 is shown in a three layer configuration in FIG. 9A. Similarly, a single coil layer may or may not have an apex with subgap depth without restriction. An example showing multi-layer coils which may also require an apex and gap depth approach is shown in the cross-section of FIG. 9B. The apex point 521 is analogous to apex point 121 of FIG. 1A. In this case, 548 is now the gap depth rather than the coil depth but relates to a specific coil depth by the mask layout.

Multi-module heads which are combination assemblies of two or more head modules are fully within the scope of this invention. If the head modules are made completely separately, the alignment precision between the two heads and their patterns will be on the order of about 1 um. A dual head system such as this can have gap patterns aligned to one another to a degree that is only as good mechanical alignment techniques will allow for. For some applications, such a tolerance will be more than sufficient. In other applications, the gap pattern of one head must be more accurately matched to the gap pattern of the other head.

Such heads can take distinct advantage of the construction taught herein to realize novel multi-element structures. They may be made independently as single modules and mechanically aligned together, or they may share a common HPP deposition and patterning process. The latter will make a more accurate head assembly if pattern-to-pattern tolerances are required.

Because the invention provides for a method of making heads with any arbitrary gap pattern, dual head modules whose gap features work in combination with one another to provide unique servo precision may be made in accordance with the principles of the present invention. One such application is that of DC pre-erasing the track ahead of the unipolar current pulsed timing-base structure as in patent application Ser. No. 10/768,719 by Dugas. Other applications may include double time base patterns, timing base and amplitude base combinations, timing and timing combinations and other arbitrary gap combinations that give unique servo patterns on tape, among other applications. More complex patterns that can take advantage of the head construction of this invention are, in particular, the compound head structure of FIGS. 12 and 13, shown in US Patent Publication Number US2003/0151844 A1 by James Eaton, Wayne Imaino, and Tzong-Shii Pan, published Aug. 14, 2003. In particular, in this patent application, both triple and quadruple gap patterns are shown which are similar to the LTO gap pattern in style. While the Eaton patent publication does teach a dual head servo system (FIG. 13 of said reference) it does not teach a head design per se and does not teach a head design that can accomplish the dual head module alignment with high precision. A similar triple gap servo pattern is the subject of U.S. Pat. No. 6,542,325 BI by Richard Molstad, Michael Kelly, and Douglas Johnson. This patent, '325, teaches the three gap timing base design similar to Publication '844 wherein any two of the three gaps are parallel and where the third gap gives the differential azimuthal signal with respect to the two parallel gaps, but this application does not teach a compound head application thereof.

Figure 10A:
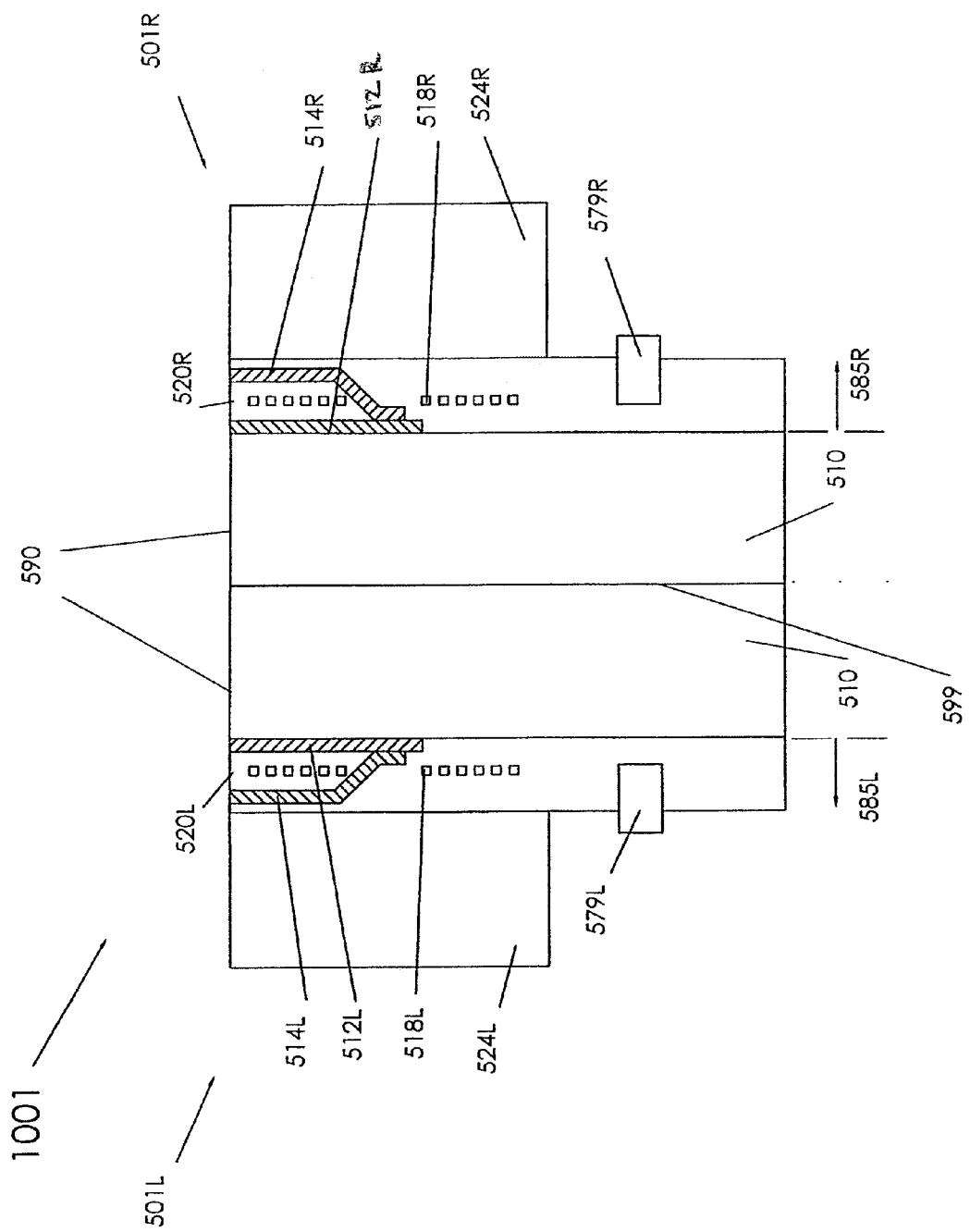
FIG. 10A is a cross section of a compound subgap subpole substrate.

FIG. 10A shows a cross section of two subgap row bars 501 bonded together to form a dual module substrate for HPP processing from one HPP mask operation. In this case, the substrates are bonded together back-to-back as shown with the bond pads facing outwards. The two row bars, each similar to 501 as previously described in FIGS. 5A-5F, are bonded together prior to the HPP steps. The boundary between the two heads 599 may be made with a precision bonding agent or glue that is impervious to solvents used in cleaning and which will be compatible with the subsequent processing steps. We now have a 501L (left) and a 501R (right) as shown in FIG. 10A and in analogy to the previous discussion of FIGS. 5A-5F. The other elements, similar to FIGS. 5A and 5B, are subgaps 520L and 520R, subpoles 512L and 512R and 514L and 514R, coils 518L and 518R, bond pads 579L and 579R, and optional closures 524L and 524R, among other features as described in FIGS. 5A-5F. The direction of film growth processing is shown by 585L and 585R. The labeling of the elements is not meant to be as exhaustive as the previous descriptions of FIGS. 5A-5F.

The two row bar modules are now fixed together to form a compound HPP substrate module that has tolerances on the order of 1 um with respect to each other in terms of critical dimensional alignments. The substrate may have been bonded at wafer level or at the row bar level. The row bars could have come from one wafer with a single VPP process or could have come from two different wafers with differing subgap subpole designs. In any event, the compound row bar is lapped and polished and prepared for HPP processing. The substrate 1001, while made of two distinct row bars with left and right handedness, has a common horizontal processing plane 590, the same as discussed in FIGS. 5A, 5B and 5C.

Figure 10B:
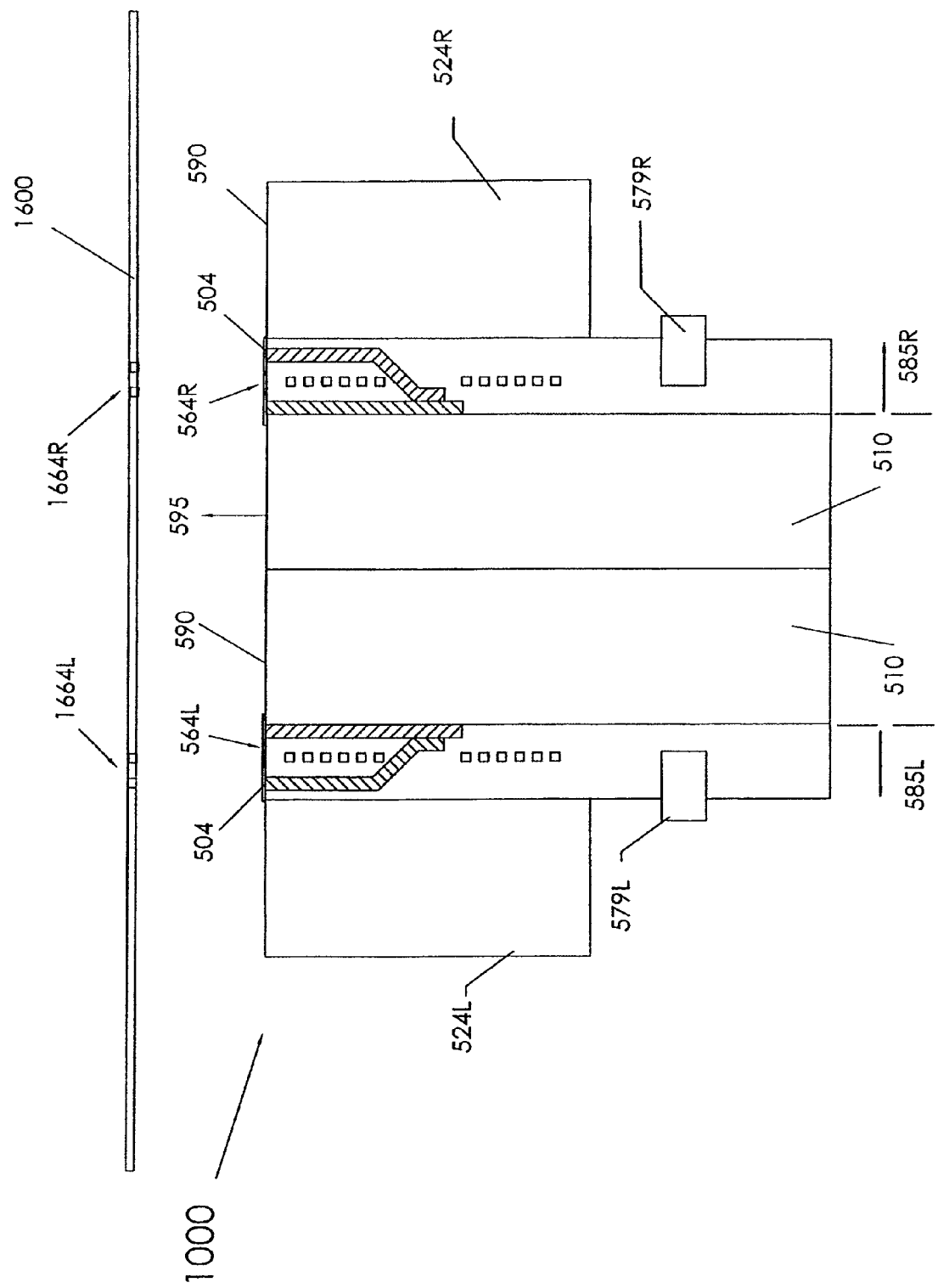
FIG. 10B is a cross section view of a compound integrated thin film servo format head.

The HPP process is now made a common process for the compound row bar assembly with a common deposition, common mask operations, and common etching or patterned plating operations such that the down-track and cross-track gap pattern elements can all be made of a precision to about 0.1 um to 0.05 um with respect to each other. All of the above will be analogous to FIG. 5, and all the processing taught therein applies herein to the compound head of FIGS. 10A-10C. FIG. 10B shows this compound head after HPP processing in cross section. Note film 504 is common and hence is not labeled as to left or right. The same applies to common horizontal processing plane 590. The important distinction of a common mask is shown by mask plate 1600 carrying head gap features 1664L and 1664R corresponding to the left and right side head gap patterns, 564L and 564R, respectively.

Figure 10C:
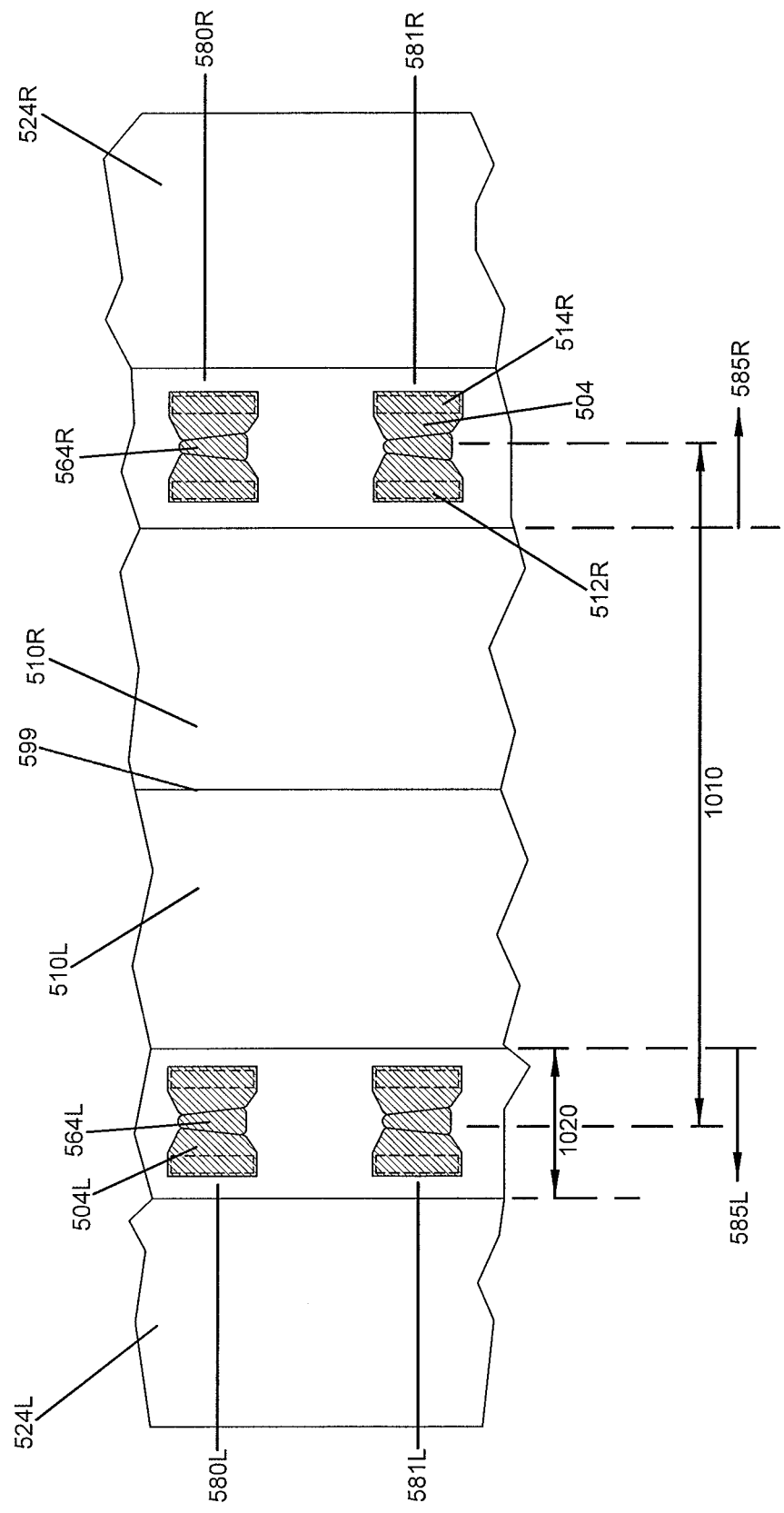
FIG. 10C is a partial top view of a compound integrated thin film servo format head.

FIG. 10C shows a top view of two channels of each head element. As shown in FIGS. 10A and 10B, the two substrates 510 are now labeled as 510L and 510R. The other features as those shown in FIG. 5 are likewise labeled by their handedness. The VPP processes could be common for each head row bar, and each row bar could have come off the same wafer, if the design allows for that. Alternatively, if the subpoles and subgap each have a different design to carry a different gap pattern 564, that is if 564L and 564R are different enough require different subgap substrate geometries, then each row bar substrate, 501L and 501R of FIG. 10B, could come from differing VPP processes with differing poles and subgap specifications to match the requirements of gap patterns 564L and 564R, respectively.

The head shown in FIG. 10C shows a double LTO pattern, for illustration purposes only; any arbitrary gap patterns could be used according to the requirements of the servo design. The head of FIG. 10 was made by mating the substrates back-to-back. In this way, the bonding pads are each facing outward as shown in 579L and 579R of FIG. 10B. In such an assembly, the flex leads can be easily managed.

FIG. 10C also shows the typical spacing of the heads. Dimension arrow 1010 is from about 2 mm to about 4 mm in length. This compares to the dimension 1020 of about 10 µm to 200 um. The exact thickness of the layers will depend on the exact arbitrary gap layout. This dimension, 1020, represents the deposited thicknesses of the subpoles and subgaps, coil layer, undercoat and overcoat layers and all the layers required of the VPP level design. Accordingly, the drawings cannot be shown to exact scale.

The larger dimension 1010 is due to the fact that the substrate material typically comes in relatively thick wafers typically from 1 mm to 2 mm in thickness. The substrate could be ground thinner after processing to minimize this distance. This is called back-side thinning and is sometimes a practice used in semiconductor and thin film head technology. However, if the goal is to have very closely spaced gap patterns in the up-track and down-track directions, another approach would be to reverse the assembly as shown in the head of FIG. 11A.

Figure 11A:
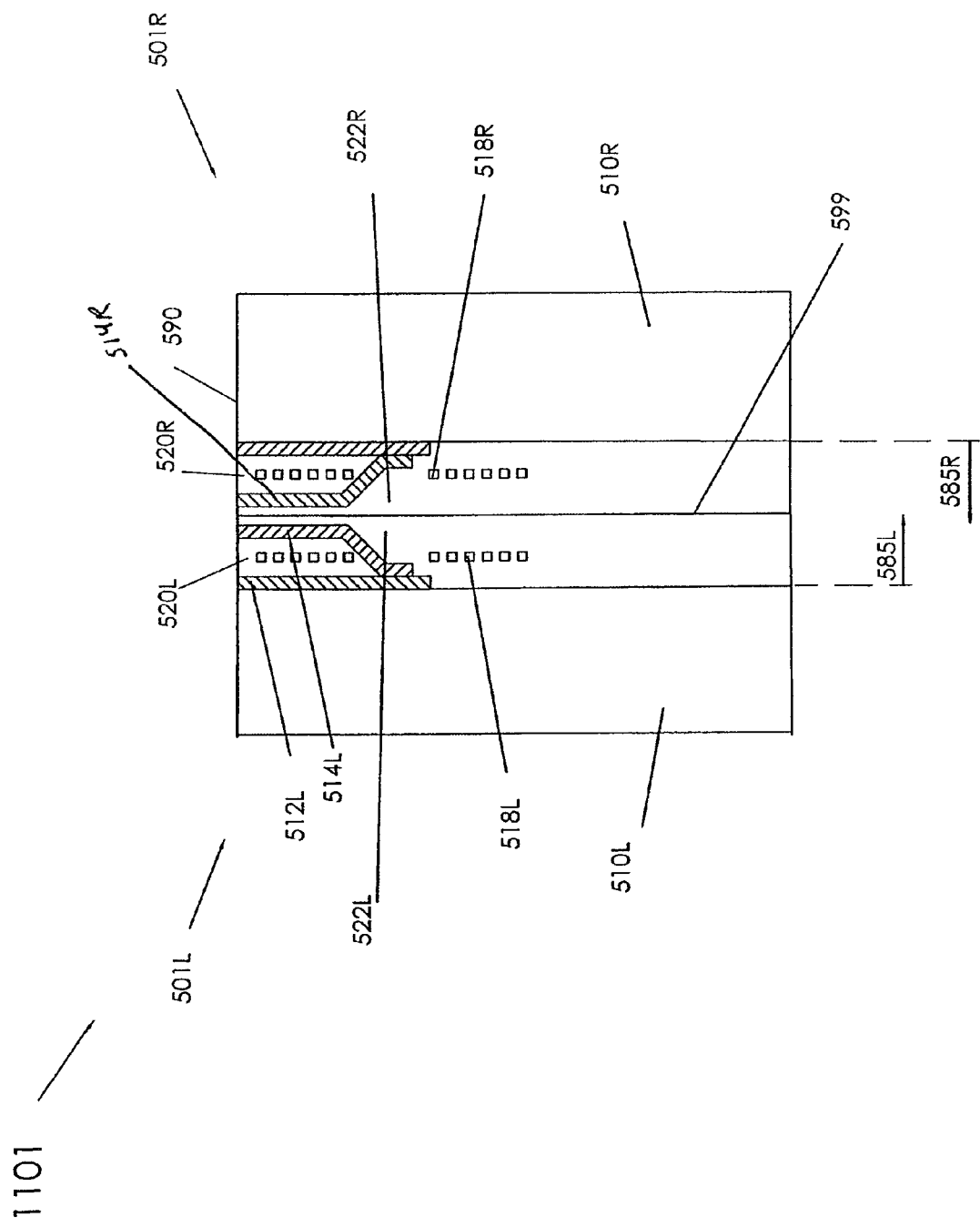
FIG. 11A is a cross section of a compound subgap subpole substrate.

FIG. 11A is a cross section showing the row bar substrates abutted so that the second poles 514L and 514R are placed proximate to one another. This is opposite to the substrate back-to-back process as described in FIG. 10A. In this configuration, closure 524 is not used, and overcoat 522L and 522R may be minimized. Also in this configuration, it may be required to place a highly conductive layer on or adjacent to the boundary 599 between the two head modules to minimize any cross talk from one to the other during writing or reading operations. For example, a thin film of Copper may be deposited onto the top of the overcoat layer 522L or 522R as required. Alternatively a thin laminate of Copper foil, for example 1 mil (0.001") foil, may be placed in between the modules. The Copper will serve to provide eddy current shielding between the two head modules. Magnetically permeable shielding could be used as well or in combination with Copper. Such shielding techniques are well known.

Figure 11B:
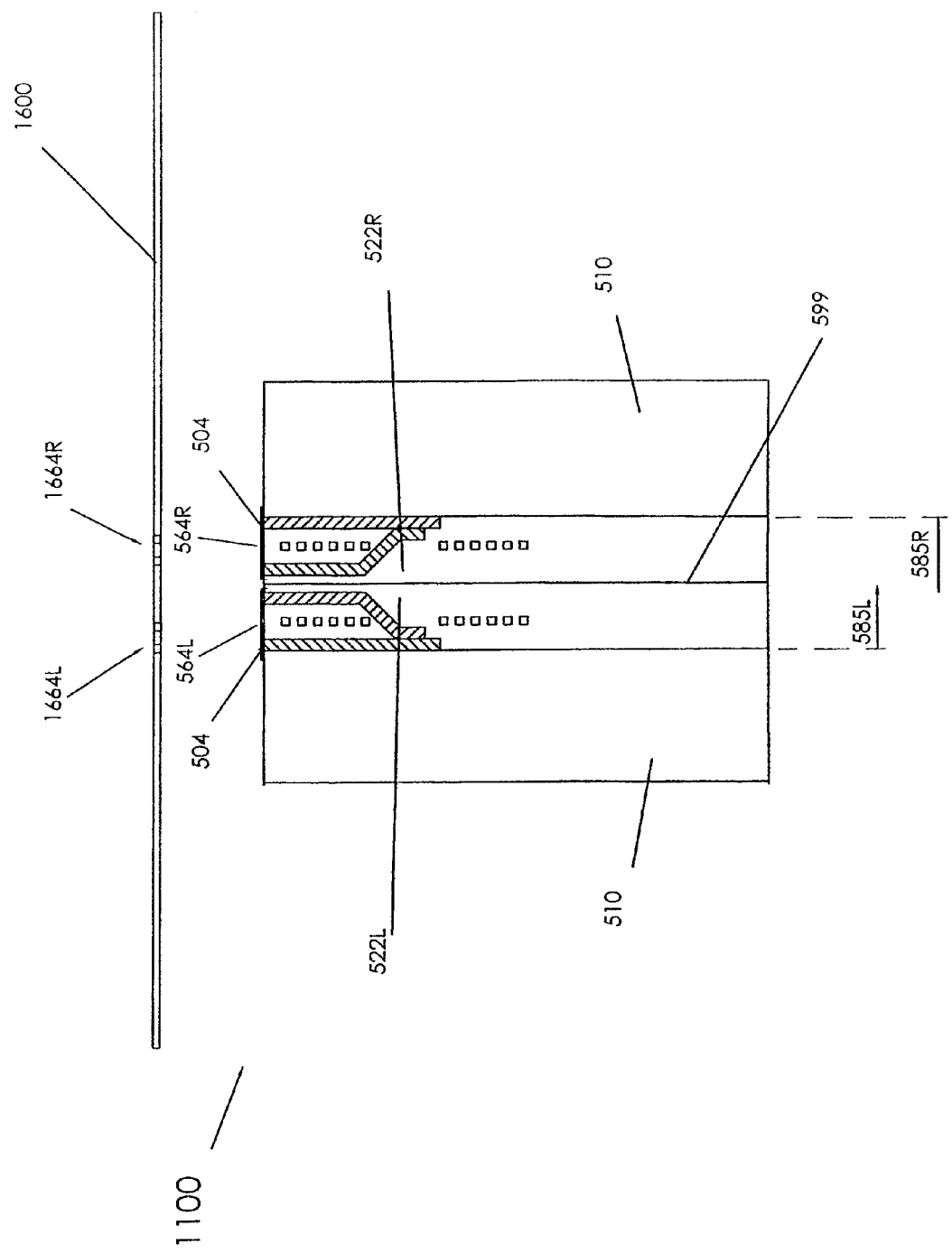
FIG. 11B is a cross section view of a compound integrated thin film servo format head.

FIG. 11B is a cross section of the completed head. Exactly as in FIG. 10B, the HPP is shown to be accomplished with the common deposition of film 504 and common mask 1600 as schematically shown with the left 1664L and right 1664R gap patterns as would be on the mask.

Figure 11C:
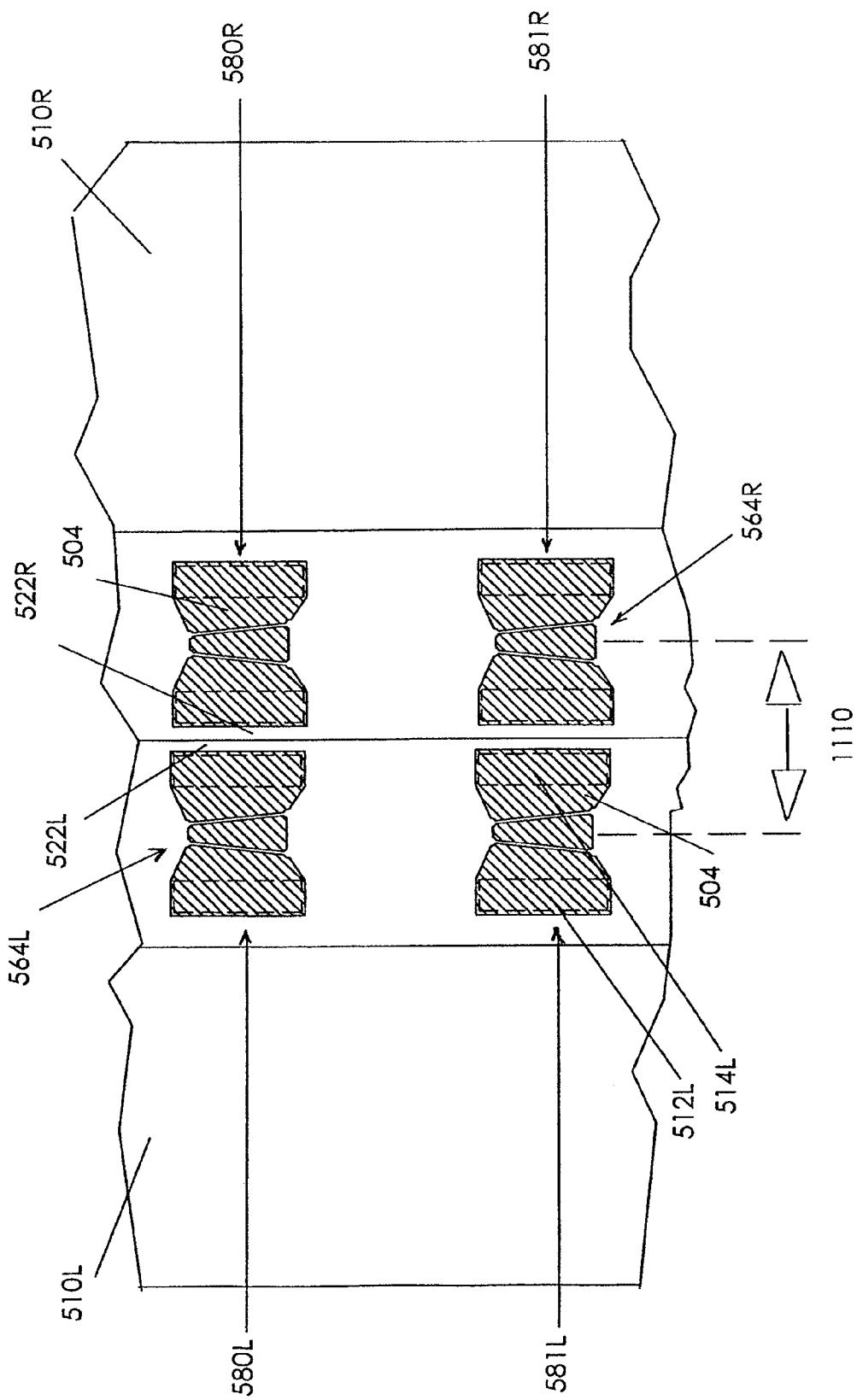
FIG. 11C is a partial top view of a compound integrated thin film servo format head.

FIG. 11C is a top view of this head showing a much closer distance 1110 between the patterns as compared to that same distance 1010 which was obtained through the technique described in FIG. 10A-10C. Again, the patterns schematically represent a double LTO pattern although any set of arbitrary gap patterns could be used. Note that distance 1110 from the center of one gap pattern to the center of the other is now only a function of the thin film designs and not a function of the substrate thickness. Hence, distance 1110 is now much shorter as compared to distance 1010.

In timing based servo systems the instantaneous speed variation (ISV) effects are to be minimized. In some servo signal detection designs shorter span from one gap pattern to the other may be advantageous in achieving a more robust compound servo as shown in these examples. In other servo signal detection schemes, a longer base line may be desired. Thus depending on the servo signal scheme, compound patterns can take advantage of either of the techniques taught in FIG. 10 or FIG. 11.

The compound substrate scheme of FIG. 11A leaves the bonding pads facing inward. The bonding pads 579L and 579R were not shown in FIGS. 11A and 11B due to this difficulty. An offset pad configuration can solve this apparent problem. One offset pad configuration is shown in FIGS. 11D and 11E.

Figure 11D:
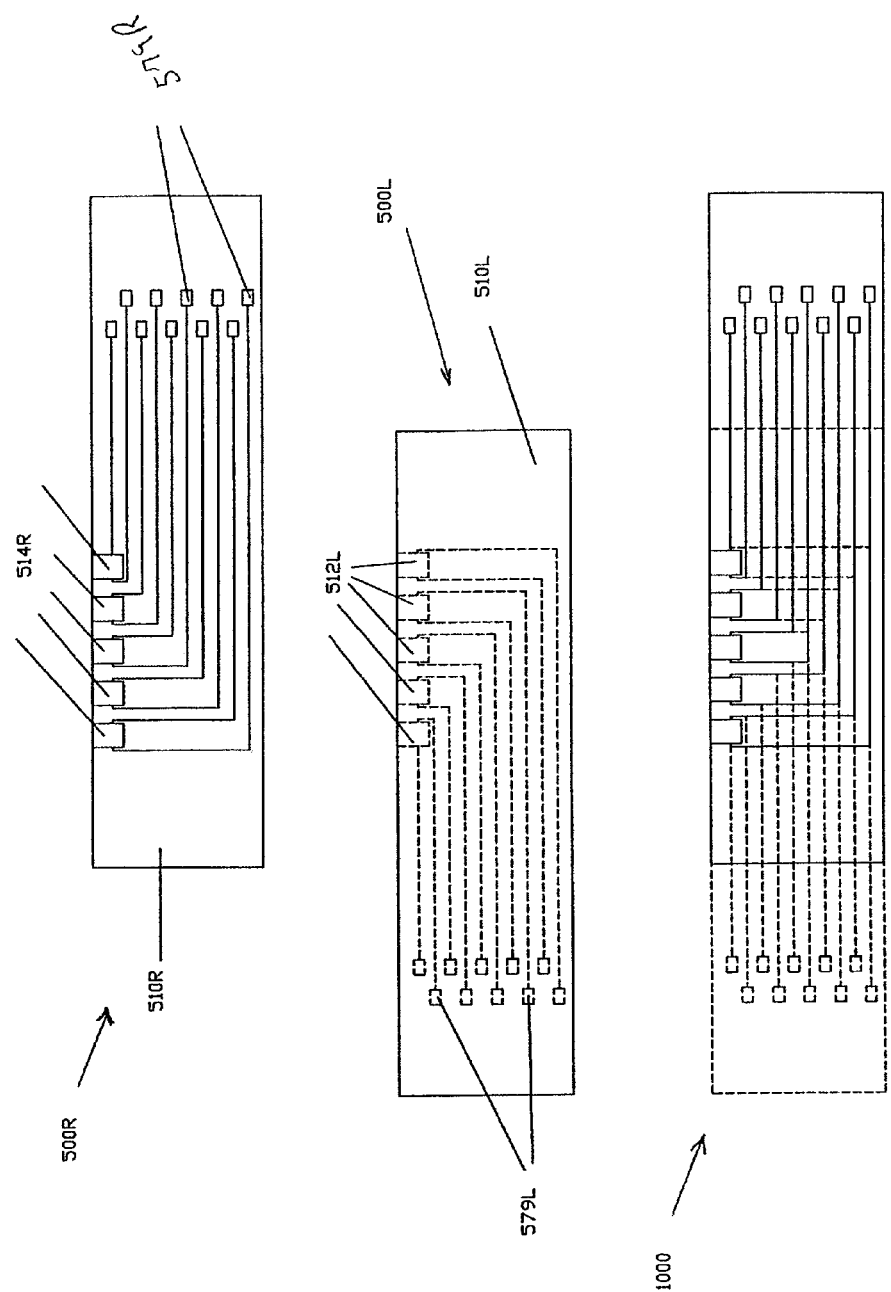
FIG. 11D is a side view schematic layout of a compound integrated thin film servo format head showing the bonding pad layout.
Figure 11E:
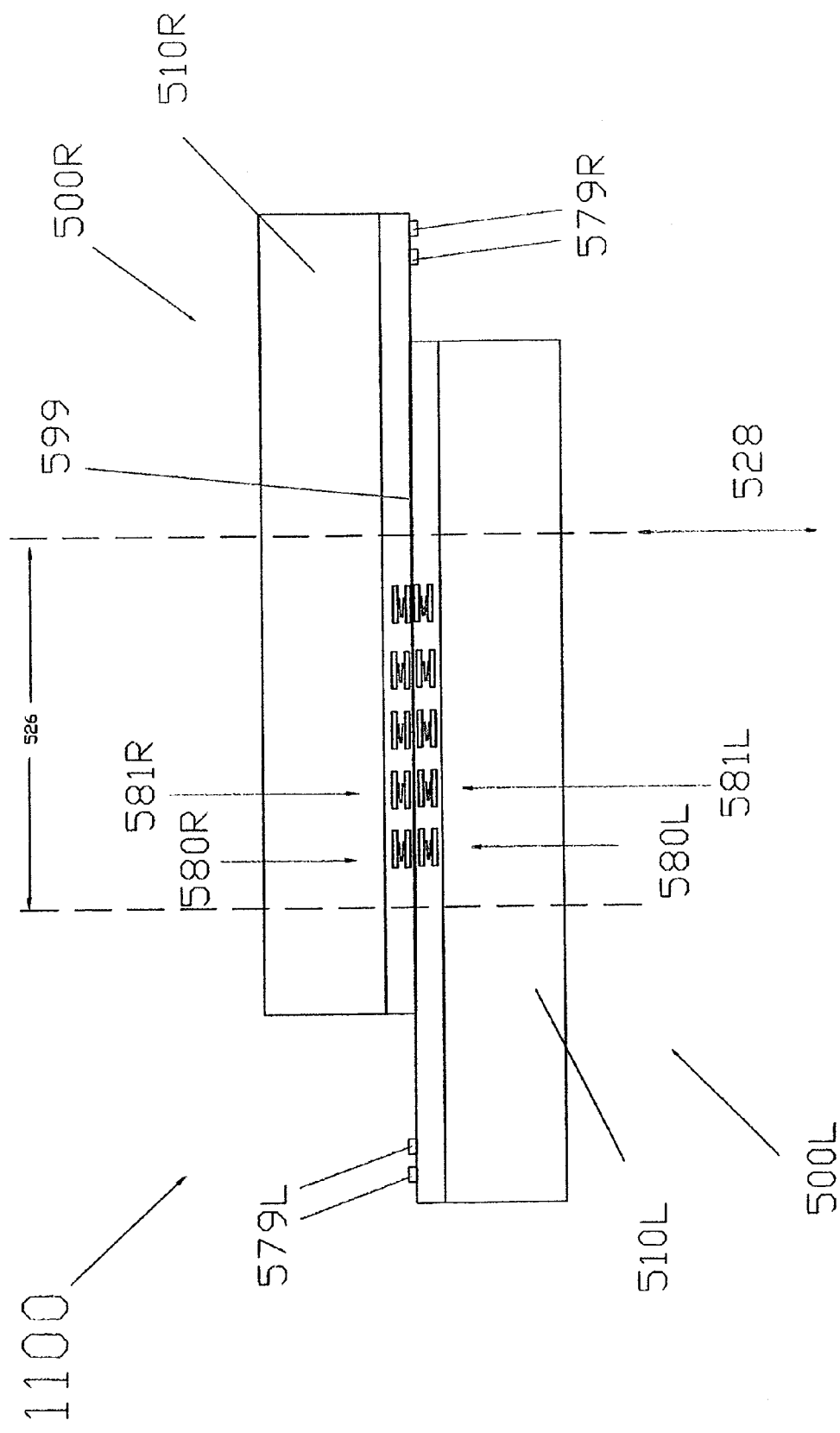
FIG. 11E is a top view schematic layout of a compound integrated thin film servo format head showing the bonding pad layout.
Figure 11F:
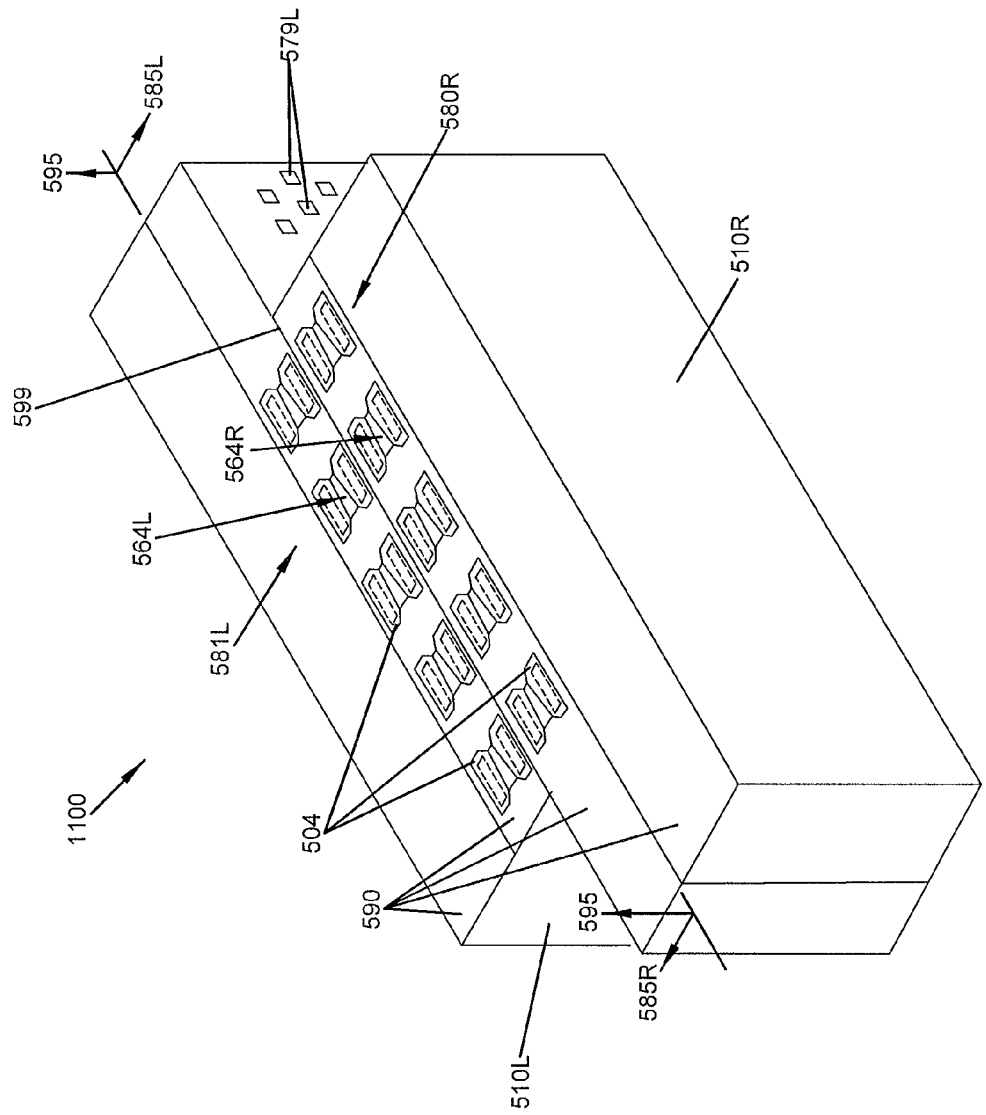
FIG. 11F is a perspective view of the compound integrated thin film servo format head.

By placing the bonds pads 579L and 579R in an area to either side of the elements, this issue may be mitigated and managed as shown in FIGS. 11D and 11E. In FIG. 11D, the leads are brought to one side of the row bar chip and, hence, when the row bars are mated to form a compound row bar, the elements each expose the bonding pads to an open manner such that a flex circuit may be bonded in a simple and unopposed fashion. This is further illustrated in FIG. 11E. A projection of this compound head is further illustrated in FIG. 11F.

Yet another example of the applicability of the compound subgap substrate is to use individual writing of individual gap elements to produce a complex arbitrary servo pattern. In some servo designs where a longer up-track to down-track spacing is desired, the compound head assembly of FIG. 10A-10C may be used. That design uses the back-to-back substrate approach. In other designs where a very close spacing is desired, the compound head assembly of FIG. 11A-11E may be used.

As discussed the head can be made into a one dimensional array of elements, as per FIG. 5F, or the head may be made into a compound structure with a two dimensional array of elements as shown in FIG. 10C and FIG. 11C.

FIGS. 12A-12D show other examples of the recording head of this patent. FIG. 12A shows an LTO type pattern laid out in a single subpole subgap element. The example represents an application of the head of this invention to an existing product gap pattern. FIG. 12B shows the same dual gap LTO pattern as shown in FIG. 12A but now each gap can be addressed independently through the use of the compound head techniques described in FIG. 11A-11E. The LTO pattern and the subgap and subpoles are shown more to proper scale in these figures as compared to the previous figures. The advantage of this technique as taught in FIG. 11A-11E is that the true LTO pattern, using a 50 um center-track to center-track spacing with six degree angles and with a 190 um track width, can actually be made such that each gap can be independently written, if a servo system requires it. Bond line 599 is schematically shown and the surface film 504 is shown having been deposited and patterned in a common process. The gap pattern 564 is distinguished further for this embodiment as being made up of left handed gap 560L and right handed gap 560R as shown in FIG. 12A. FIG. 12B shows where the same gap pattern 564 of FIG. 5A has been made across two independent subgap subpole structures, thus each gap 560L and 560R may be written independently, respectively, in association with driving coils 518L and 518R not shown. All of this is in the spirit of the construction taught in FIGS. 10A-10C and in particular in the spirit of the FIGS. 11A-11F where a much closer yet independently driven element separation, in the up-track and down-track directions, is taught.

FIG. 12C shows a three gap LTO type of pattern as previously referenced. In this pattern, the three gaps can lie within one subgap system as shown. Again, the invention presented herein can replace the ferrite/ceramic composite structure of prior art FIGS. 3A-3B and FIGS. 4A-4D. However, using the techniques taught in FIG. 11A-11D, the gap patterns may be split apart and written independently as shown in FIG. 12D. Such independently electrical control of each gap of a multi-gap pattern could be of use in advanced servo systems and has been shown in Publication '844 by Eaton, Imaino, and Pan, of IBM. In FIGS. 12C and 12D, the middle gap 560M is distinguished accordingly along with 560L and 560R. The three gap structure is shown to be divided and remodeled as a dual gap structure for the left hand module and a single gap structure for the right hand module. All of this is in the spirit of the construction taught in FIGS. 10A-10C and in particular in the spirit of the FIGS. 11A-11E where a much closer yet independently driven element separation, in the up-track and down-track directions, is taught.

FIG. 13A illustrates an application of the head of this invention to that of the Large LAAZR patents applied for by Schwarz and Dugas, having Ser. No. 10/793,502. This is a combination amplitude base and timing base servo approach where the track identification, such as shown in FIG. 13A, is determined by the distance from the large timing pattern 1564R to the amplitude pattern 1564L. These patterns have a precise submicron relationship to each other and therefore must be made from a common masking operation. A section of how this would appear on tape is shown in FIG. 13B, and a schematic layout of the compound head is shown in FIG. 13C. In FIG. 13C, the zigzag azimuthal amplitude gap pattern 564L is shown in the left hand head module driven by subpoles 512L and 514L, and the large structure azimuthal timing gap pattern 564R is shown in the right hand head module and is driven by subpoles 512R and 514R. Boundary 599 is shown along with surface film 504 with the understanding that the gap patterns 564L and 564R are processed into common film 504 in one photolithographic step. Film 504 is later separated or can be grown as shown in a plating operation.

Figure 14A:
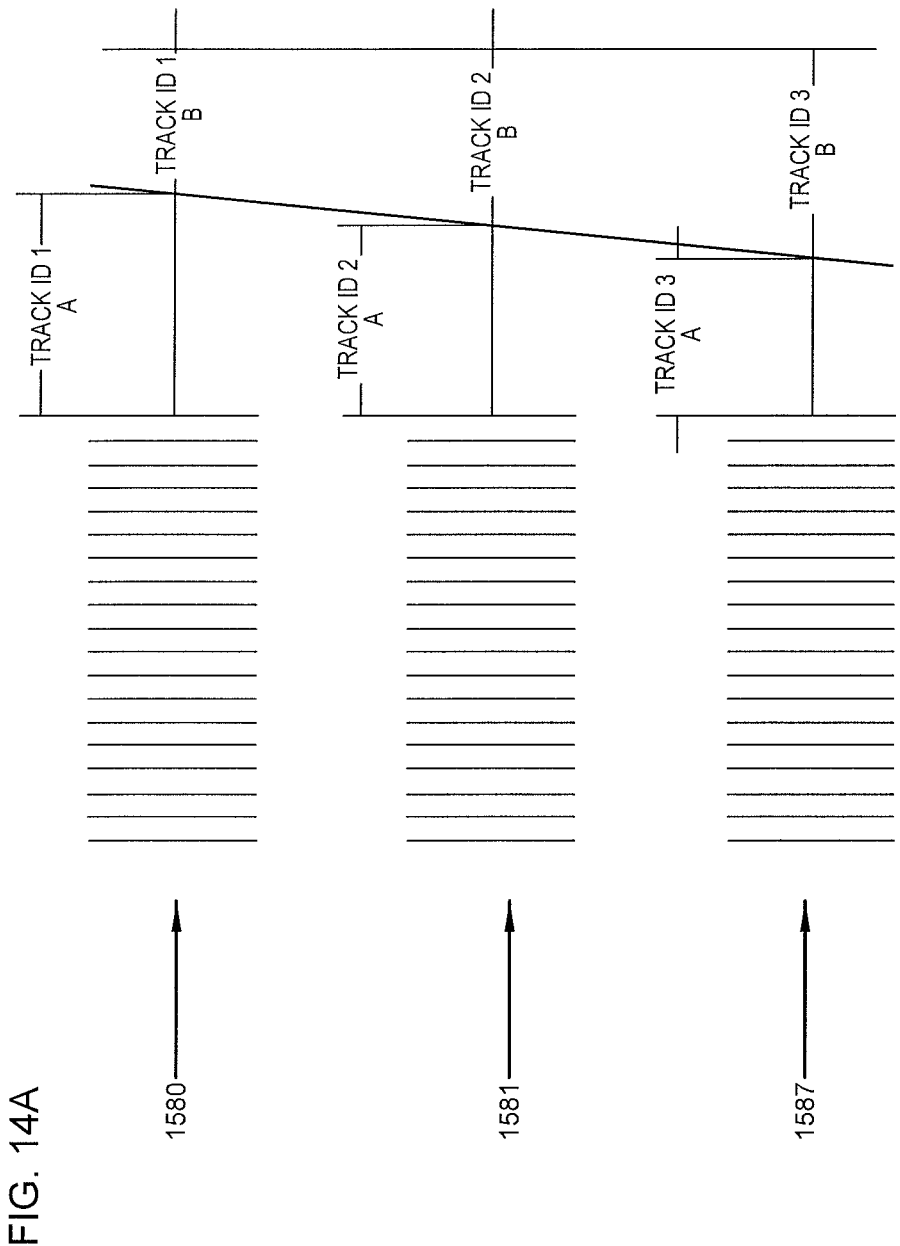
FIG. 14A is a top view of the track identification and format scheme based on a combination of amplitude and timing based servo formats.
Figure 14C:
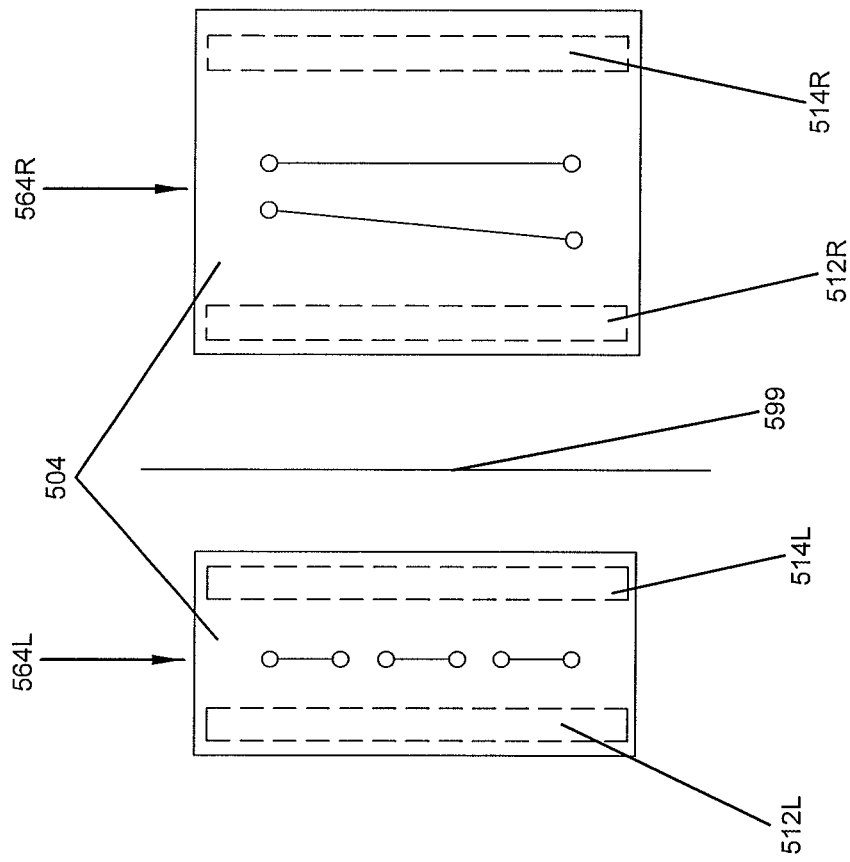
FIG. 14C shows, in part, a top view of the compound subgap subpole head that can be used to record the transitions
Figure 14B:
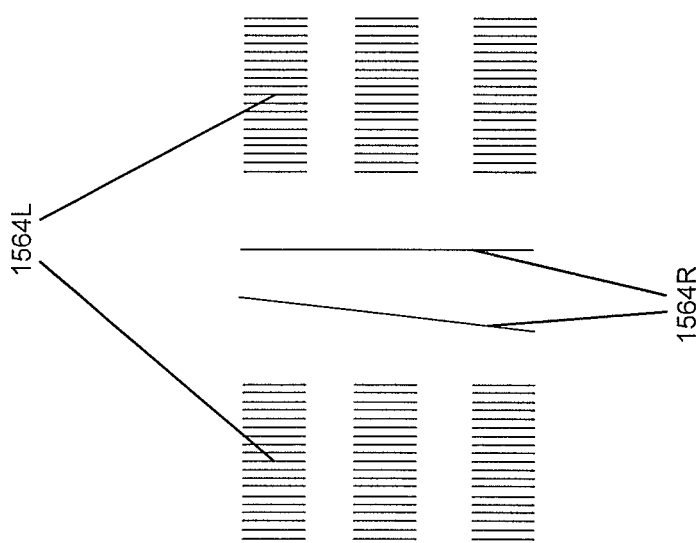
FIG. 14B shows, in part, a top view of the magnetic transitions on tape of the combination amplitude and timing based format scheme.

FIG. 14A shows yet another timing base and amplitude base combination concept that can be made practical through the use of the concept taught in this invention. FIG. 14A shows timing track identifications Track ID1, Track ID2, and Track ID3. It also shows an A length and a B length related to each ID label, for example Track ID1A and Track ID1B, for each head servo track 1580, 1581, and 1582, respectively. The pattern on the tape is shown in the magnetic transitions 1564L and 1564R of FIG. 14B. The head that can make these patterns is shown in FIG. 14C and is another example of a specific embodiment of the heads described in FIG. 10A-10C and FIG. 11A-11F. Again we have independent driving poles pairs, 512L and 514L, and 512R and 514R, respectively, which drive gap patterns 564L and 564R independently as shown.

FIG. 15A-15C shows yet another embodiment of the compound heads of FIGS. 10A-10C and FIG. 11A-11F. In this scheme, a pure amplitude pattern is shown to be made identically from two different embodiments. The magnetic transition pattern of FIG. 15A is made up of transition patterns 1564L and 1564R. The frequencies of the two patterns are different, and when a servo read head is parked across each half-track, it can be determined that servo read head is sensing the two frequencies in a particular weighting. In this example, the frequency of pattern 1564R is twice that of 1564L. This set of magnetic transitions as shown in FIG. 15A can be made from the head shown in FIG. 15B or from the head shown in FIG. 15C. In the case of FIG. 15C, the elongated gap pattern 564L is overwritten by the segmented gap pattern 564R. Once again, each gap pattern resides in an independently controlled subgap subpole system, and the patterns are made on the compound substrate in one photolithographic step as described in detail in the discussion relating to FIGS. 10A-10C and FIGS. 11A-11F.

One skilled in the art could also recognize that the compound substrate can be made of just one substrate wherein one subgap system with associated subpoles is fully planarized and then another entire system is made with another round of VPP right on top of the previous system. While this would be an extraordinarily complicated process, it is not out of the question and may at some point in time be a useful strategy to employ. Alternatively, multiple stacks of the present invention can be conceived and made to accomplish a combination of multiple gap modules of multiple channels for various data storage purposes for both read and write head applications.

Both single and multi-coil version of this head invention may be used for different applications and should be considered within the scope of this invention. A single coil can span and drive several servo channel patterns or each channel pattern may have its own drive coil. Similarly, the write driver can drive all channels with one signal or a multi-channel write driver may be used to drive individual channels which have a write driver channel. Delayed timing from one channel to the next may be employed. Channel-to-channel isolation is assumed as required for these write driver applications.

Per the previous discussions, various methods of film deposition and gap definition may be used without limitation.

Those skilled in the art will further appreciate that the present invention may be embodied in other specific forms without departing from the spirit or central attributes thereof. For instance, while the discussion of the invention was described in terms of servo writing tape with arbitrary servo patterns and hence arbitrary gap features, this invention may be applied to other write head applications and read head applications as appropriate. Furthermore, while the disclosure generally concentrates on embodiments of the present invention as it applies to multi-channel, linear tape recording, some aspects of the inventions herein may be applied to magnetic track transitions, angled to the transverse axis, as may be found in azimuthal recording schemes.

The foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

The invention claimed is:

1. A method of formatting magnetic media comprising:
 providing an integrated thin film magnetic recording head having at least two recording elements, each recording element comprising:
  first and second magnetically permeable thin film subpole members, separated by a substantially low permeability subgap member, a unique integrated electrically conductive coil structure embedded in part within the subgap member and in part in-between the first and second subpole members, the subgap member and subpole members forming part of a magnetic circuit; and
  a magnetically permeable thin film layer spanning from at least the first subpole member to the second subpole member and including one or more arbitrary recording gap patterns;
 wherein the at least two recording elements are substantially magnetically isolated and electrically independent of one another; and
 wherein the direction of film growth of the magnetically permeable thin film layer is substantially orthogonal to the direction of thin film growth of the first and second magnetically permeable thin film subpole members; and
 passing magnetic media over the magnetic recording head to format the magnetic media based on the one or more arbitrary recording gap patterns.

2. The method of formatting magnetic media of claim 1, wherein the film growth of the subpole members and subgap member is on a wafer level plane.

3. The method of formatting magnetic media of claim 2, wherein the film growth of the magnetic thin film layer is on a row bar level plane.

4. The method of formatting magnetic media of claim 1, wherein the magnetic media is formatted with a timing based servo pattern.

5. The method of formatting magnetic media of claim 1, wherein the magnetic media is formatted with an amplitude based servo pattern.

6. The method of formatting magnetic media of claim 1, wherein the thin film is structured to focus the flux from the subpole members across the thin film lying on top of the subgap member so as to increase the flux delivered to the one or more arbitrary recording gap patterns.

7. The method of formatting magnetic media of claim 1, wherein the coil structure is a single layer coil.

8. The method of formatting magnetic media of claim 1, wherein the coil structure is a multi-layer coil.

9. A method of formatting magnetic media comprising:
 providing an integrated thin film magnetic recording head having at least two recording elements, each recording element comprising:
  first and second magnetically permeable thin film subpole members, separated by a substantially low permeability subgap member, an integrated electrically conductive coil structure embedded in part within the subgap member and in part in-between the first and second subpole members, the subgap member and subpole members forming part of a magnetic circuit; and a magnetically permeable thin film layer spanning from at least the first subpole member to the second subpole member and including one or more arbitrary recording gap patterns;

wherein the thin film layer has been selectively removed in portions so as to magnetically isolate each of the recording elements; and wherein the direction of film growth of the magnetically permeable thin film layer is substantially orthogonal to the direction of thin film growth of the first and second magnetically permeable thin film subpole members; and passing magnetic media over the magnetic recording head to format the magnetic media based on the one or more arbitrary recording gap patterns.

10. The method of formatting magnetic media of claim 9, wherein the magnetic recording head comprises a plurality of recording elements which share a common coil.

11. The method of formatting magnetic media of claim 9, wherein the magnetic recording head comprises a plurality of recording elements, each having a unique coil.

12. The method of formatting magnetic media of claim 11, wherein the magnetic media is formatted with a timing based servo pattern.

13. The method of formatting magnetic media of claim 11, wherein the magnetic media is formatted with an amplitude based servo pattern.

14. The method of formatting magnetic media of claim 9, wherein the thin film is structured to focus the flux from the subpole members across the thin film lying on top of the subgap member so as to increase the flux delivered to the one or more arbitrary recording gap patterns.

15. The method of formatting magnetic media of claim 9, wherein the coil structure is a single layer coil.

16. The method of formatting magnetic media of claim 9, wherein the coil structure is a multi-layer coil.

* * * * *